(12) United States Patent
Wu et al.

(10) Patent No.: US 7,349,052 B2
(45) Date of Patent: Mar. 25, 2008

(54) PIXEL STRUCTURE FOR LIQUID CRYSTAL DISPLAY

(75) Inventors: Zhao-Hui Wu, Taoyuan Hsien (TW);
Kei-Hsiung Yang, Taoyuan Hsien (TW); Po-Sheng Shih, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 425 days.

(21) Appl. No.: 10/936,752

(22) Filed: Sep. 9, 2004

(65) Prior Publication Data
US 2005/0088579 A1 Apr. 28, 2005

Related U.S. Application Data

(63) Continuation-in-part of application No. 10/672,906, filed on Sep. 25, 2003.

(30) Foreign Application Priority Data
Mar. 3, 2004 (TW) .............................. 93105642 A

(51) Int. Cl.
*G02F 1/1343* (2006.01)

(52) U.S. Cl. ..................................................... 349/143
(58) Field of Classification Search ................ 349/123, 349/129, 141–143
See application file for complete search history.

(56) References Cited

U.S. PATENT DOCUMENTS

| 6,040,882 A * | 3/2000 | Jun et al. ........................ 349/39 |
| 6,104,450 A * | 8/2000 | Hiraishi ........................ 349/48 |
| 6,989,883 B2 * | 1/2006 | Park et al. ................... 349/155 |

* cited by examiner

*Primary Examiner*—David Nelms
*Assistant Examiner*—Richard H Kim

(57) ABSTRACT

The present invention builds a metal electrode that is controlled by the common electrode in each pixel cell. During operation, a voltage is first applied to this metal electrode to transform the liquid crystal molecule over this metal electrode from the splay state into the bend state. Next, a voltage is applied to the pixel electrode to transform the liquid crystal molecule in the whole pixel region from the splay state into the bend state. Two different voltage field also can be respectively applied to the common electrode and the pixel electrode.

22 Claims, 35 Drawing Sheets

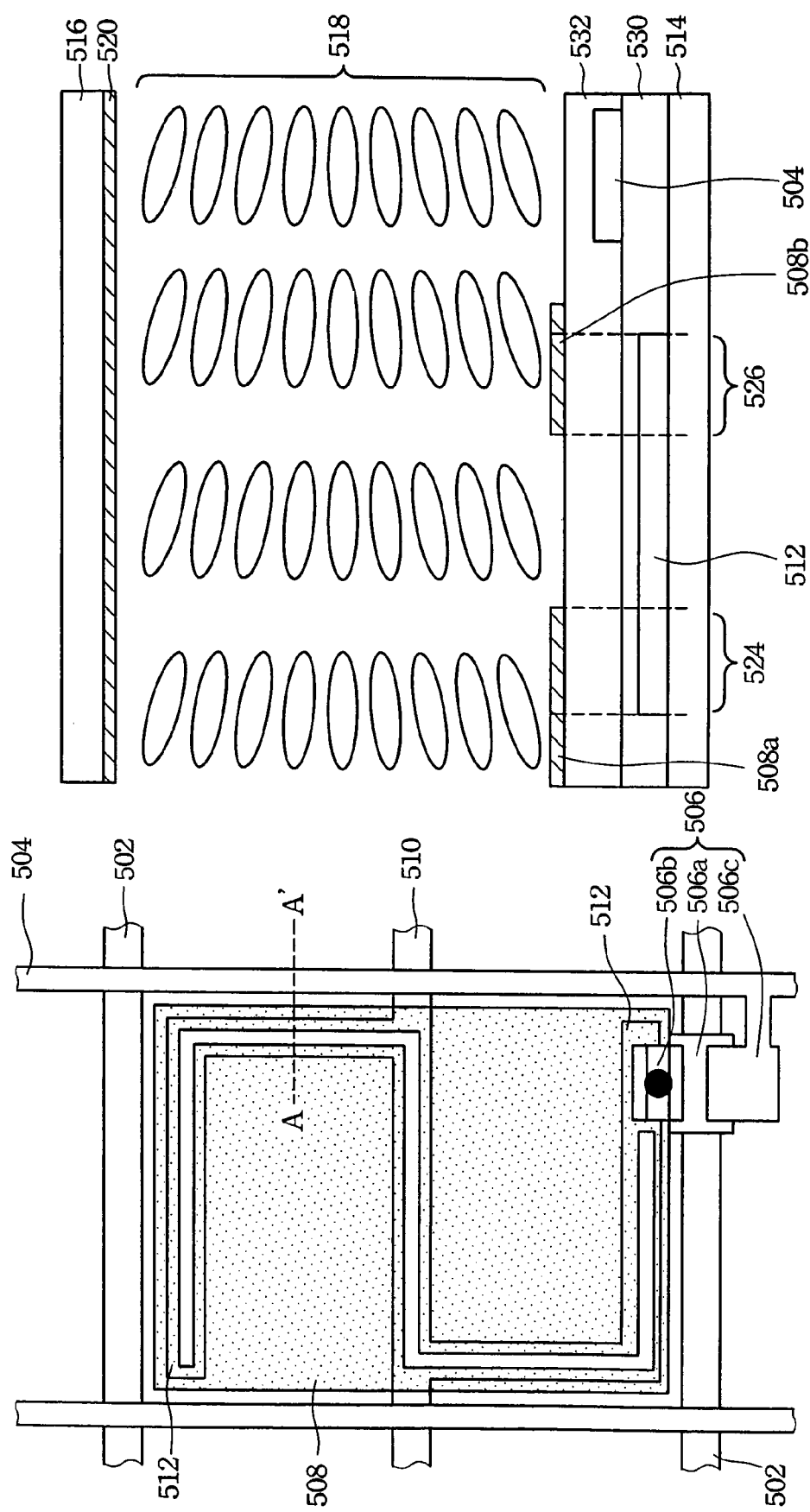

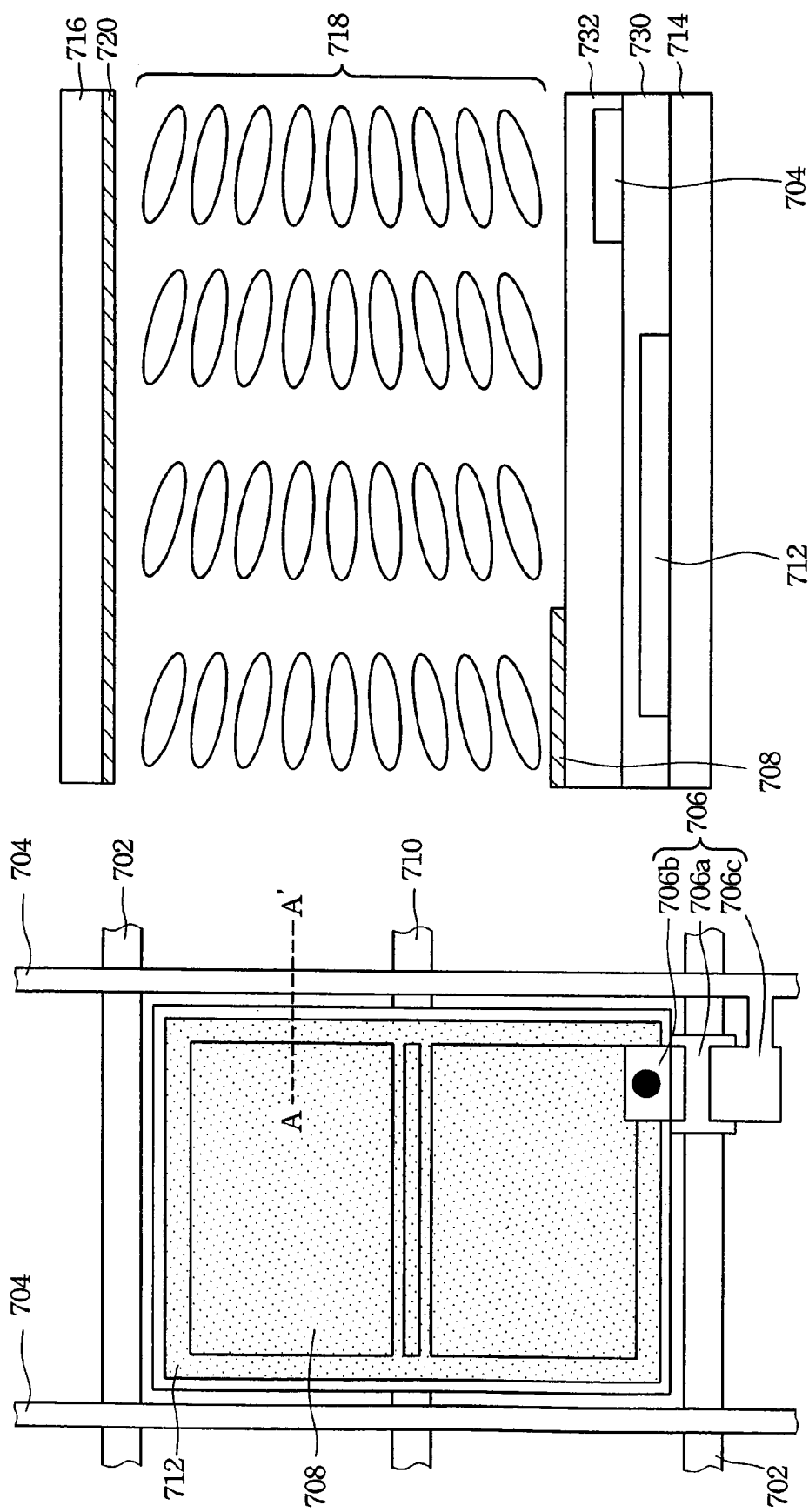

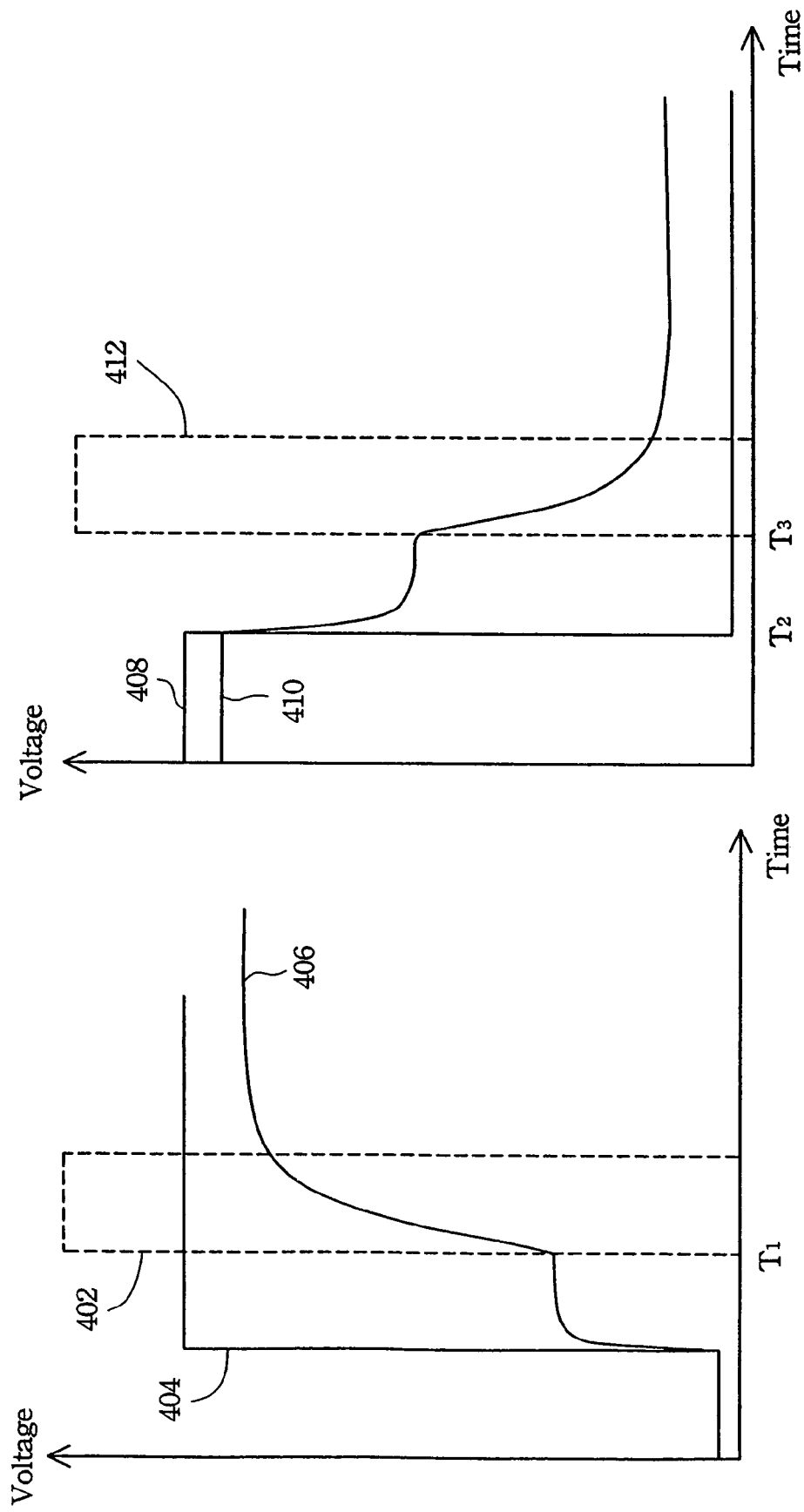

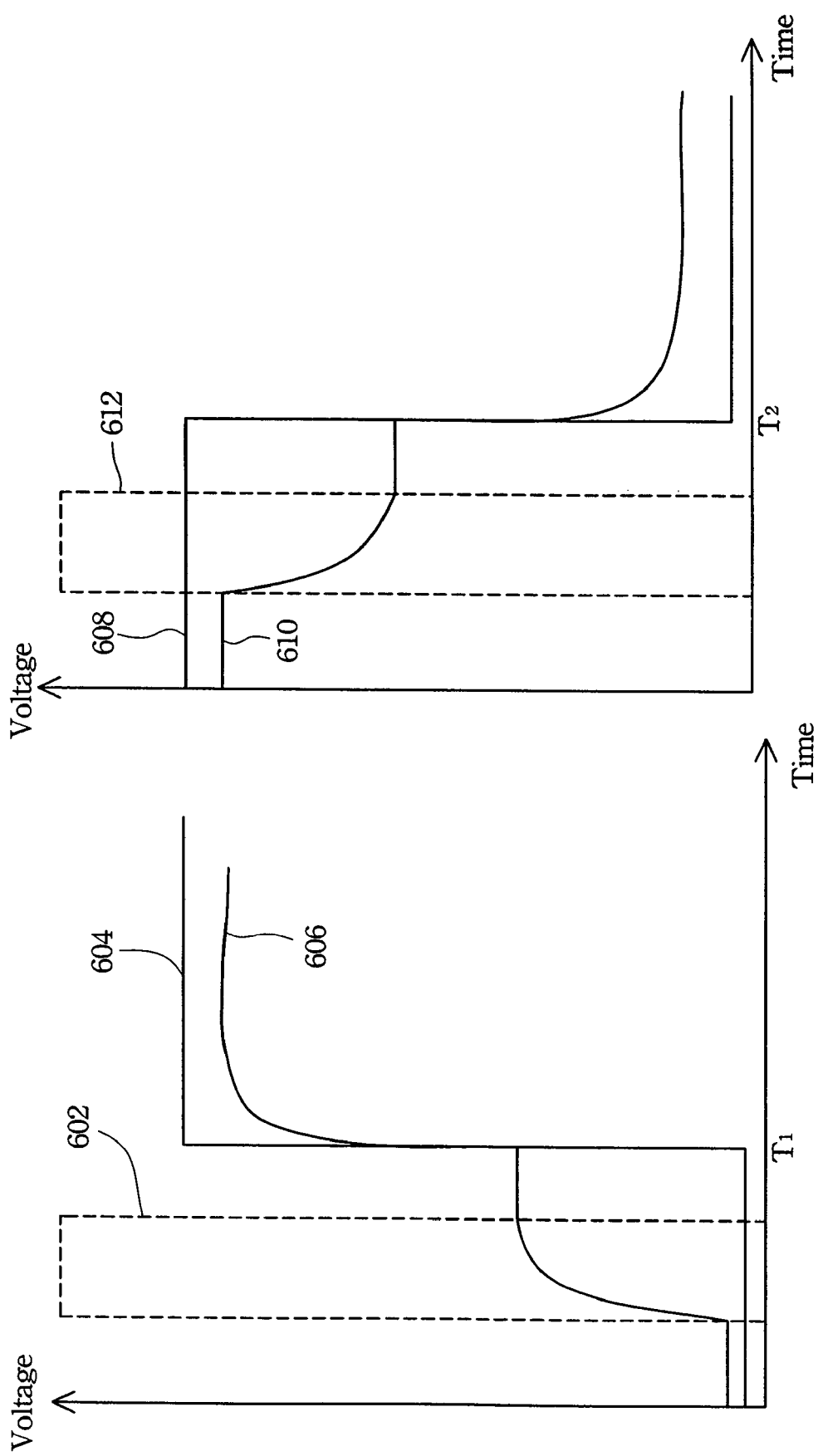

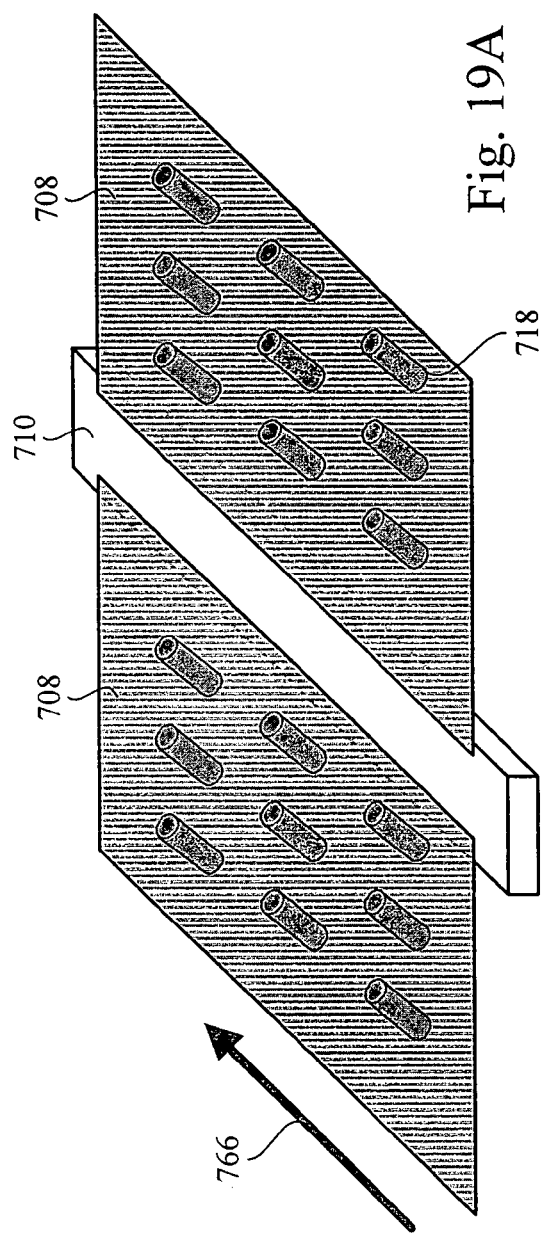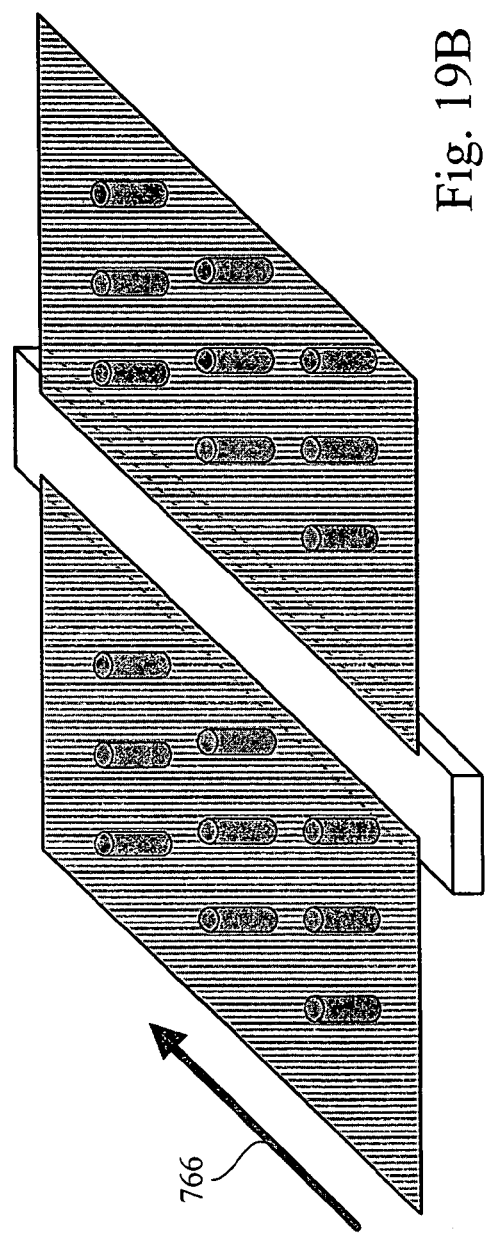

PIXEL STRUCTURE FOR LIQUID CRYSTAL DISPLAY

FIELD OF THE INVENTION

The present invention relates to a pixel structure for a liquid crystal display and more particularly to a high speed response pixel structure for a liquid crystal display. This application is a continuation-in-part of application Ser. No. 10/672,906 filed on Sep. 25, 2003, which is hereby incorporated by reference herein in its entirety. The present application also claims priority from, Taiwanese Application Serial Number 93105642, filed Mar. 3, 2004, the disclosure of which is hereby incorporated by reference herein in its entirety.

BACKGROUND OF THE INVENTION

Twisted nematic (TN) cells, which at present are widely used in TFT color liquid crystal display devices (TFT/LCDs), have a small view-field angle. This results in a decrease in contrast and image inversion when an LCD panel surface is viewed from an oblique direction. Various methods have been proposed to solve this problem, i.e., to realize a wide view-field angle. Among these methods is an orientation division method in which each pixel of an LCD is divided into two parts and orientation is affected in different directions in the two parts.

However, these methods require cumbersome manufacturing steps. For example, in the case of the orientation division method, two rubbing steps are required. These steps include the further steps of coating, baking, patterning, developing and removing photoresist.

In recent years, studies on an OCB cell that is to be used as a liquid crystal cell instead of a TN cell have been made. If the OCB cell technique is used, it becomes possible to obtain a wide view-field angle more easily than with the orientation division method as well as a high-speed response characteristic that is one order faster than with conventional TN cells.

FIG. 1 is a perspective view illustrating the structure of an OCB cell. A liquid crystal material that exhibits splay orientation 104 is sealed between two (top and bottom) glass substrates 100 and 102. Polarizing plates 106 and 108 are disposed outside the two respective glass substrates 100 and 102. When a voltage is applied to the glass substrates 100 and 102, the liquid crystal material is transformed from splay orientation 104 to bend orientation 110 as shown in FIG. 1B. In a bend orientation 110 cell, since top and bottom liquid crystal molecules are always oriented symmetrically, the view-field-angle dependence is symmetrical around the AA' line. An optically compensated bend (OCB) mode LCDs compensates for the birefringence of liquid crystal molecules so as to obtain the uniform viewing angle characteristic at all directions.

An OCB cell is in a splay orientation state when no bias voltage is applied thereto, and exhibits a bend orientation state when a given high voltage is applied thereto. To allow an OCB cell to operate as a liquid crystal display device, the cell must be transformed from a splay orientation to bend orientation at the start of operation. This process requires a restart time, which reduces the response speed.

FIG. 2A shows a pixel structure plan diagram of a thin-film transistor LCD. The gate electrode 306a of the switch transistor 306 is connected to the scan line 302. The drain electrode 306b of the switch transistor 306 is connected to the pixel electrode 308 and the source electrode 306c is connected to the video data line 304. A common line 310 is used as the common electrode of the pixel electrode 308. The switch transistor 306 is usually a thin-film transistor (TFT) that is deposited on a transparent substrate such as glass. By scanning the scan lines 302 and in accordance with the scan signals, all of the switch transistors 306 in a given scan line 302 are turned on. At the same time, video signals are provided in the video data lines synchronously with the selected scan line 302.

FIG. 2B is a cross-sectional view along the BB' line in FIG. 2A. A liquid crystal material 326 is sealed between two (top and bottom) glass substrates 320 and 322. A conductor electrode 324 is located on the top glass substrate 320. Referring to FIG. 2A and FIG. 2B, typically, the liquid crystal molecule 328 over the pixel electrode 308 is in splay state and the liquid crystal molecule 326 over the other region is in bend state. Then, a high voltage is applied between the conductor electrode 324 and the pixel electrode 308 for a given period at the start of operation of a liquid crystal display device using the OCB cell. At this time, the liquid crystal molecule 326 in bend orientation change the orientation state of the liquid crystal molecule 328 over the pixel electrode 308 from splay orientation to bend orientation. However, a part of the liquid crystal molecule 328 over the pixel electrode 308 may be unsuccessfully transformed and remain in bend orientation, which reduces the display quality of the LCD. In addition, the two orientation states required in this method increase the manufacturing cost. Moreover, it is difficult to maintain the high angle of inclination of a bend orientation state liquid crystal molecule. Although this allows the liquid crystal display device to have a desired wide view-field angle characteristic, the image quality required for it cannot be obtained easily. Further, the above measure is not practical.

FIG. 2C shows another orientation state in accordance with the conventional method. The liquid crystal molecule 330 in the whole pixel is in splay state. In accordance with this method, a high voltage is applied between the conductor electrode 324 and the pixel electrode 308 for a given period at the start of operation of a liquid crystal display device using the OCB cell to transform the liquid crystal molecule 330 from splay state into the bend state. This fixed start time usually takes more than several tens of seconds. The liquid crystal molecule 330 returns to splay state when the LCDs is turned off. However, part of the liquid crystal molecule 330, such as the liquid crystal molecule between the video data line 304 and the pixel electrode 308, is applied to the high voltage in this mode, which causes two liquid crystal molecule states when the LCDs is turned on. Yet another problem is that even if the liquid crystal molecule 330 is transformed from splay orientation to bend orientation at the start of operation, the OCB cell may return to splay orientation during operation. The LCD must be restarted for display to return to normal.

On the other hand, recent battery-driven systems such as notebook-type personal computers equipped with a TFT color liquid crystal display device are increasingly required to be of a power-saving type. To conserve power, such a liquid crystal display device has a driving mode stop function to turn off a display thereof. Once the LCD is turned off, an OCB cell returns to splay orientation from bend orientation. A period of time is needed to restore the bend orientation state; thus the display cannot be turned on instantaneously.

SUMMARY OF THE INVENTION

In accordance with the foregoing description, the typical liquid crystal display using OCB cell requires transformation of the liquid crystal molecule orientation state from splay orientation to bend orientation during operation, which involves two liquid crystal molecule orientation states. There are two typical transformation methods. In one method the liquid crystal molecule over the pixel electrode is first in a splay state while the liquid crystal molecule over the other region is in a bend state. Then, a high voltage is applied between the conductor electrode and the pixel electrode to transform the liquid crystal molecule over the pixel electrode from splay state into the bend state. However, this method requires two different orientation states, splay state and bend state, and the manufacturing cost is increased. In another method, the liquid crystal molecule in the whole pixel in a splay state. Although an LCD employing this method is convenient to manufacture, this method requires a given period at the start of operation of a liquid crystal display device to transform the liquid crystal molecule from splay state into the bend state. In other words, this method does not provide an instantaneous response. Moreover, part of the liquid crystal molecule does not accept high voltage, which affects the display quality.

Therefore, it is the main object of the present invention to provide a pixel structure capable of obtaining a wide viewing angle as well as improving picture quality.

Another purpose of the present invention is to provide a pixel structure only using an unique orientation state in the whole cell and for which a given period at the start of operation of a liquid crystal display device is not necessary.

Yet another purpose of the present invention is to provide a driving method of a liquid crystal display device, which method allows an OCB cell to transform from a splay orientation to a bend orientation state in a short period.

A further purpose of the present invention is to provide a liquid crystal display that can be manufactured in a simple and relatively inexpensive manufacturing method.

In accordance with the present invention, a metal electrode is built in the pixel region. The metal electrode is controlled by the common electrode. The liquid crystal molecule in the whole pixel region is in a splay state. A voltage is applied to the metal electrode to transform the liquid crystal molecule over the metal electrode from splay state into the bend state during during operation. Then, a voltage is applied to the pixel electrode. At this time, the liquid crystal molecule in the bend state transforms the liquid crystal molecule over the pixel electrode from the splay state into the bend state. Therefore, the liquid crystal molecule in the whole pixel region exhibits the bend state.

The metal electrode can be positioned in the center of the pixel electrode or around the pixel electrode in accordance with the present invention. A complicated manufacturing process can be avoided because the present invention does not require two orientation states in a liquid crystal cell. Moreover, a given period for transforming the liquid crystal molecule from the splay state into the bend state at the start of LCDs operation is not necessary. Therefore, the LCDs using the pixel structure of the present invention exhibits a high speed response as well as a high display quality.

On the other hand, the present invention also provides a drive circuit for driving the metal electrode. The drive circuit includes an inverter to invert the field frame inputted to the source/drain electrode of a transistor. The inverted field frame is used to control the common electrode. On the other hand, this transistor is controlled by a scan signal. Therefore, this transistor operation is synchronized with the switch transistor operation. In other words, if a voltage is applied in sequence to the metal electrode and the pixel electrode, the the drive circuit first turns on the transistor and then inverts the field frame.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein:

FIG. 3A illustrates a top view of the pixel region in accordance with the first embodiment of the present invention;

FIG. 3B illustrates a cross-sectional view from the AA' line of FIG. 3A, wherein all of the liquid crystal molecules are in the splay state;

FIG. 4A illustrates a top view of the pixel region in accordance with the second embodiment of the present invention;

FIG. 4B illustrates a cross-sectional view along the AA' line of FIG. 4A, in which all of the liquid crystal molecules are in the splay state;

FIG. 8A illustrates a waveform from negative to positive of drive timing in accordance with the first embodiment;

FIG. 8B illustrates a waveform from positive to negative of drive timing in accordance with the first embodiment;

FIG. 9A illustrates a waveform from negative to positive of drive timing in accordance with the second embodiment;

FIG. 9B illustrates a waveform from positive to negative of drive timing in accordance with the second embodiment;

FIG. 19A illustrates a top view of a trench formed in a pixel electrode to expose a common electrode, in which no voltage is applied to the common electrode;

FIG. 19B illustrates a top view of a trench formed in a pixel electrode to expose a common electrode, in which a voltage is applied to the common electrode;

DETAILED DESCRIPTION OF THE PREFERRED EMBODIMENT

Figure 1B:
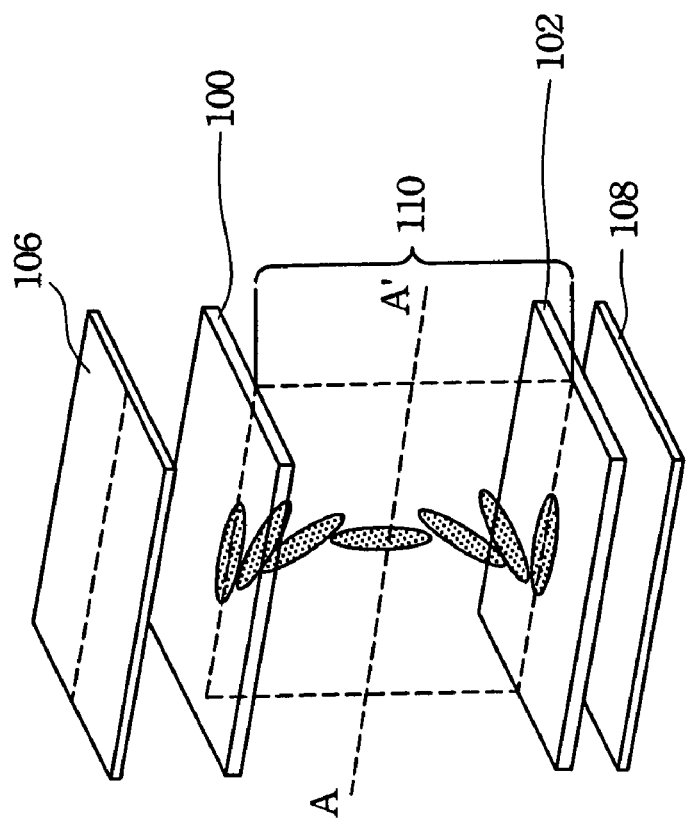
FIG. 1B illustrates a schematic configuration diagram of a liquid crystal display using OCB mode, wherein the liquid crystal molecule is in the bend state.
Figure 1A:
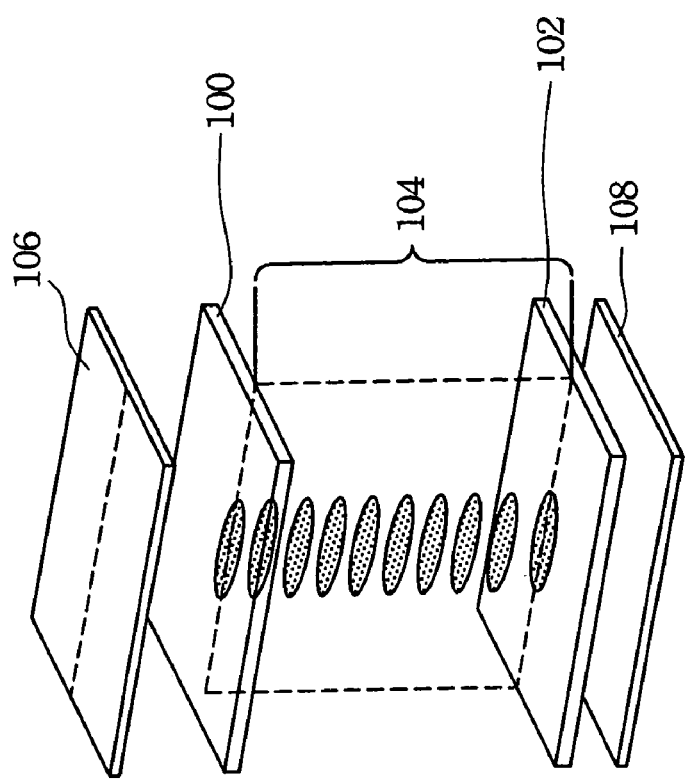
FIG. 1A illustrates a schematic configuration diagram of a liquid crystal display using OCB mode, wherein the liquid crystal molecule is in the splay state.
Figure 2A:
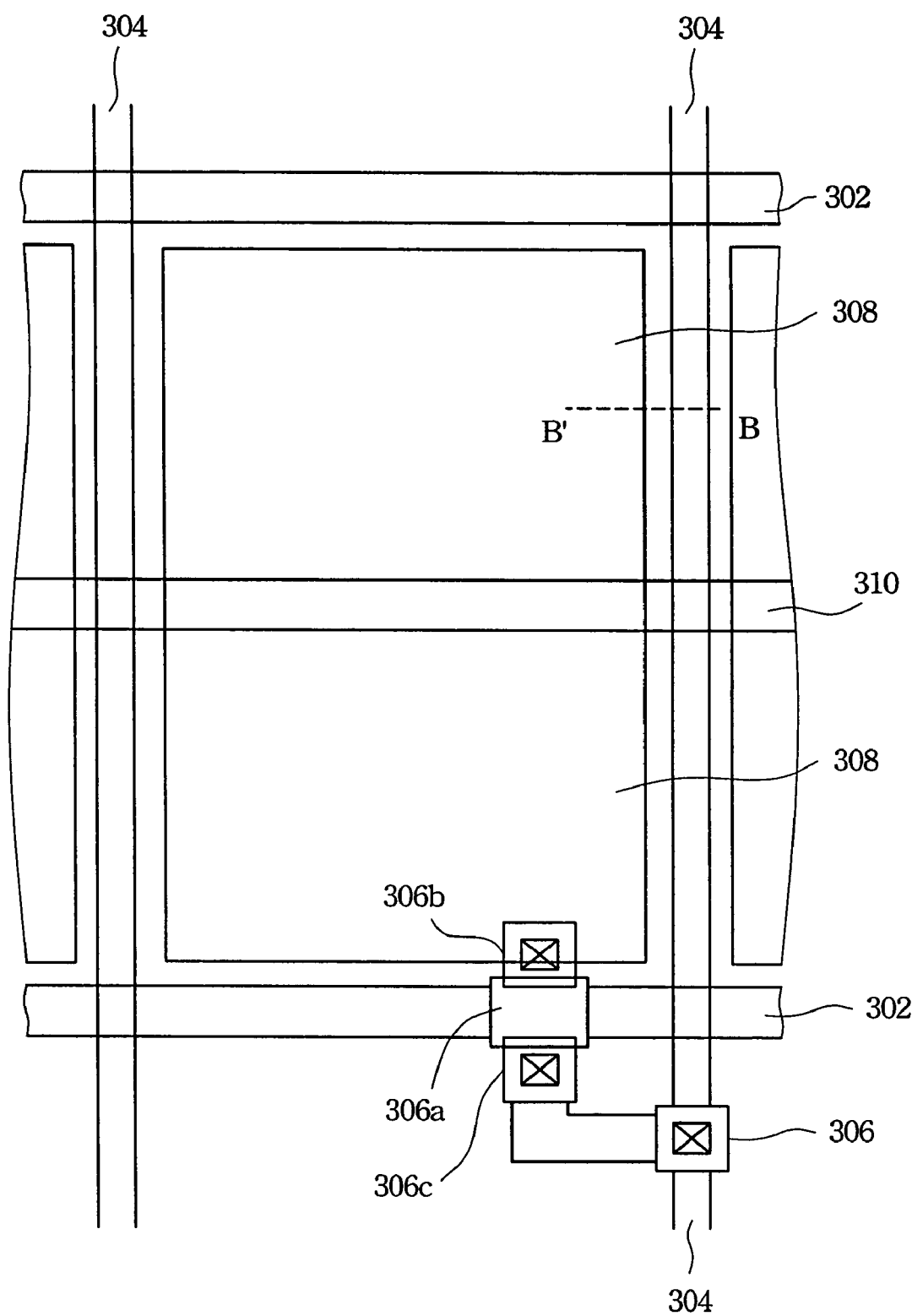
FIG. 2A illustrates a pixel structure plan diagram of a thin-film transistor LCD.
Figure 2B:
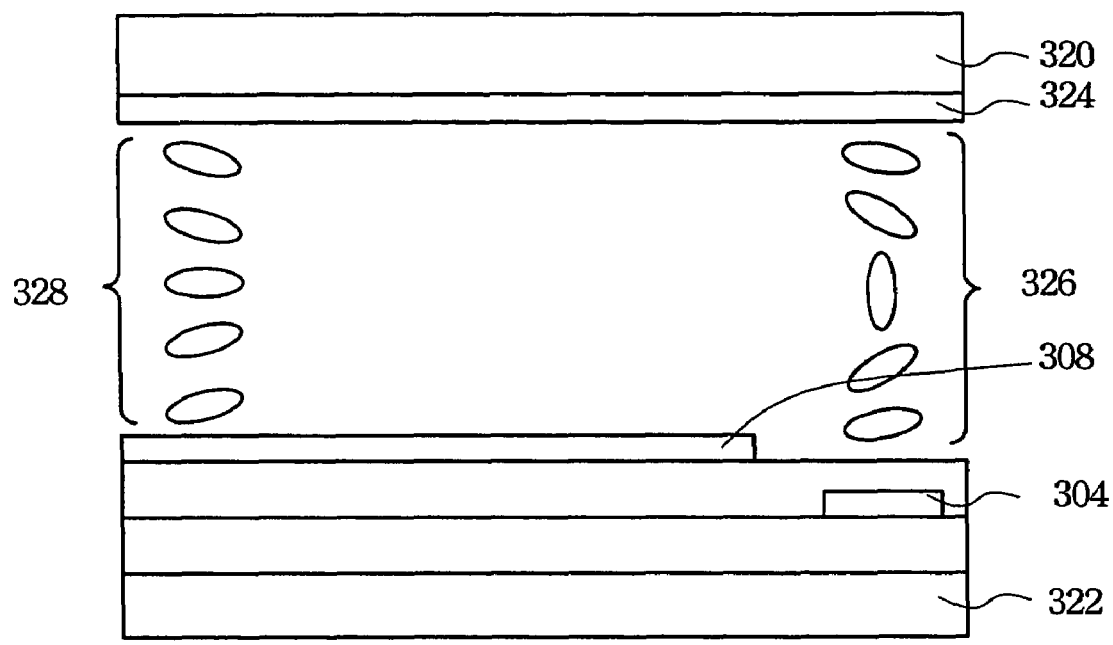
FIG. 2B illustrates a cross-sectional view along the BB' line of FIG. 2A, in which some of the liquid crystal molecules are in the splay state and some are in the bend state.
Figure 2C:
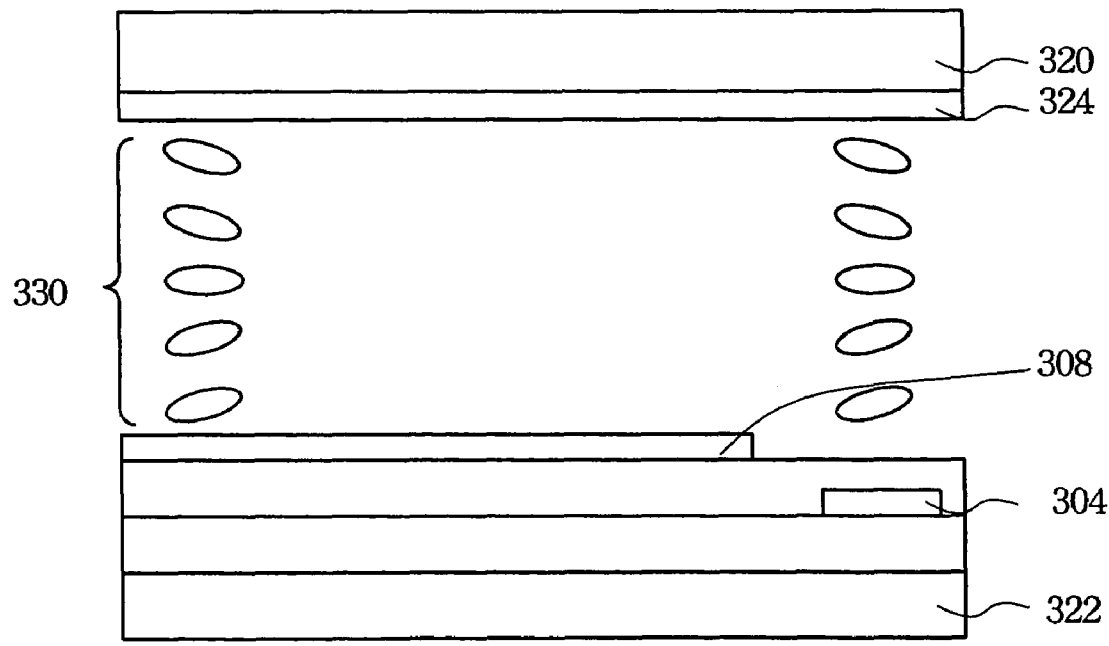
FIG. 2C illustrates a cross-sectional view along the BB' line of FIG. 2A, wherein all of the liquid crystal molecules are in the splay state.

Without limiting the spirit and scope of the present invention, the circuit structure proposed in the present invention is illustrated with one preferred embodiment. One with ordinary skill in the art, upon acknowledging the embodiment, can apply the pixel electrode structure using the OCB mode and the operation method of the present invention to various liquid crystal displays. In accordance with the pixel structure, a complicated manufacturing process can be avoided because the pixel region does not require two orientation states in a liquid crystal cell. Moreover, the present invention does not require a given period for transforming the liquid crystal molecule from the splay state into the bend state at the start of LCD operation. Therefore, LCDs using the pixel structure of the present invention have a high speed response as well as a high display quality. The application of the present invention is not limited by the preferred embodiments described in the following.

In accordance with the present invention, a metal electrode is built in the pixel region. The metal electrode is controlled by the common electrode. The liquid crystal molecules in the entire pixel region are in the splay state. A voltage is applied to the metal electrode to transform the liquid crystal molecule over the metal electrode from the splay state into the bend state during operation. Then, a voltage is applied to the pixel electrode. At this time, the liquid crystal molecules in the bend state transform the liquid crystal molecule over the pixel electrode from the splay state into the bend state. Therefore, the liquid crystal molecule in the whole pixel region exhibit the bend state.

The First Embodiment

FIG. 3A shows a top view of the pixel region in accordance with the first embodiment of the present invention. The silicon island 506a of the switch transistor 506 is connected to the scan line 502. When the switch transistor 506 is selected, a scan signal is sent via the scan line 502 to turn the switch transistor 506 on. The video signal in the video data line 504 is transferred to the pixel electrode 508 through the switch transistor 506. The drain electrode 506b of the switch transistor 506 is connected to the pixel electrode 508. The source electrode 506c of the switch transistor 506 is connected to the video data line 504. A common electrode line 510 is used as the common electrode of the pixel electrode 508. An "S"-type metal electrode 512 is built around the pixel region. The metal electrode 512 is controlled by the common electrode line 510.

Typically, the source electrode 506c and the drain electrode 506b of the switch transistor 506 can receive video data from the video data line 504. Therefore, by scanning the scan lines 502 and in accordance with the scan signals, the switch transistors 506 in a given scan line 502 are turned on. At the same time, video signals in the video data line 504 are transferred to the pixel electrode 508 through the switch transistor 506 to show a picture on the liquid crystal display.

FIG. 3B shows a cross-sectional view along line AA' of FIG. 3A, in which all of the liquid crystal molecule are in the splay state. A lower substrate 514 and an upper substrate 516 are opposite each other with a specific distance therebetween. The lower substrate 514 and the upper substrate 516 are preferably made of a transparent insulator. A liquid crystal layer 518 having a plurality of liquid crystal molecules is sandwiched between the lower substrate 514 and the upper substrate 516, in which the plurality of liquid crystal molecules is in the splay state. The video data line 504 and the metal line 512 are sequentially formed over the lower substrate 514. An isolation layer 530 is located between the video data line 504 and the metal line 512. A pixel electrode 508 is formed on the inner surface of the lower substrate 514. Another isolation layer 532 is located between the video data line 504 and the pixel electrode 508. A conductor electrode 520 is formed on an inner surface of the upper substrate 516. Both the pixel electrode 508 and the conductor electrode 520 are formed from a transparent conductor, and preferably, for example, an ITO material. Further, alignment layers (not shown in figure) are formed on an inner surface of the lower substrate 514 whereon the pixel electrode 508 is disposed and the upper substrate 516 whereon the conductor electrode 520 is disposed. Herein, the alignment layers have a pre-tilt angle of about 5 degrees in the splay state.

Figure 3C:
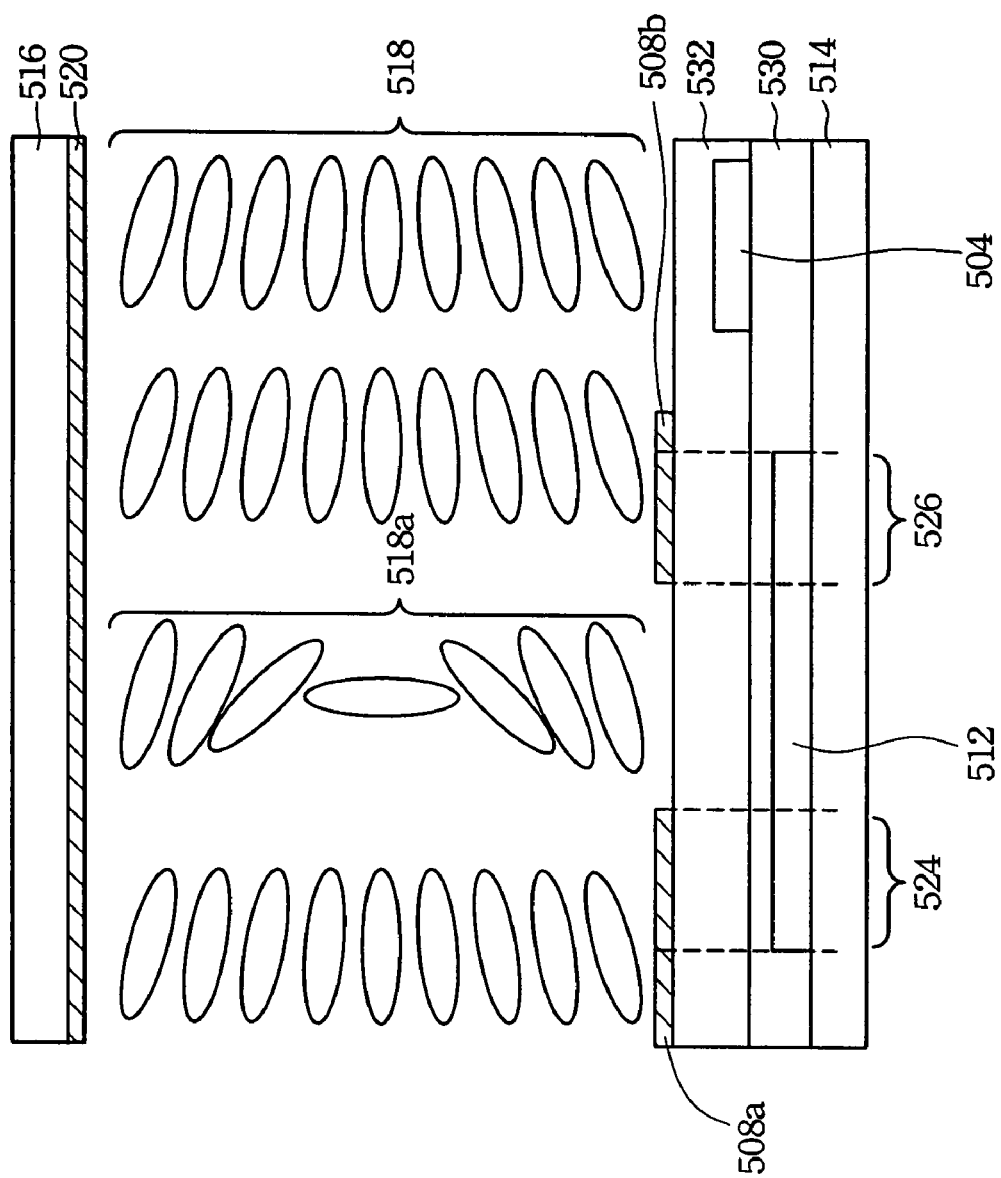
FIG. 3C illustrates a cross-sectional view from the AA' line of FIG. 3A, in which some of the liquid crystal molecules are transformed into the bend state.

A voltage is applied to the metal electrode 512 to transform the liquid crystal molecule over the metal electrode 512 from the splay state into the bend state during operation as shown in FIG. 3C. FIG. 3C shows a cross-sectional view along line AA' of FIG. 3A, in which parts of the liquid crystal molecule are transformed into the bend state. In accordance with the first embodiment, a voltage is applied between the common electrode 510 and the conductor electrode 520 located on the upper substrate 516. Therefore, a voltage difference also exists between the metal electrode 512 controlled by the common electrode 510 and the conductor electrode 520. Therefore, the liquid crystal molecule between the metal electrode and the upper substrate 516 is transformed from splay state into bend state due to the voltage difference.

Further reference is made to FIG. 3C. The pixel electrode 508 is divided into two parts, 508a and 508b. A liquid crystal molecule 518a in bend state is used to divide the two parts 508a and 508b. It is noted that this liquid crystal molecule 518a has an isolating function. The voltage difference between the metal electrode 512 and the conductor electrode 520 still exists after the voltage difference between the pixel electrode and the conductor electrode 520 is created. In other words, this still-existing voltage difference ensures that the liquid crystal molecules 518a remain in the bend state. Therefore, the liquid crystal molecules 518a isolate influence from outside of the pixel electrode in which the liquid crystal molecule is in a splay state. When the liquid crystal display is turned off, the voltage applied to the common electrode 510 is removed. At this time, the liquid crystal molecule between the common electrode 510 and the metal electrode 512 is transformed from the bend state into the splay state.

Reference is made to FIG. 3A again. During operation, the liquid crystal molecule between the common electrode 510 and the metal electrode 512 is first transformed from the original splay state into the bend state before a voltage is applied to pixel electrode 508. Next, by scanning the scan lines 502 and in accordance with the scan signals, the switch transistor 506 in a given scan line 502 is turned on. At the same time, video signals in the video data line 504 are transferred to the pixel electrode 508 through the switch transistor 506. In other words, a voltage difference is created between the pixel electrode 508 and the conductor electrode 520 in the upper substrate 516. At this time, the liquid crystal molecule in the pixel region are transformed from the splay state into the bend state. Therefore, the liquid crystal molecules in the whole liquid crystal region are in the bend state. On the other hand, part of the metal electrode 512 may overlap with the pixel electrode 508. The overlapping part then functions as a capacitor, which raises the response velocity of the pixel electrode.

The Second Embodiment

FIG. 4A shows a top view of the pixel region in accordance with the second embodiment of the present invention. The silicon island 706a of the switch transistor 706 is connected to the scan line 702. When the switch transistor 706 is selected, the scan signal in the scan line 702 turns on the switch transistor 706. The video signal in the video data line 704 is transferred to the pixel electrode 708 through the switch transistor 706. The drain electrode 706b of the switch transistor 706 is connected to the pixel electrode 708. The source electrode 706c of the switch transistor 706 is connected to the video data line 704. A common electrode line 710 is used as the common electrode of the pixel electrode 708. A metal electrode 712 is built around the pixel region. The metal electrode 712 is controlled by the common electrode line 710.

FIG. 4B shows a cross-sectional view along line AA' of FIG. 4A. A lower substrate 714 and an upper substrate 716 are opposite each other with a specific distance therebetween. The lower substrate 714 and the upper substrate 716 are preferably made of a transparent insulator. A liquid crystal layer 718 having a plurality of liquid crystal molecules is sandwiched between the lower substrate 714 and the upper substrate 716, in which the plurality of liquid crystal molecules is in the splay state. The video data line 704 and the metal line 712 are sequentially formed over the lower substrate 714. An isolation layer 730 is located between the video data line 704 and the metal line 712. A pixel electrode 708 is formed on the inner surface of the lower substrate 714. Another isolation layer 732 is located between the video data line 704 and the pixel electrode 708.

A conductor electrode 720 is formed on an inner surface of the upper substrate 716. Both the pixel electrode 708 and the conductor electrode 720 are formed from a transparent conductor, and preferably, for example, an ITO material. Further, alignment layers (not shown in figure) are formed on an inner surface of the lower substrate 714 whereon the pixel electrode 708 is disposed and the upper substrate 716 whereon the conductor electrode 720 is disposed. Herein, the alignment layers have a pre-tilt angle of about 5 degrees in the splay state.

Figure 4C:
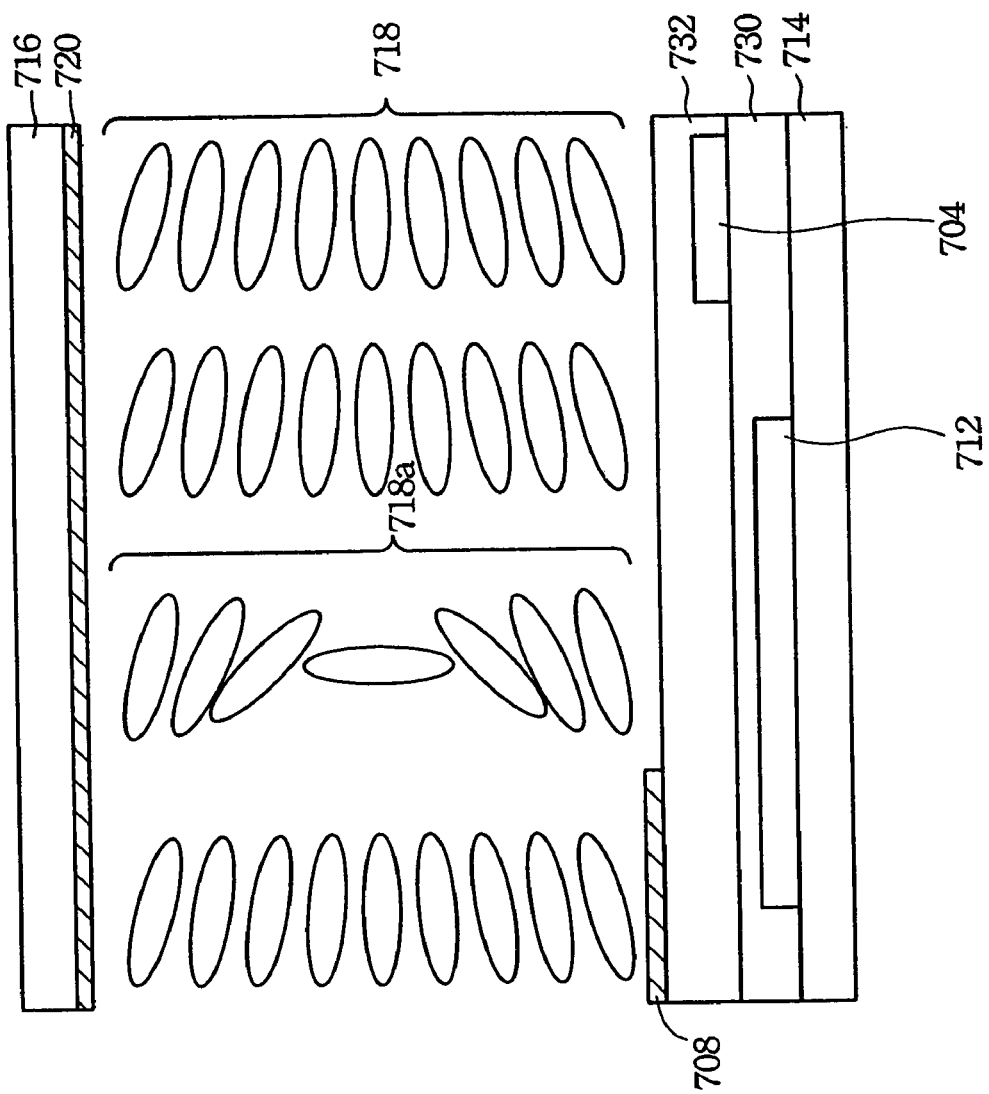
FIG. 4C illustrates a cross-sectional view along the AA' line of FIG. 4A, in which some of the liquid crystal molecules are transformed into the bend state.

A voltage is applied to the metal electrode 712 to transform the liquid crystal molecule 718a over the metal electrode 712 from the splay state into the bend state during operation as shown in FIG. 4C. FIG. 4C shows a cross-sectional view along line AA' of FIG. 4A in accordance with the second embodiment, in which parts of the liquid crystal molecule are transformed into the bend state. In accordance with the second embodiment, a voltage is applied between the common electrode 710 and the conductor electrode 720 located on the upper substrate 716. Therefore, a voltage difference also exists between the metal electrode 712 controlled by the common electrode 710 and the conductor electrode 720. Therefore, the liquid crystal molecule between the metal electrode 712 and the upper substrate 716 is transformed from the splay state into the bend state due to the voltage difference as shown in FIG. 4C.

Again referring to FIG. 4C, a liquid crystal molecule 718a, which is in bend state, is used to isolate the pixel electrode 708. The voltage difference between the metal electrode 712 and the conductor electrode 720 still exists after the voltage difference between the pixel electrode 708 and the conductor electrode 720 is built. In other words, this still-existant voltage difference ensures that the liquid crystal molecules 718a maintain the bend state. Therefore, the liquid crystal molecule 718a isolates the pixel electrode 708 from the influence outside of the pixel electrode 708 in which the liquid crystal molecule is in a splay state. When the liquid crystal display is turned off, the voltage applied to the common electrode 710 is removed. At this time, the liquid crystal molecule between the common electrode 710 and the metal electrode 712 can be transformed from the bend state into the splay state.

During operation, the liquid crystal molecule between the common electrode 710 and the metal electrode 712 is first transformed from the original splay state into the bend state before a voltage is applied to pixel electrode 708. Next, by scanning the scan lines 702 and in accordance with the scan signals, the switch transistor 706 in a given scan line 702 is turned on. At the same time, video signals in the video data line 704 are transferred to the pixel electrode 708 through the switch transistor 706. In other words, a voltage difference is created between the pixel electrode 708 and the conductor electrode 720 in the upper substrate 716. At this time, the liquid crystal molecule in the pixel region can be transformed from the splay state into the bend state. Therefore, the liquid crystal molecules in the whole liquid crystal region are in the bend state now. On the other hand, part of the metal electrode 712 may overlap with the pixel electrode 708. The overlapping part functions as a capacitor, which raises the response velocity of the pixel electrode.

The Third Embodiment

Figures 5A, 5B:
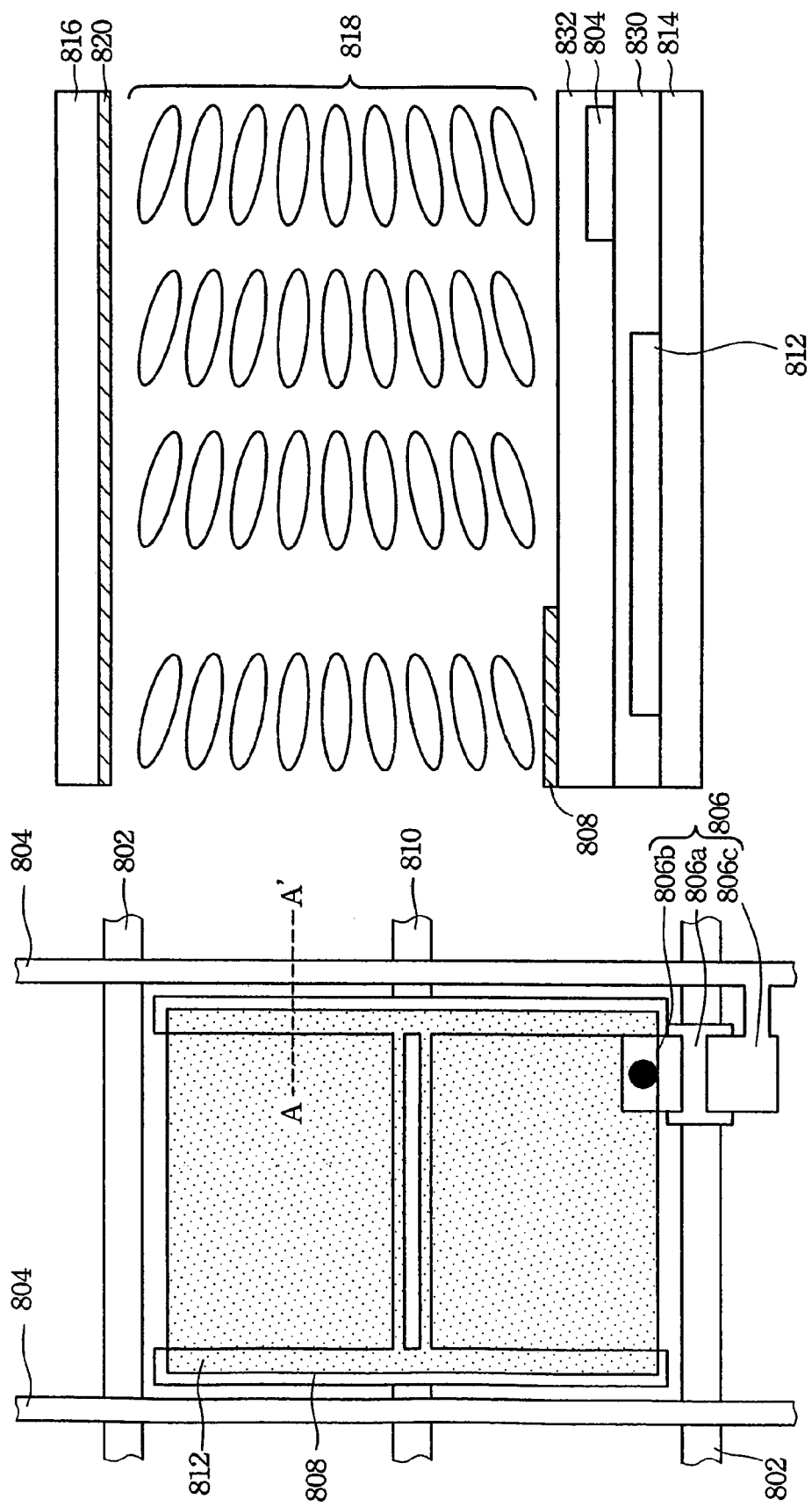
FIG. 5A illustrates a top view of the pixel region in accordance with the third embodiment of the present invention.
FIG. 5B illustrates a cross-sectional view from the AA' line of FIG. 5A, in which all of the liquid crystal molecule are in the splay state.

FIG. 5A shows a top view of the pixel region in accordance with the third embodiment of the present invention. The silicon island 806a of the switch transistor 806 is connected to the scan line 802. The drain electrode 806b of the switch transistor 806 is connected to the pixel electrode 808. The source electrode 806c of the switch transistor 806 is connected to the video data line 804. A common electrode line 810 is used as the common electrode of the pixel electrode 808. In accordance with the third embodiment, the metal electrode 812 and the common electrode 810 are in the shape of an "H". The metal electrode 812 is controlled by the common electrode line 810.

Figure 5C:
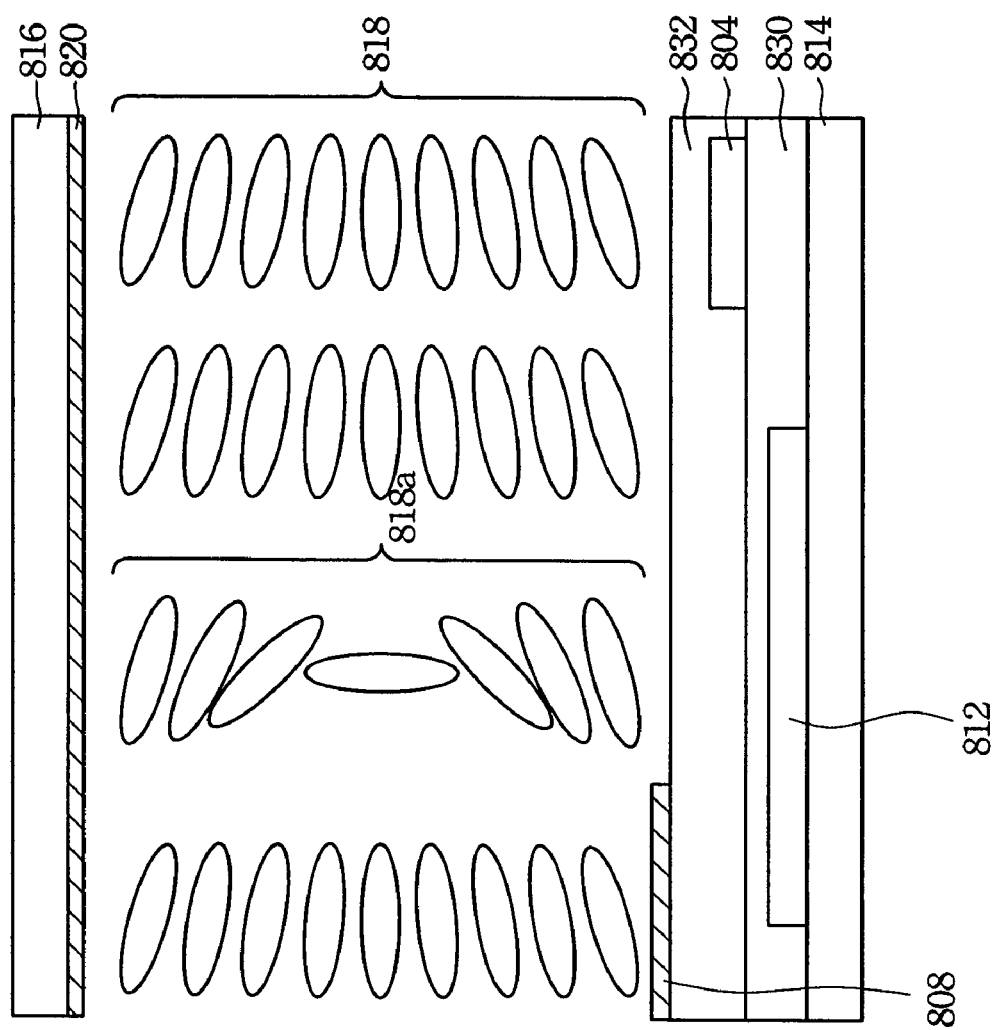
FIG. 5C illustrates a cross-sectional view from the AA' line of FIG. 5A, in which parts of the liquid crystal molecules are transformed into the bend state.

FIG. 5B shows a cross-sectional view along line AA' of FIG. 5A. A lower substrate 814 and an upper substrate 816 are opposite each other with a specific distance therebetween. The lower substrate 814 and the upper substrate 816 are preferably made of a transparent insulator. A liquid crystal layer 818 having a plurality of liquid crystal molecules is sandwiched between the lower substrate 814 and the upper substrate 816, in which the plurality of liquid crystal molecules is in the splay state. The video data line 804 and the metal line 812 are sequentially formed over the lower substrate 814. An isolation layer 830 is located between the video data line 804 and the metal line 812. A pixel electrode 808 is formed on the inner surface of the lower substrate 814. Another isolation layer 832 is located between the video data line 804 and the pixel electrode 808. A conductor electrode 820 is formed on an inner surface of the upper substrate 816. Both the pixel electrode 808 and the conductor electrode 820 are formed from a transparent conductor, and preferably, for example, an ITO material. Further, alignment layers (not shown in figure) are formed on an inner surface of the lower substrate 814 whereon the pixel electrode 31 is disposed and the upper substrate 816 whereon the conductor electrode 820 is disposed. Herein, the alignment layers have a pre-tilt angle of about 5 degrees in the splay state. During operation, a voltage is applied to the metal electrode 812 to transform the liquid crystal molecule 818a over the metal electrode 812 from the splay state into the bend state as shown in FIG. 5C.

Referring to FIG. 5C again, a liquid crystal molecule 818a, which is in the bend state, is used to isolate the pixel electrode 808. In other words, the voltage difference between the metal electrode 812 and the conductor electrode 820 still exists after the voltage difference between the pixel electrode 808 and the conductor electrode 820 is created. In other words, this still-existant voltage difference ensures that the liquid crystal molecule 818a maintains the bend state. Therefore, the liquid crystal molecule 818a isolates the pixel electrode 808 from influence from outside of the pixel electrode 808 in which the liquid crystal molecules are in a splay state. When the liquid crystal display is turned off, the voltage applied to the common electrode 810 is removed. At this time, the liquid crystal molecule between the common electrode 810 and the metal electrode 812 is transformed from the bend state into the splay state.

During operation, the liquid crystal molecule between the common electrode 810 and the metal electrode 812 is first transformed from the original splay state into the bend state before a voltage is applied to pixel electrode 808. Next, by scanning the scan lines 802 and in accordance with the scan signals, the switch transistor 806 in a given scan line 802 is turned on. At the same time, video signals in the video data line 804 are transferred to the pixel electrode 808 through the switch transistor 806. In other words, a voltage difference is built between the pixel electrode 808 and the conductor electrode 820 in the upper substrate 816. At this time, the liquid crystal molecule in the pixel region can be transformed from the splay state into the bend state. Therefore, the liquid crystal molecule in the whole liquid crystal region is now in the bend state. On the other hand, part of the metal electrode 812 overlaps the pixel electrode 808. The overlapping part functions as a capacitor, which can raise the response velocity of the pixel electrode.

The Fourth Embodiment

Figures 6A, 6B:
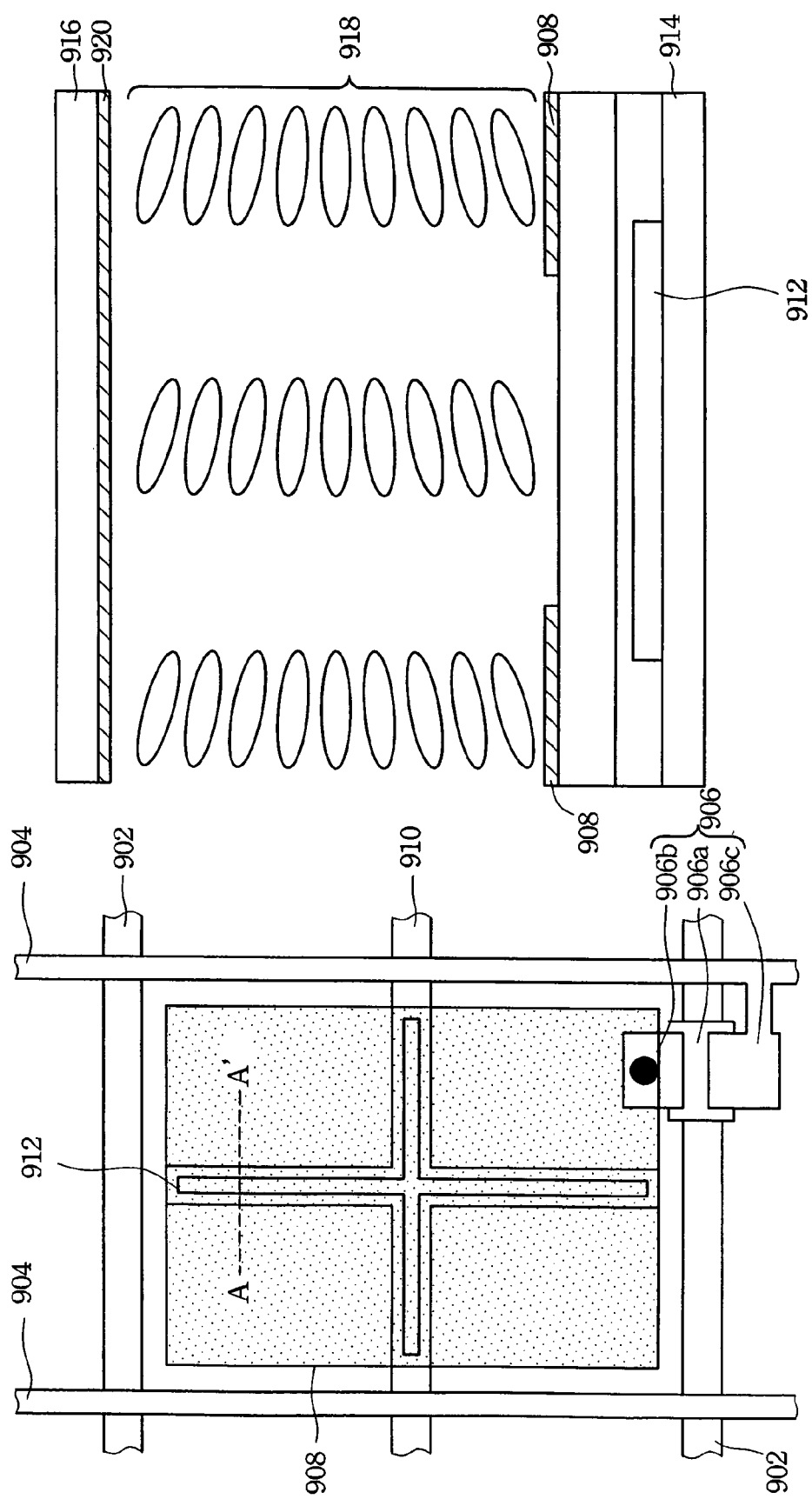
FIG. 6A illustrates a top view of the pixel region in accordance with the fourth embodiment of the present invention.
FIG. 6B illustrates a cross-sectional view from the AA' line of FIG. 6A, in which all of the liquid crystal molecules are in the splay state.
Figure 6C:
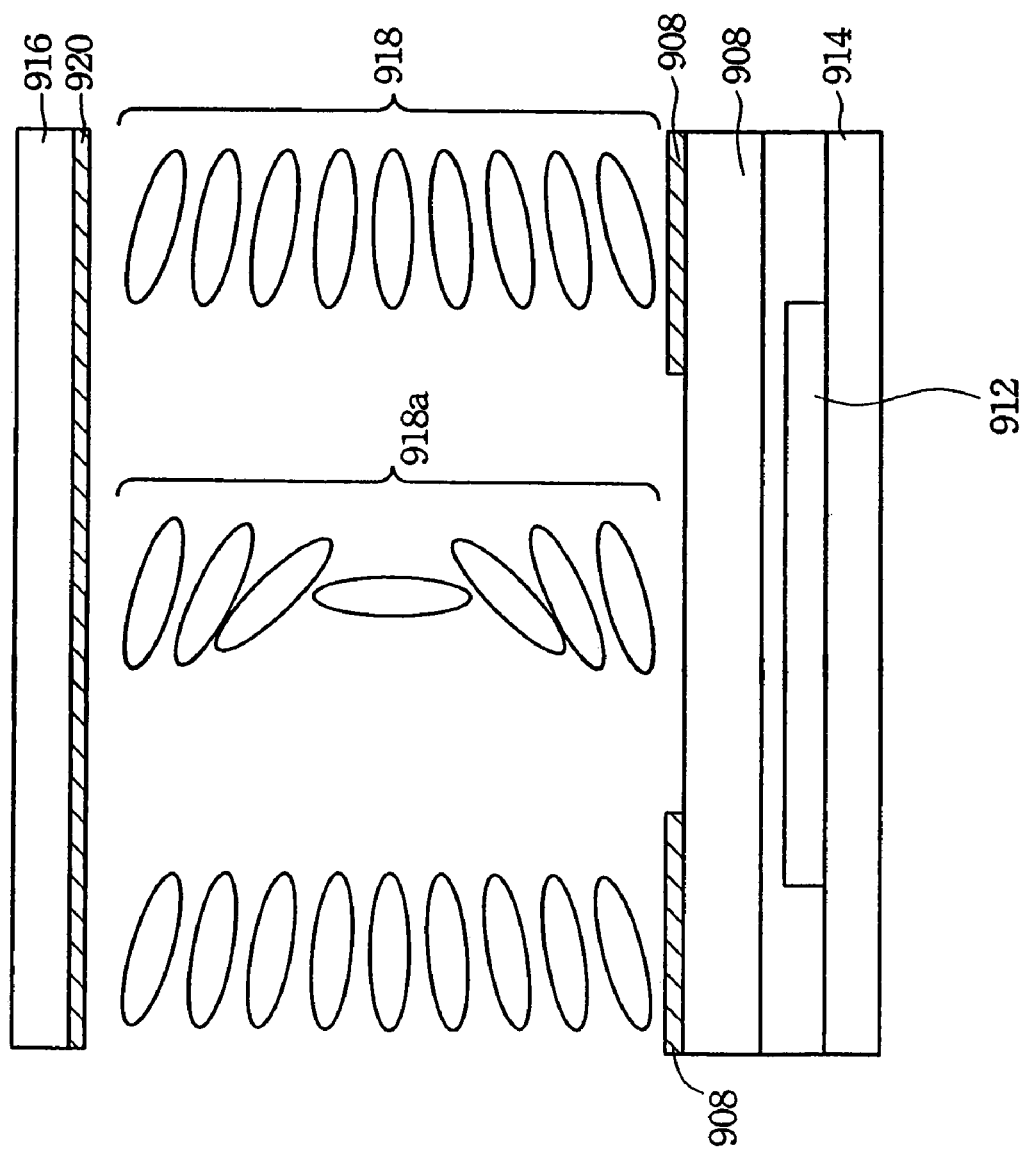
FIG. 6C illustrates a cross-sectional view from the AA' line of FIG. 6A, in which some of the liquid crystal molecules are transformed into the bend state.

FIG. 6A shows a top view of the pixel region in accordance with the fourth embodiment of the present invention. The silicon island 906a of the switch transistor 906 is connected to the scan line 902. The drain electrode 906b of the switch transistor 906 is connected to the pixel electrode 908. The source electrode 906c of the switch transistor 906 is connected to the video data line 904. A common electrode line 910 is used as the common electrode of the pixel electrode 909. In accordance with the fourth embodiment, the metal electrode 912 and the common electrode 910 are in the shape of a cross. The metal electrode 912 is controlled by the common electrode line 910.

FIG. 6B shows a cross-sectional view along line AA' of FIG. 5A. A lower substrate 914 and an upper substrate 916 are opposite each other with a specific distance therebetween. The lower substrate 914 and the upper substrate 916 are preferably made of a transparent insulator. A liquid crystal layer 918 having a plurality of liquid crystal molecules is sandwiched between the lower substrate 914 and the upper substrate 916, wherein the plurality of liquid crystal molecules is in the splay state. The video data line 904 and the metal line 912 are sequentially formed over the lower substrate 914. An isolation layer 930 is located between the video data line 904 and the metal line 912. A pixel electrode 908 is formed on the inner surface of the lower substrate 914. Another isolation layer 932 is located between the video data line 904 and the pixel electrode 908. A conductor electrode 920 is formed on an inner surface of the upper substrate 916. Both the pixel electrode 908 and the conductor electrode 920 are formed from a transparent conductor, and preferably, for example, an ITO material. Further, alignment layers (not shown in figure) are formed on an inner surface of the lower substrate 914 whereon the pixel electrode 31 is disposed and the upper substrate 916 whereon the conductor electrode 920 is disposed. Herein, the alignment layers have a pre-tilt angle of about 5 degrees in the splay state.

Referring to FIG. 5C again, a liquid crystal molecule 918a, which is in the bend state, is used to isolate the pixel electrode 908. In other words, the voltage difference between the metal electrode 912 and the conductor electrode 920 still exists after the voltage difference between the pixel electrode 908 and the conductor electrode 920 is created. This still-existant voltage difference ensures that the liquid crystal molecule 918a maintains the bend state. Therefore, the liquid crystal molecule 918a isolates pixel electrode 908 from the influence the outside of the pixel electrode 908 in which the liquid crystal molecule is in a splay state. When the liquid crystal display is turned off, the voltage applied to the common electrode 910 is removed. At this time, the liquid crystal molecule between the common electrode 910 and the metal electrode 912 is transformed from the bend state into the splay state.

During operation, the liquid crystal molecule between the common electrode 910 and the metal electrode 912 is first transformed from the original splay state into the bend state before a voltage is applied to pixel electrode 909. Next, by scanning the scan lines 902 and in accordance with the scan signals, the switch transistor 906 in a given scan line 902 is turned on. At the same time, video signals in the video data line 904 are transferred to the pixel electrode 908 through the switch transistor 906. In other words, a voltage difference is created between the pixel electrode 908 and the conductor electrode 920 in the upper substrate 916. At this time, the liquid crystal molecules in the pixel region are transformed from the splay state into the bend state. Therefore, the liquid crystal molecules in the whole liquid crystal region are now in the bend state. On the other hand, part of the metal electrode 912 overlaps with the pixel electrode 908. The overlapping part functions as a capacitor, which can raise the response velocity of the pixel electrode.

It is noted that the common electrode line with the connected metal electrode line and the video data line are located on different layers according to the foregoing four embodiments. However, the common electrode line with the connected metal electrode line and the video data line can be located on the same layer in another embodiments. For example, FIG. 7A and FIG. 7B illustrate the structure of the common electrode line with the connected metal electrode line and the video data line, described in the first embodiment, are located on the same layer.

Figures 7A, 7B:
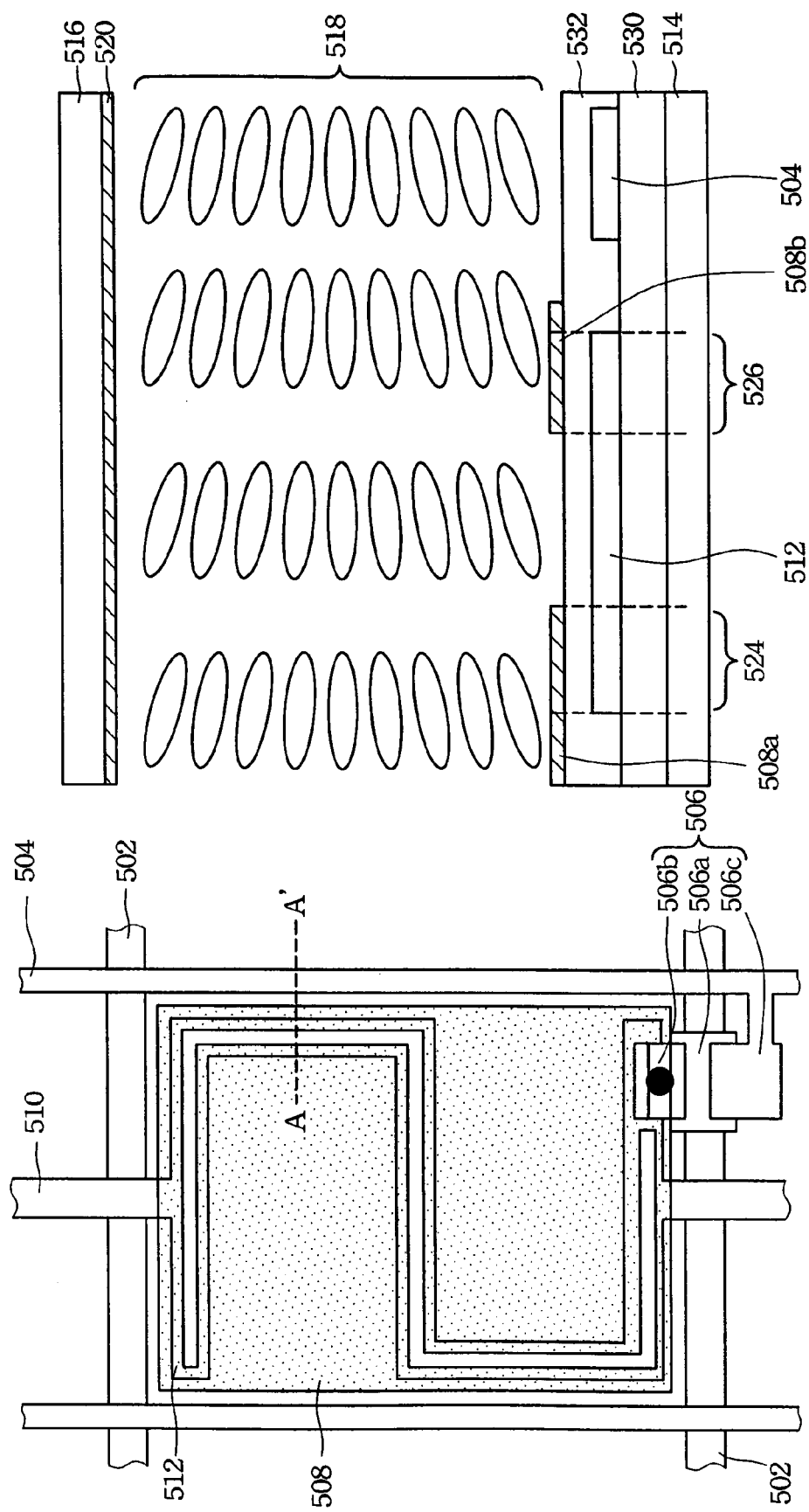
FIG. 7A illustrates a top view of a pixel region that the common electrode line with connected metal line and the video data line are arranged in the same layer.
FIG. 7B illustrates a cross-sectional view from the AA' line of FIG. 7A, in which some of the liquid crystal molecules are transformed into the bend state.

In FIG. 7A, the silicon island 506a of the switch transistor 506 is connected to the scan line 502. When the switch transistor 506 is selected, a scan signal is sent via the scan line 502 to turn the switch transistor 506 on. The video signal in the video data line 504 is transferred to the pixel electrode 508 through the switch transistor 506. The drain electrode 506b of the switch transistor 506 is connected to the pixel electrode 508. The source electrode 506c of the switch transistor 506 is connected to the video data line 504. A common electrode line 510 is used as the common electrode of the pixel electrode 508. The common electrode line 510 is arranged in parallel with the video data line 504. An "S"-type metal electrode 512 is built around the pixel region. The metal electrode 512 is controlled by the common electrode line 510. The common electrode line with the connected metal electrode line and the video data line are located on the same layer.

FIG. 7B shows a cross-sectional view along line AA' of FIG. 7A, in which all of the liquid crystal molecule are in the splay state. A lower substrate 514 and an upper substrate 516 are opposite each other with a specific distance therebetween. The lower substrate 514 and the upper substrate 516 are preferably made of a transparent insulator. A liquid crystal layer 518 having a plurality of liquid crystal molecules is sandwiched between the lower substrate 514 and the upper substrate 516, in which the plurality of liquid crystal molecules is in the splay state. The video data line 504 and the metal line 512 are formed over the lower substrate 514 and located on the same layer but isolated from each other. A pixel electrode 508 is formed on the inner surface of the lower substrate 514. Another isolation layer 532 is located between the video data line 504, the metal line 512 and the pixel electrode 508. A conductor electrode 520 is formed on an inner surface of the upper substrate 516. Both the pixel electrode 508 and the conductor electrode 520 are formed from a transparent conductor, and preferably, for example, an ITO or IZO material.

The structure of the common electrode line with the connected metal line and the video data line are located on the same layer can be applied in the foregoing four embodiments.

In accordance with the foregoing description, an additional metal electrode is built in the pixel region. The metal electrode is controlled by the common electrode. The liquid crystal molecules in the whole pixel region are in the splay state. During operation, a voltage is first applied to the metal electrode to transform the liquid crystal molecule over the metal electrode from the splay state into the bend state.

Then, a voltage is applied to the pixel electrode to make the whole pixel region exhibit the bend state.

It is noted that the metal electrode can be positioned in the center of the pixel electrode or around the pixel electrode. The metal electrode and the common electrode can be in the shape of a cross or in the shape of an "H". In accordance with the present invention, a complicated manufacturing process is avoided because the present invention does not require two orientation states in a liquid crystal cell. Moreover, a given period for transforming the liquid crystal molecule from the splay state into the bend state at the start of LCDs operation is not necessary. Therefore, the LCDs using the pixel structure of the present invention has a high speed response as well as a high display quality.

On the other hand, the present invention also provides a drive circuit for driving the metal electrode. FIG. 8A shows a waveform from negative to positive of drive timing in accordance with the first embodiment. The waveform can be used in the foregoing four embodiments. According to FIGS. 3A to 3C and FIG. 8A, a voltage signal 404 is first applied to the common electrode 510. Therefore, the metal electrode 512 controlled by the common electrode is also applied by this voltage signal 404. At this time, the liquid crystal molecule located over the metal electrode 512 is transformed from the splay state into the bend state. On the other hand, part of the metal electrode 512 overlaps with the pixel electrodes 508a and 508b and a voltage exists in the metal electrode 512, as shown in FIGS. 3B and 3C. All the metal electrode and pixel electrodes 508a and 508b are conductors. Therefore, the overlapping parts 524 and 526 can function as capacitors. In other words, this voltage applied to the metal electrode 512 charges these overlapping parts 524 and 526 to raise the electrical potential of the pixel electrode.

At time $T_1$, by scanning the scan lines 502 and in accordance with the scan signals 402, the switch transistor 506 in a given scan line 502 is turned on. At the same time, pixel electrical potential 406 in the video data line 504 is transferred to the pixel electrode 508 through the switch transistor 506. In other words, a voltage difference is created between the pixel electrode 508 and the conductor electrode 520 in the upper substrate 516 to transform the liquid crystal molecule from the splay state into the bend state. It is noted that because the overlapping parts 524 and 526 function as a capacitor, an initial electric potention exists in the pixel electrode 508. In other words, it is easier to create a voltage in the pixel electrode 508 for transforming the liquid crystal molecule from the splay state into the bend state. Therefore, the response velocity can be raised.

FIG. 8B shows a waveform from positive to negative of drive timing. The waveform may be used in the foregoing four embodiments. According to FIGS. 3A to 3C and FIG. 8B, a voltage signal 408 applied to the common electrode 510 is first switched from a high voltage to a low voltage. Therefore, the metal electrode 512 controlled by the common electrode is also in a low voltage state. On the other hand, part of the metal electrode 512 overlaps with the pixel electrodes 508a and 508b as shown in FIGS. 3B and 3C. All of the metal electrode, pixel electrodes 508a and 508b are conductors. Therefore, the overlapping parts 524 and 526 function as a capacitor. Therefore, when the metal electrode 512 is in a low electrical potential, the electrical potential 410 of the pixel electrodes 508a and 508b is also reduced to a specific value at time $T_2$. However, because the scan signal 412 does not select the switch transistor 506 at this time, the switch transistor 506 is still turned off. In other words, the electrical potential 410 of the pixel electrodes 508a and 508b is maintained at a fixed value. At time $T_3$, when the scan signal 412 in the scan line 502 selects the switch transistor 506, the switch transistor 506 is turned on. The potential of the pixel electrodes 508a and 508b is discharged through the switch transistor 506 to reduce the electrical potential 410.

FIG. 9A and FIG. 9B are the waveforms in accordance with the second embodiment, of which FIG. 9A shows a waveform from positive to negative of drive timing. The waveform may be used in the foregoing four embodiments. According to FIGS. 3A to 3C and FIG. 9A, by scanning the scan lines 502 and in accordance with the scan signals 602, the switch transistor 506 in a given scan line 502 is turned on. At the same time, pixel electrical potential 606 in the video data line 504 is transferred to the pixel electrode 508 through the switch transistor 506. Next, at time $T_1$, a voltage signal 604 is transformed from a low electrical potential to a high electrical potential. In other words, the common electrode is also in a high electrical potential. Therefore, the metal electrode 512 controlled by the common electrode 510 is also in a high electrical potential that transforms the liquid crystal molecule from the splay state into the bend state.

On the other hand, part of the metal electrode 512 overlaps with the pixel electrodes 508a and 508b and a voltage exists in the metal electrode 512, as shown in FIGS. 3B and 3C. All of the metal electrode and pixel electrodes 508a and 508b are conductors. Therefore, the overlapping parts 524 and 526 function as a capacitor. In other words, this voltage applied to the metal electrode 512 charges these overlapping parts 524 and 526 to raise the electrical potential 606 of the pixel electrode. It is easier to create a voltage in the pixel electrode 508 for transforming the liquid crystal molecule from the splay state into the bend state.

FIG. 9B shows the waveform from positive to negative of drive timing in accordance with the second embodiment. The waveform may be used in the foregoing four embodiments. According to FIGS. 3A to 3C and 9B, by scanning the scan lines 502 and in accordance with the scan signals 612, the switch transistor 506 in a given scan line 502 is turned on to reduce the pixel electrical potential 610. On the other hand, part of the metal electrode 512 overlaps with the pixel electrodes 508a and 508b as shown in FIGS. 3B and 3C. The overlapping parts 524 and 526 function as a capacitor. This capacitor function maintain the pixel electrical potential of the pixel electrode 508 at a fixed value. At time $T_2$, the voltage signal 608 in the common electrode 510 is transferred from a high electrical potential to a low electrical potential. The metal electrode 512 controlled by the common electrode 510 is also at a low electrical potential, which discharges the charge stored in the overlapping parts 524 and 526 to reduce the pixel electrical potential 610 of the pixel electrode 508.

Figure 10B:
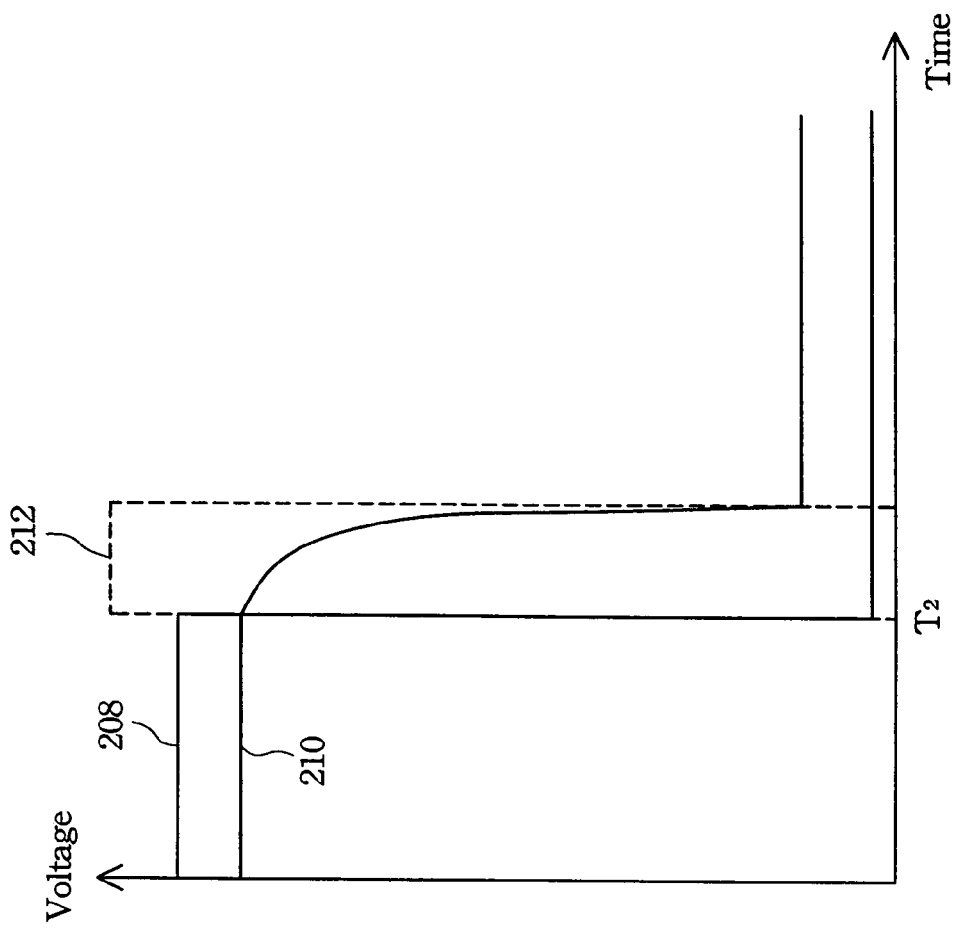
FIG. 10B illustrates a waveform from positive to negative of drive timing in accordance with the third embodiment.
Figure 10A:
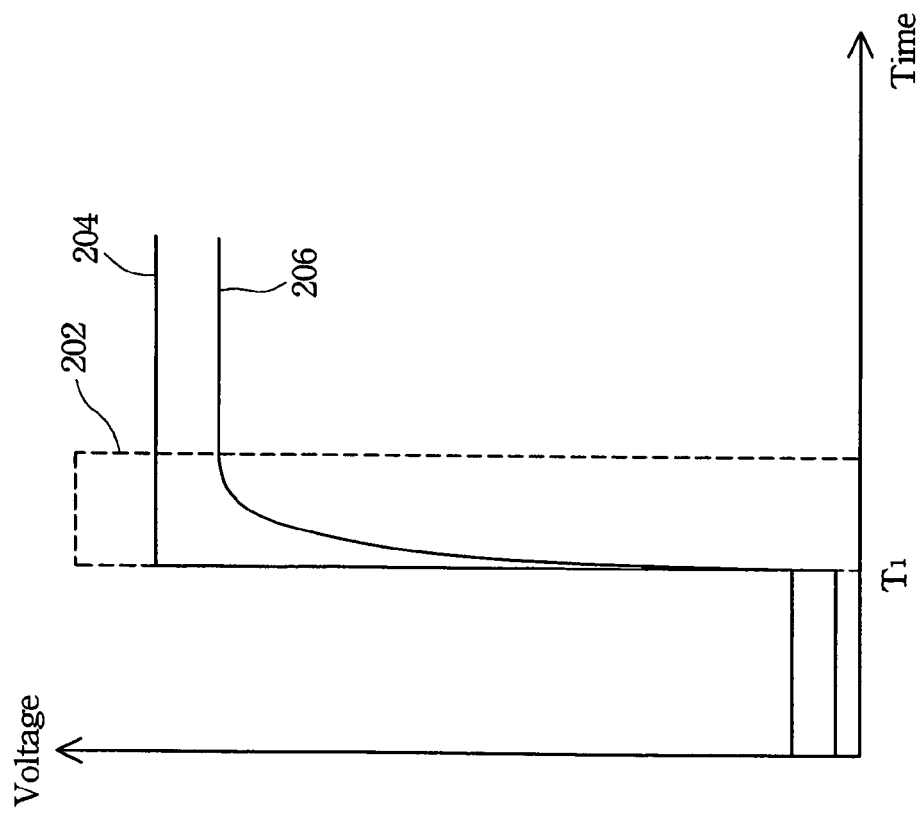
FIG. 10A illustrates a waveform from negative to positive of drive timing in accordance with the third embodiment.

FIG. 10A and FIG. 10B are the waveforms in accordance with the third embodiment, in which FIG. 10A shows a waveform from positive to negative of drive timing. The waveform may be used in the foregoing four embodiments. According to FIGS. 3A to 3C and 9A, by scanning the scan lines 502 and in accordance with the scan signals 202, the switch transistor 506 in a given scan line 502 is turned on at time $T_1$. Next, pixel electrical potential 206 in the video data line 504 is transferred to the pixel electrode 508 through the switch transistor 506. At the same time, a voltage signal 204 is transformed from a low electrical potential into a high electrical potential. In other words, the common electrode is also at a high electrical potential. Therefore, the metal electrode 512 controlled by the common electrode 510 is also at a high electrical potential to transform the liquid crystal molecule from the splay state into the bend state.

On the other hand, part of the metal electrode 512 overlaps with the pixel electrodes 508a and 508b, as shown in FIGS. 3B and 3C. All the metal electrodes and pixel electrodes 508a and 508b are conductors. The overlapping parts 524 and 526 function as a capacitor. Therefore, this voltage applied to the metal electrode 512 charges these overlapping parts 524 and 526 to raise the electrical potential 206 of the pixel electrode. It is easier to build a voltage in the pixel electrode 508 for transforming the liquid crystal molecule from the splay state into the bend state.

FIG. 10B shows a waveform from positive to negative of drive timing in accordance with the third embodiment. The waveform may be used in the foregoing four pixel structure embodiments. According to FIGS. 3A to 3C and 8B, by scanning the scan lines 502 and in accordance with the scan signals 212, the switch transistor 506 in a given scan line 502 is turned on to reduce the pixel electrical potential 210 at time $T_2$. At this time, the voltage signal 208 in the common electrode 510 is transformed from a high electrical potential in to a low electrical potential. The metal electrode 512 controlled by the common electrode 510 is also at a low electrical potential. On the other hand, part of the metal electrode 512 overlaps with the pixel electrodes 508a and 508b as shown in FIGS. 3B and 3C. The overlapping parts 524 and 526 function as a capacitor. Because the electrical potential in the common electrode 510 is at a low electrical potential, the charge stored in the overlapping parts 524 and 526 is discharged to reduce the pixel electrical potential 210 of the pixel electrode 508.

In accordance with the pixel structure of the present invention, part of the metal electrode overlaps with the pixel electrodes to function as a capacitor, which raises the response velocity.

Figure 11:
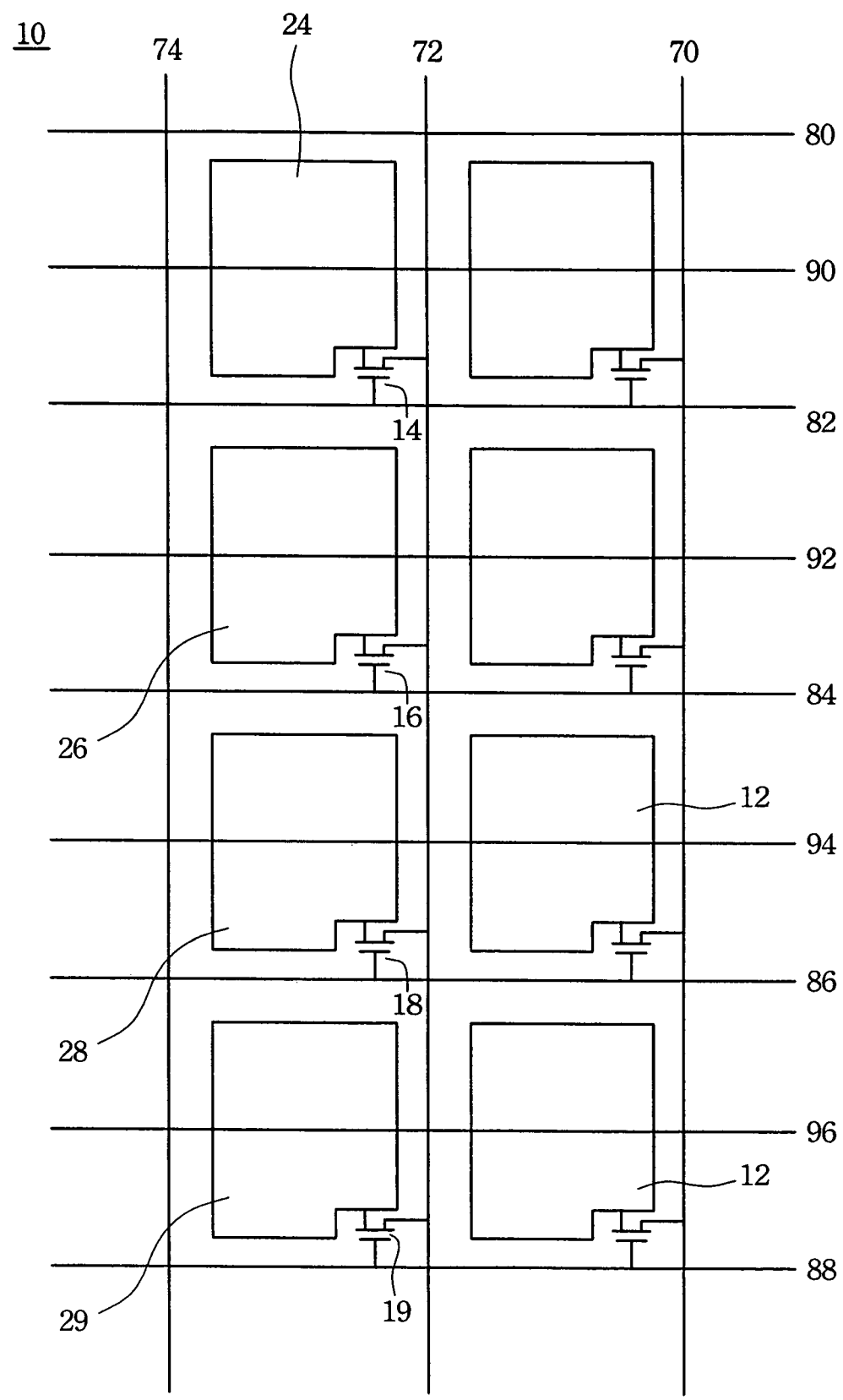
FIG. 11 illustrates a top view of using the pixel electrode structure of the present invention to a TFT-LCDs.

FIG. 11 shows a top view of using the pixel electrode structure of the present invention in a TFT-LCD, in which the foregoing four pixel structures may be used in the embodiment. The gate electrodes of the switch transistors 14, 16, 18 and 19 are respectively connected to the scan lines 82, 84, 86 and 88. The drain electrodes of the switch transistor 14, 16, 18 and 19 are respectively connected to the pixel electrodes 24, 26, 28 and 19 and the source electrodes are respectively connected to the video data line 72. The common lines 90, 92, 94 and 96 are used as the common electrode of the pixel electrode 24, 26, 28 and 19, respectively, to control the metal electrodes (not shown in figure). When the switch transistor 14 is selected by a given scan line, the video signals provided in the video data lines 72 are transferred to the pixel electrode 24 through the switch transistor 14 to show a picture in the display.

Figure 12A:
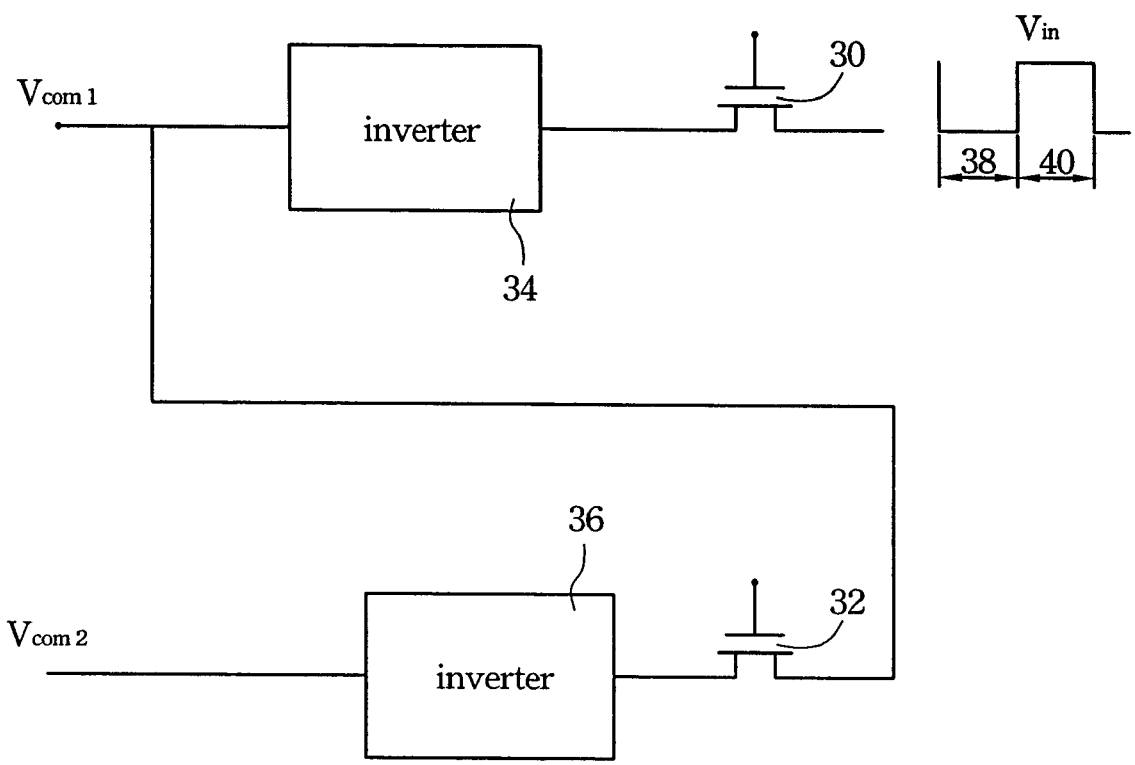
FIG. 12A illustrates a drive circuit schematic diagram for generating a drive voltage.

FIG. 12A shows a drive circuit schematic diagram for generating a waveform as shown in FIGS. 8A and 8B for application to the pixel structure as shown in FIG. 11. It is noted that FIG. 12A only depicts the common electrode for driving two different pixel electrodes. However, this drive circuit may be extending for driving the whole pixel structure. The drive method is same as is described in the following.

Referring to FIG. 11 and FIG. 12A, in accordance with the drive circuit of the present invention, the voltage signal in the output end $V_{com1}$ is used to drive the common electrode 92 and the voltage signal in the output end $V_{com2}$ is used to drive the common electrode 94. The switch of transistor 30 is controlled by the scan line 82 and the switch of transistor 32 is controlled by the scan line 84. An inverter 34 is located between the transistor 30 and the output end $V_{com1}$ to invert the input signal from the transistor 30. Another inverter 36 is located between the transistor 32 and the output end $V_{com2}$ to invert the signal in the output end $V_{com1}$.

During operation, a frame signal $V_{in}$ composed of two fields 38 and 40 is input from the transistor 30, in which the time of each field is 1/60 second. When the transistor 30 is turned on by the scan line 82, the first field signal 38 is transferred to the inverter 34 through the transistor 30. The inverter 34 inverts the first field signal 38 and sends out the inverted first field signal 38 from the output end $V_{com1}$ to drive the common electrode 92. Next, when the scan line 84 turns on the transistor 32, the inverted first field signal 38 is transferred to the inverter 36 through the transistor 32. The inverter 36 inverts the received signal again and sends out the same from the output end $V_{com2}$ to drive the common electrode 94.

Therefore, in accordance with the waveform generated by the drive circuit of the present invention, the switch transistor 16 of the pixel electrode 26 is turned on by the scan signal in the scan line 84 after the common electrode 92 is driven by the drive signal from the output end $V_{com1}$. Therefore, the waveform shown in FIG. 7A is formed, in which the waveform 404 is the signal in the output end $V_{com1}$ and the waveform 402 is the signal in the scan line 84.

Next, when the transistor 30 receives the signal in the scan line 82 again, the second field signal 40 is transferred to the inverter 34 through the transistor 30. The inverter 34 may invert the second field signal 40 and sends out the inverted second field signal 40 from the output end $V_{com1}$ to drive the common electrode 92. Next, when the scan line 84 turns on the transistor 32, the inverted second field signal 40 is transferred to the inverter 36 through the transistor 32. The inverter 36 inverts the received signal again and sends out the same from the output end $V_{com2}$ to drive the common electrode 94.

Therefore, the switch transistor 16 of the pixel electrode 26 is turned on by the scan signal in the scan line 84 after the common electrode 92 receives the signal from the output end $V_{com1}$. The waveform shown in FIG. 8B is thus formed, in which the waveform 408 is the signal in the output end $V_{com1}$ and the waveform 412 is the signal in the scan line 84.

Figure 12B:
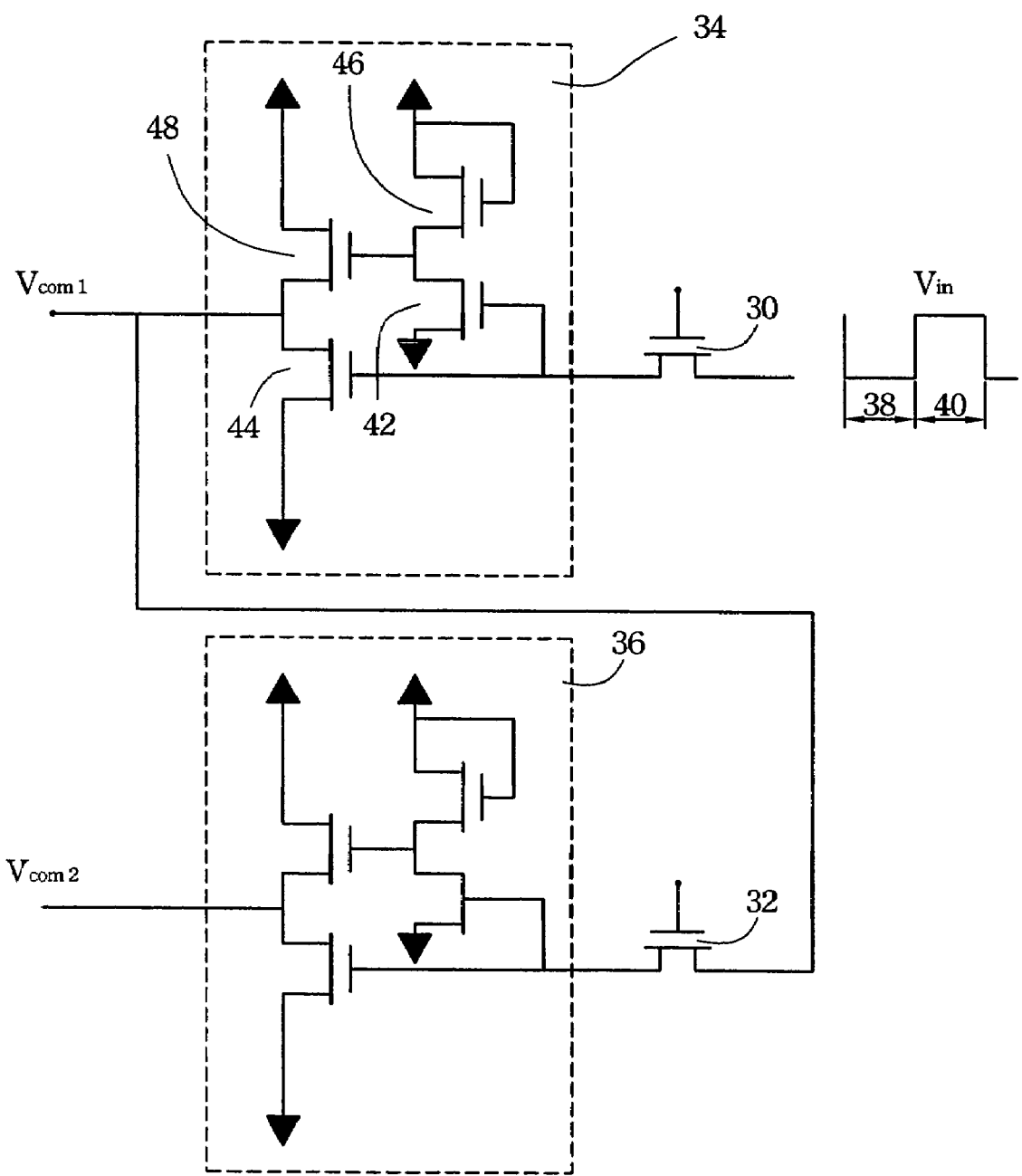
FIG. 12B illustrates a detailed diagram of a drive circuit for generating a drive voltage.

FIG. 12B shows a detailed diagram of the drive circuit in FIG. 12A for generating a drive voltage. The operation method of the inverter is described in the following. When the transistor 30 is turned on by the signal in the scan line 82, the first field signal 38 is transferred to the gate electrodes of the transistors 42 and 44 through the transistor 30. The transistors 42 and 44 are still turned off because the first field signal 38 is at a low electrical potential. The transistor is turned on because the drain electrode and the source electrode are connected together. The transistor is also turned on by the high voltage through the transistor 46. Therefore, the signal in the output end $V_{com1}$ is a high voltage signal.

Similarly, when the signal in the scan line 82 turns the transistor 30 on again, the second field signal 40 is transferred to the gate electrodes of the transistors 42 and 44 through the transistor 30. The transistors 42 and 44 are turned on because the second field signal 40 is at a high electrical potential. The gate electrode of the transistor 48 are connected to the low electrical potential through the transistor 42. Therefore, the transistor 48 is turned off. Therefore, the output end $V_{com1}$ is connected to a low voltage signal through the transistor 44.

The drive circuit shown in FIG. 12A also can be used to generate a waveform as shown in FIGS. 9A and 9B. Referring to FIG. 11 and FIG. 12A together, the voltage signal in the output end $V_{com1}$ is used to drive the common electrode 92 and the voltage signal in the output end $V_{com2}$ is used to drive the common electrode 94. However, the switch of the transistor 30 is controlled by the scan line 86 and the switch of the transistor 32 is controlled by the scan line 88. An inverter 34 is located between the transistor 30 and the output end $V_{com1}$ to invert the input signal from the transistor 30. Another inverter 36 is located between the transistor 32 and the output end $V_{com2}$ to invert the signal in the output end $V_{com1}$.

During operation, a frame signal $V_{in}$ composed of two fields 38 and 40 is input from the transistor 30, where the time of each field is 1/60 seconds. When the transistor 30 is turned on by the scan signal in the scan line 86, the first field signal 38 is transferred to the inverter 34 through the transistor 30. The inverter 34 inverts the first field signal 38 and sends out the inverted first field signal 38 from the output end $V_{com1}$ to drive the common electrode 92. Next, when the scan line 88 turns on the transistor 32, the inverted first field signal 38 is transferred to the inverter 36 through the transistor 32. The inverter 36 inverts the received signal again and sends out the same from the output end $V_{com2}$ to drive the common electrode 94.

Therefore, in accordance with the waveform generated by the drive circuit of the present invention, the common electrode 92 is driven by the drive signal from the output end $V_{com1}$ after the switch transistor 18 of the pixel electrode 28 is turned on by the scan signal in the scan line 86. Therefore, the waveform shown in FIG. 8A is formed, in which the waveform 604 is the signal in the output end $V_{com2}$ and the waveform 602 is the signal in the scan line 86.

Next, when the transistor 30 receives the signal in the scan line 86 again, the second field signal 40 is transferred to the inverter 34 through the transistor 30. The inverter 34 inverts the second field signal 40 and sends out the inverted second field signal 40 from the output end $V_{com1}$ to drive the common electrode 92. Next, when the scan line 88 turns on the transistor 32, the inverted second field signal 40 is transferred to the inverter 36 through the transistor 32. The inverter 36 inverts the received signal again and sends out the same from the output end $V_{com2}$ to drive the common electrode 94.

Therefore, the common electrode 94 receives the signal from the output end $V_{com2}$ after the switch transistor 18 of the pixel electrode 28 is turned on by the scan signal in the scan line 86. The waveform shown in FIG. 8B is thus formed, in which the waveform 608 is the signal in the output end $V_{com2}$ and the waveform 612 is the signal in the scan line 86.

The drive circuit showing in FIG. 12A also can be used to generate a waveform as shown in FIGS. 10A and 10B. Referring to FIG. 11 and FIG. 12A together, the voltage signal in the output end $V_{com1}$ is used to drive the common electrode 92 and the voltage signal in the output end $V_{com2}$ is used to drive the common electrode 94. However, the switch of the transistor 30 is controlled by the scan line 84 and the switch of the transistor 32 is controlled by the scan line 86. An inverter 34 is located between the transistor 30 and the output end $V_{com1}$ to invert the input signal from the transistor 30. Another inverter 36 is located between the transistor 32 and the output end $V_{com2}$ to invert the signal in the output end $V_{com1}$.

During operation, a frame signal $V_{in}$ composed of two fields 38 and 40 is input from the transistor 30, in which the time of each field is 1/60 second. When the transistor 30 is turned on by the scan signal in the scan line 84, the first field signal 38 is transferred to the inverter 34 through the transistor 30. The inverter 34 inverts the first field signal 38 and sends out the inverted first field signal 38 from the output end $V_{com1}$ to drive the common electrode 92. Next, when the scan line 86 turns on the transistor 32, the inverted first field signal 38 is transferred to the inverter 36 through the transistor 32. The inverter 36 inverts the received signal again and sends out the same from the output end $V_{com2}$ to drive the common electrode 94.

Therefore, in accordance with the waveform generated by the drive circuit of the present invention, the switch transistor 16 of the pixel electrode 26 is turned on by the scan signal in the scan line 84. At the same time, the common electrode 92 is driven by the drive signal from the output end $V_{com1}$. The waveform shown in FIG. 9A is thus formed, in which the waveform 204 is the signal in the output end $V_{com1}$ and the waveform 202 is the signal in the scan line 84.

Next, when the transistor 30 receives the signal in the scan line 84 again, the second field signal 40 is transferred to the inverter 34 through the transistor 30. The inverter 34 inverts the second field signal 40 and sends out the inverted second field signal 40 from the output end $V_{com1}$ to drive the common electrode 92. Next, when the scan line 86 turns on the transistor 32, the inverted second field signal 40 is transferred to the inverter 36 through the transistor 32. The inverter 36 inverts the received signal again and sends out the same from the output end $V_{com2}$ to drive the common electrode 94.

Therefore, the switch transistor 16 of the pixel electrode 26 is turned on by the scan signal in the scan line 84. At the same time, the common electrode 92 receives the signal from the output end $V_{com1}$. The waveform shown in FIG. 9B is thus formed, in which the waveform 208 is the signal in the output end $V_{com2}$ and the waveform 212 is the signal in the scan line 84.

On the other hand, the liquid crystal molecules filling the pixel region need be aligned. The alignment arranges the orientation of the liquid crystal molecules before a field is applied to the liquid crystal display to sure all the liquid crystal molecule is arranged in the same direction. A rubbing method is used to arrange the orientation. An orientation line is generated on the orientation layer during the rubbing process. These liquid crystal molecules are oriented along these lines.

In accordance with the present invention, a metal electrode is built in the pixel region. The metal electrode is controlled by the common electrode. The liquid crystal molecules in the entire pixel region are in the splay state. A voltage is first applied to the metal electrode to transform the liquid crystal molecule over the metal electrode from the splay state into the bend state during operation. Then, a voltage is applied to the pixel electrode. In other words, liquid crystal molecules located over the metal electrode are first transformed. However, when the voltage is applied to the common electrode, an unwanted crosswise field is also generated around the common electrode. This crosswise electrical field affects the transformation of the liquid crystal molecules located around the electrode. Therefore, the present invention provides an alignment method to reduce the effect the crosswise electrical field.

Figure 13A:
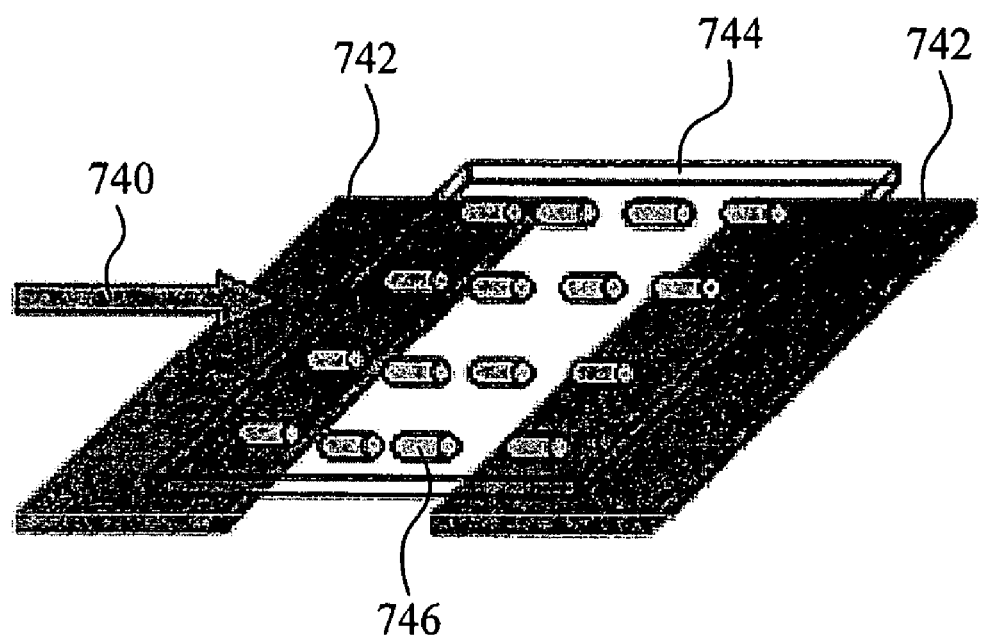
FIG. 13A illustrates a schematic diagram of the liquid crystal molecules aligned in the direction perpendicular to the metal electrode.

FIG. 13A illustrates a schematic diagram of the liquid crystal molecules aligned in the direction perpendicular to the metal electrode. The liquid crystal molecules 746 located over the metal electrode 742 and the pixel electrode 744 are aligned in the direction as indicated by the arrow 740 perpendicular to the metal electrode 742. In FIG. 5A, the metal electrode 812 is built around the pixel electrode. Therefore, according to the alignment method illustrated in FIG. 13A, the liquid crystal molecules 818 located over the metal electrode 812 and the pixel electrode are aligned in the direction perpendicular to the metal electrode 812.

Figure 13B:
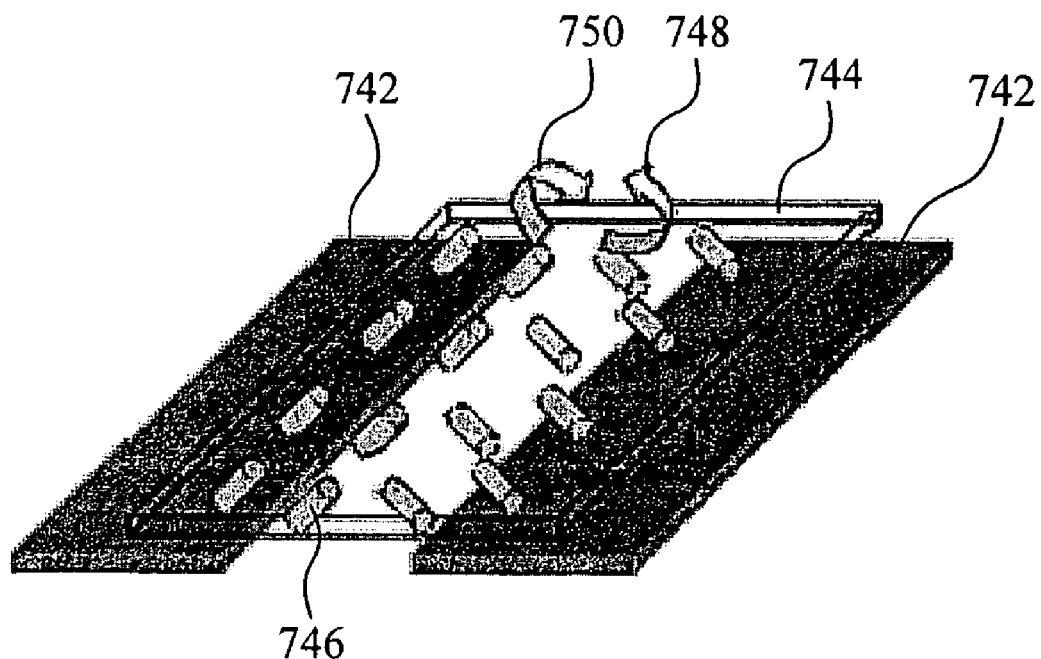
FIG. 13B illustrates a schematic diagram of the liquid crystal molecules affected by a crosswise electrical field.

FIG. 13B illustrates a schematic diagram of the liquid crystal molecules affected by a crosswise electrical field. When a voltage is applied to a pixel electrode 744, a crosswise electrical field 750 is generated, the direction of which is the reverse of the direction of the electrical field 748 used to transform the liquid crystal molecules 746. In other words, a larger voltage must be applied to the pixel electrode 744 to overcome the crosswise electrical field so as to finish the transformation of the liquid crystal molecules 746. Such a larger voltage requirement consumes power and time to finish the transformation of the liquid crystal molecules.

Figure 14A:
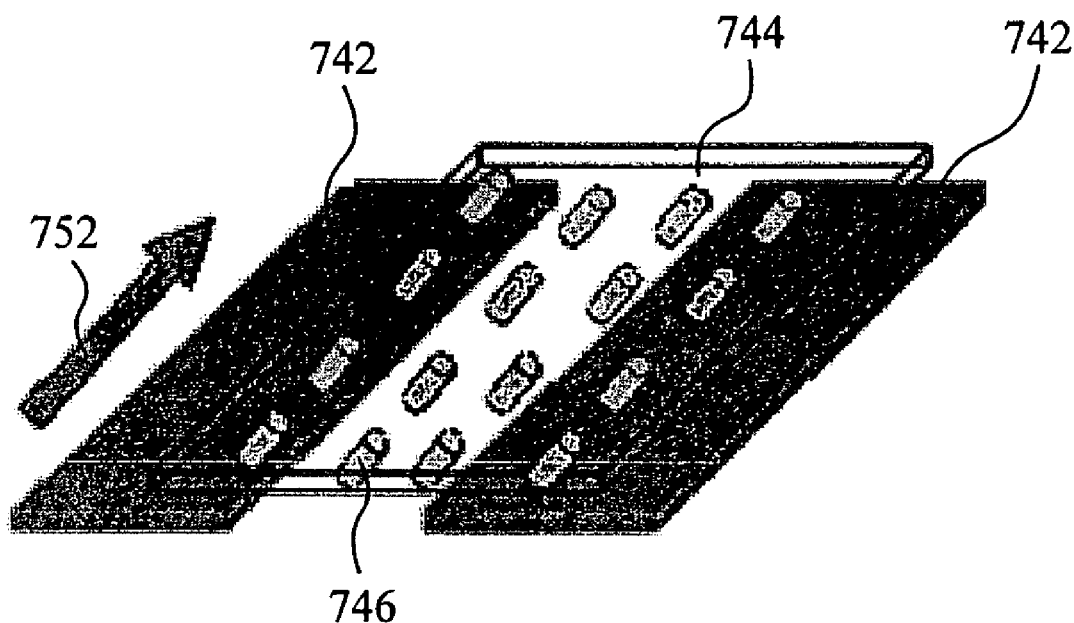
FIG. 14A illustrates a schematic diagram of the liquid crystal molecules aligned in the direction parallel to the metal electrode.

In FIG. 14A, illustrates a schematic diagram of the liquid crystal molecules that is aligned in the direction parallel to the metal electrode. The liquid crystal molecules 746 located over the metal electrode 742 and the pixel electrode 744 are aligned in the direction as indicated by the arrow 752 that is parallel to the metal electrode 742. In FIG. 5A, the metal electrode 812 is built around the pixel electrode. Therefore, according to the alignment method as shown in FIG. 14A, the liquid crystal molecules 818 located over the metal electrode 812 and the pixel electrode are aligned in the direction parallel to the metal electrode 812.

Figure 14B:
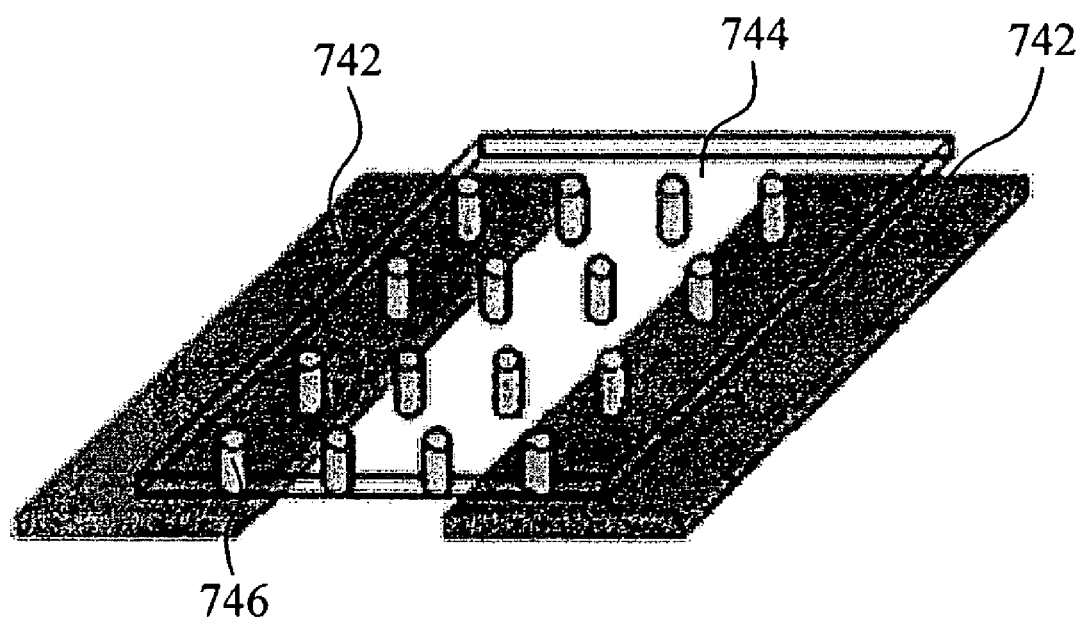
FIG. 14B illustrates a schematic diagram of the liquid crystal molecules affected by a crosswise electrical field.

FIG. 14B illustrates a schematic diagram of the transformation of the liquid crystal molecules when a voltage is applied to a pixel electrode 744. The alignment direction of the liquid crystal molecules 746 is parallel to the arrangement direction of the the metal electrode 742 in FIG. 14A. Therefore, the crosswise electrical field generated by the metal electrode 742 does not obstruct the liquid crystal molecules transformation. In other words, it is not necessary to apply a larger voltage to the pixel electrode 744 to overcome the obstruction of the crosswise electrical field.

Accordingly, the alignment direction of the liquid crystal molecules in the foregoing embodiments is parallel to the arranged direction of the metal electrode. However, the arranged direction of the metal electrode is not always in the same direction in a pixel region in the embodiments, which causes disorder in the liquid crystal molecule alignment direction in a pixel region. For solving this problem, The metal electrode is designed and additional holes passing through the pixel electrode are formed in positions corresponding to the metal electrode or common electrode so as to reduce the effect of the crosswise electrical field and improve the transmission efficiency. The following eight embodiments illustrate the pixel structure appearance change of the FIG. 4A to cooperate with the alignment direction of the liquid crystal molecules.

Figure 15A:
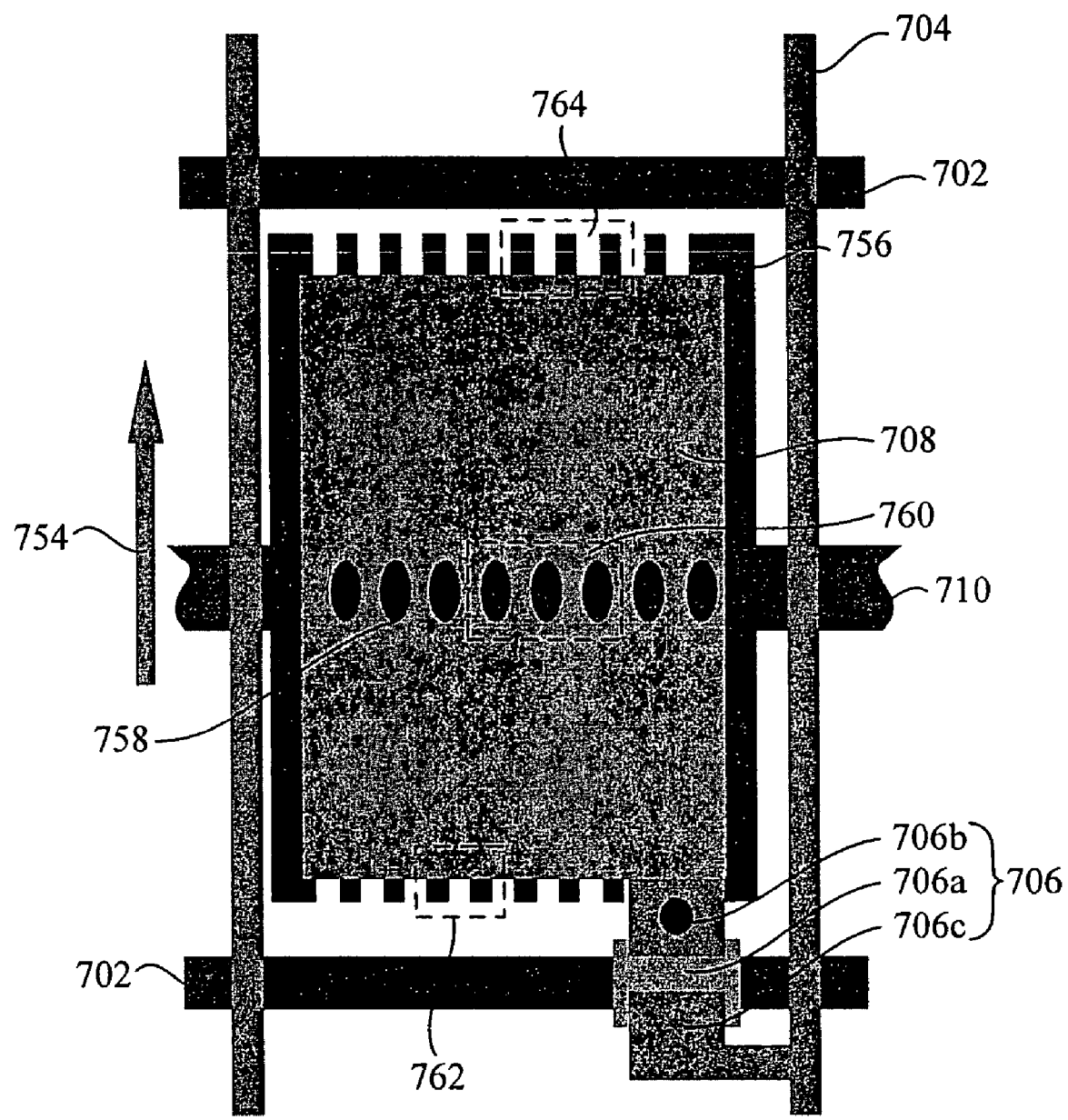
FIG. 15A illustrates a schematic diagram of a pixel structure appearance change of FIG. 4A cooperating with this alignment method according to the first embodiment of the present invention.

FIG. 15A illustrates a schematic diagram of a pixel structure appearance change of FIG. 4A cooperating with this alignment method according to the first embodiment of the present invention. The silicon island 706a of the switch transistor 706 is connected to the scan line 702. When the switch transistor 706 is selected, the scan signal in the scan line 702 turns on the switch transistor 706. The video signal in the video data line 704 is transferred to the pixel electrode 708 through the switch transistor 706. The drain electrode 706b of the switch transistor 706 is connected to the pixel electrode 708. The source electrode 706c of the switch transistor 706 is connected to the video data line 704. A common electrode line 710 is used as the common electrode of the pixel electrode 708. A metal electrode 756 is built around the pixel region. The metal electrode 756 is controlled by the common electrode line 710. When operating the liquid crystal display, a voltage is applied to the common electrode and the metal electrode at the same time.

Cooperating with the alignment direction of the liquid crystal molecules parallel to the arranged direction of the metal electrode 756, a plurality of additional holes 758 passing through the pixel electrode 708 is formed in positions corresponding to the common electrode line 710. The hole 758 is an ellipse, a rectangle or another shape with a major axis. It is noted that the direction of the major axis is parallel to the alignment direction of the liquid crystal molecules as indicated by the arrow 754. On the other hand, the metal electrode 756 adjacent to the scan line 702 is sawtoothed so that this metal electrode 756 has a major axis in the direction indicated by an arrow 754. In other words, the liquid crystal molecules located over the metal electrode 756 adjacent to the scan lines 702 can be aligned in the direction indicated by an arrow 754.

Figure 17A:
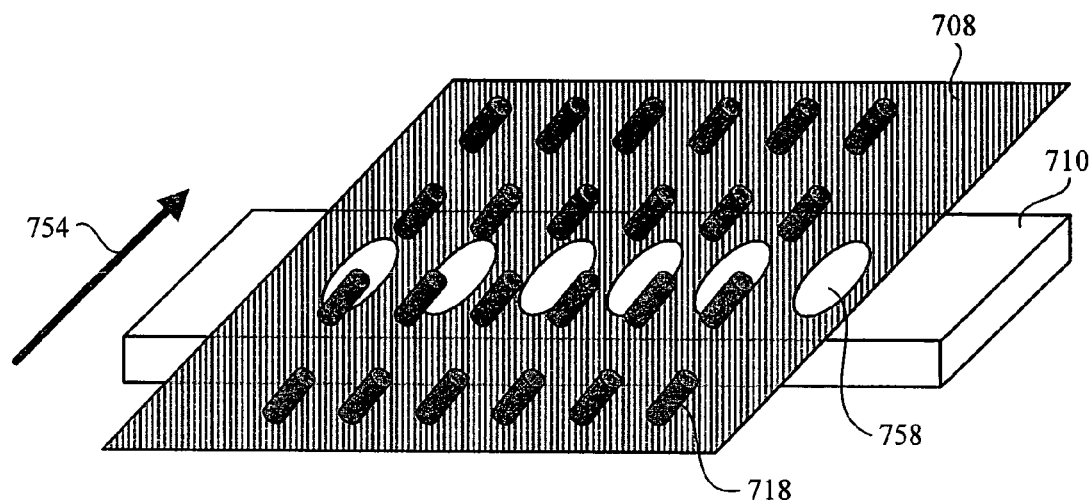
FIG. 17A illustrates a top view of holes located in a pixel electrode to expose a metal electrode, in which no voltage is applied to the metal electrode.
Figure 17B:
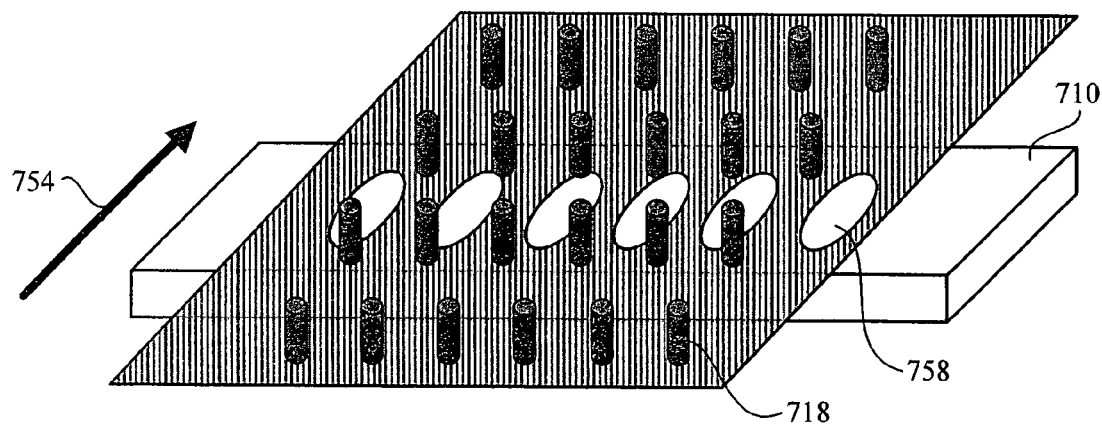
FIG. 17B illustrates a top view of holes located in a pixel electrode to expose a metal electrode, in which a voltage is applied to the metal electrode.

FIG. 17A is an enlarged schematic diagram of the region 760 in FIG. 15A. A plurality of holes 758 passing through the pixel electrode 708 is formed in positions corresponding to the common electrode line 710. According to the preferred embodiment, the hole 758 is ellipsoidal. The liquid crystal molecules 718 located over the pixel electrode are aligned in the direction parallel to the major axis of the hole 758, as indicated by the arrow 754. Holes 758 are separated from each other. Therefore, each hole 758 is treated as an independent electrode and has a major axis, which cause a major crosswise electrical field, in the direction indicated by the arrow 754. Therefore, the liquid crystal molecules 718 is aligned in the direction parallel to the major axis of the hole 758 to reduce the effect of the crosswise electrical field, as shown in FIG. 17A. FIG. 17B illustrates a schematic diagram of the liquid crystal molecules when a voltage is applied to the common electrode.

Figure 18A:
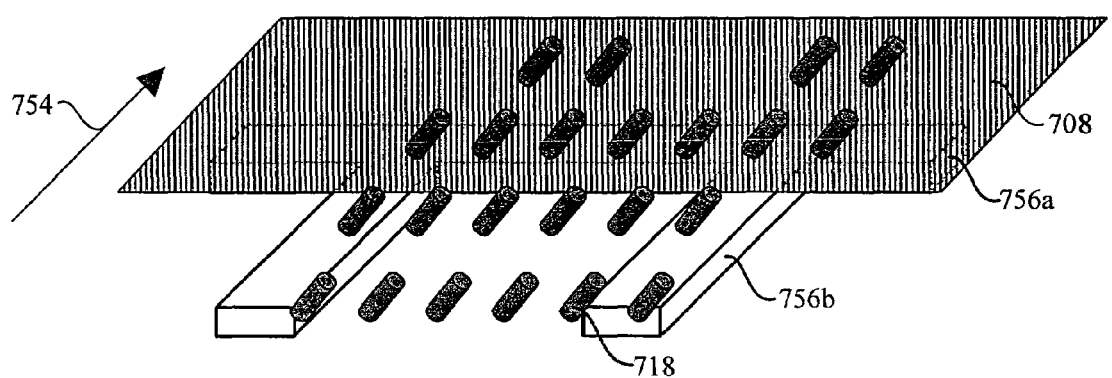
FIG. 18A illustrates a top view of a metal electrode with a sawtooth appearance, in which no voltage is applied to the metal electrode.
Figure 18B:
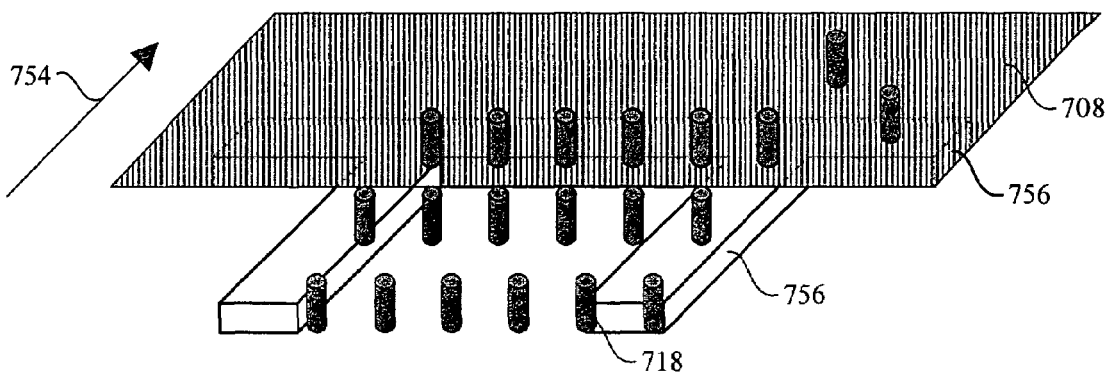
FIG. 18B illustrates a top view of a metal electrode with a sawtooth appearance, in which a voltage is applied to the metal electrode.

FIG. 18A is an enlarged schematic diagram of the region 762 in FIG. 15A. The metal electrode 756 is sawtoothed. In this region 762, the metal electrode 756 is composed of a base body 756a and a plurality of extending parts 756b. Partial extending parts 756b protrude from the pixel electrode 708. In other words, the metal electrode 756 has a major axis, which cause a major crosswise electrical field, in the direction indicated by the arrow 754. Therefore, the liquid crystal molecules 718 is aligned in the direction parallel to the major axis, the extending parts 756b, to reduce the effect of the crosswise electrical field, as shown in FIG. 18A. FIG. 18B illustrates a schematic diagram of the liquid crystal molecules when a voltage is applied to the common electrode.

On the other hand, the region 764 and the region 762 both have the same structure of the metal electrode 756 in FIG. 15A.

Figure 15B:
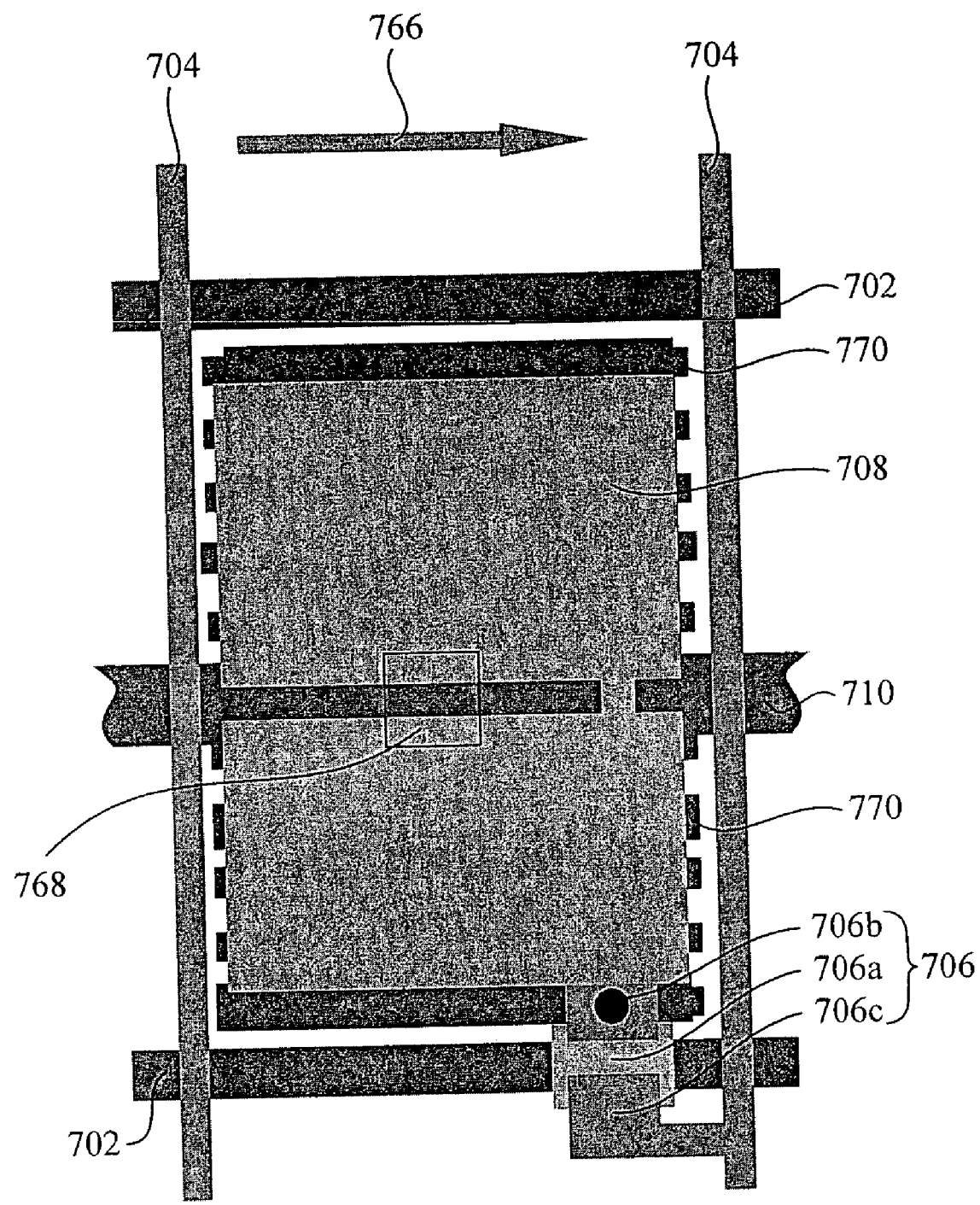
FIG. 15B illustrates a schematic diagram of a pixel structure appearance change of FIG. 4A cooperating with this alignment method according to the second embodiment of the present invention.

FIG. 15B illustrates a schematic diagram of a pixel structure appearance change of FIG. 4A cooperating with this alignment method according to the second embodiment of the present invention. The silicon island 706a of the switch transistor 706 is connected to the scan line 702. When the switch transistor 706 is selected, the scan signal in the scan line 702 turns on the switch transistor 706. The video signal in the video data line 704 is transferred to the pixel electrode 708 through the switch transistor 706. The drain electrode 706b of the switch transistor 706 is connected to the pixel electrode 708. The source electrode 706c of the switch transistor 706 is connected to the video data line 704. A common electrode line 710 is used as the common electrode of the pixel electrode 708. A metal electrode 770 is built around the pixel region. The metal electrode 770 is controlled by the common electrode line 710. When operating the liquid crystal display, a voltage is applied to the common electrode and the metal electrode at the same time.

Cooperating with the alignment direction of the liquid crystal molecules parallel to the arranged direction of the metal electrode 770, the metal electrode 770 adjacent to the video data line 704 is sawtoothed so that metal electrode 770 has a major axis in the direction indicated by an arrow 766. In other words, the liquid crystal molecules can be aligned in the direction indicated by an arrow 766. On the other hand, the pixel electrode 708 in a pixel region is partially separated into two parts so as to expose the positions corresponding to the common electrode line 710. The main purpose is to align the liquid crystal molecules in the direction indicated by the arrow 766.

FIG. 19A is an enlarged schematic diagram of the region 768 in FIG. 15B. A trench passing through the pixel electrode 708 is formed in the position corresponding to the common electrode line 710 to separate the pixel electrode into two parts. According to the preferred embodiment, the trench is a rectangular that has a major axis, which cause a major crosswise electrical field, in the direction indicated by the arrow 766. Therefore, the liquid crystal molecules 718 located over the pixel electrode 708 are aligned in a direction, indicated by the arrow 766, parallel to the common electrode line 710 to reduce the effect of the crosswise electrical field. FIG. 19B illustrates a schematic diagram of the liquid crystal molecules when a voltage is applied to the common electrode.

On the other hand, the metal electrode 770 adjacent to the video data line 704 is sawtoothed, whose diagram is similar to FIG. 18A. The metal electrode 770 has a plurality of extending parts outside the pixel electrode 708. These extending parts cause a major crosswise electrical field in the direction indicated by the arrow 766. Therefore, the liquid crystal molecules 718 are aligned in the direction indicated by the arrow 766.

Figure 15C:
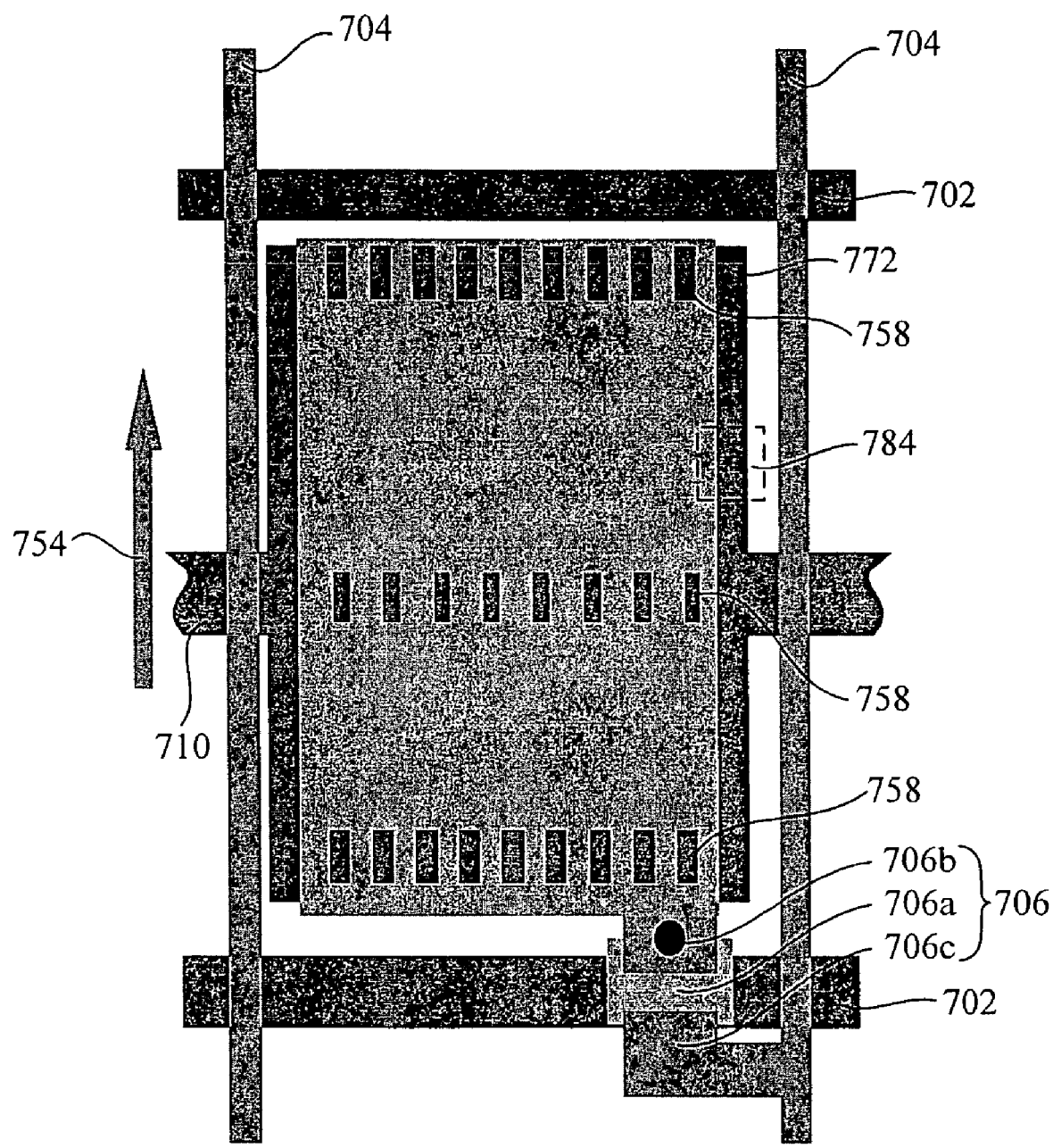
FIG. 15C illustrates a schematic diagram of a pixel structure appearance change of FIG. 4A cooperating with this alignment method according to the third embodiment of the present invention.

FIG. 15C illustrates a schematic diagram of a pixel structure appearance change of FIG. 4A cooperating with this alignment method according to the third embodiment of the present invention. The silicon island 706a of the switch transistor 706 is connected to the scan line 702. When the switch transistor 706 is selected, the scan signal in the scan line 702 turns on the switch transistor 706. The video signal in the video data line 704 is transferred to the pixel electrode 708 through the switch transistor 706. The drain electrode 706b of the switch transistor 706 is connected to the pixel electrode 708. The source electrode 706c of the switch transistor 706 is connected to the video data line 704. A common electrode line 710 is used as the common electrode of the pixel electrode 708. A metal electrode 772 is built around the pixel region. The metal electrode 772 is controlled by the common electrode line 710. When operating the liquid crystal display, a voltage is applied to the common electrode and the metal electrode at the same time.

Cooperating with the alignment direction of the liquid crystal molecules parallel to the arranged direction of the metal electrode 772, a plurality of additional holes 758 passing through the pixel electrode 708 is formed in the positions corresponding to the common electrode line 710. On the other hand, a plurality of additional holes 782 passing through the pixel electrode 708 is formed in the positions corresponding to the metal electrode 772 adjacent to the scan lines 702. The holes 758 are ellipses, rectangles or any other shape with a major axis. It is noted that the direction of the major axis is parallel to the alignment direction of the liquid crystal molecules as indicated by the arrow 754. On the other hand, the metal electrode 772 adjacent to video data line 704 is out of the pixel electrode 708. The alignment direction of the liquid crystal molecules according to the preferred embodiment is parallel to the direction indicated by the arrow 754.

Figure 20A:
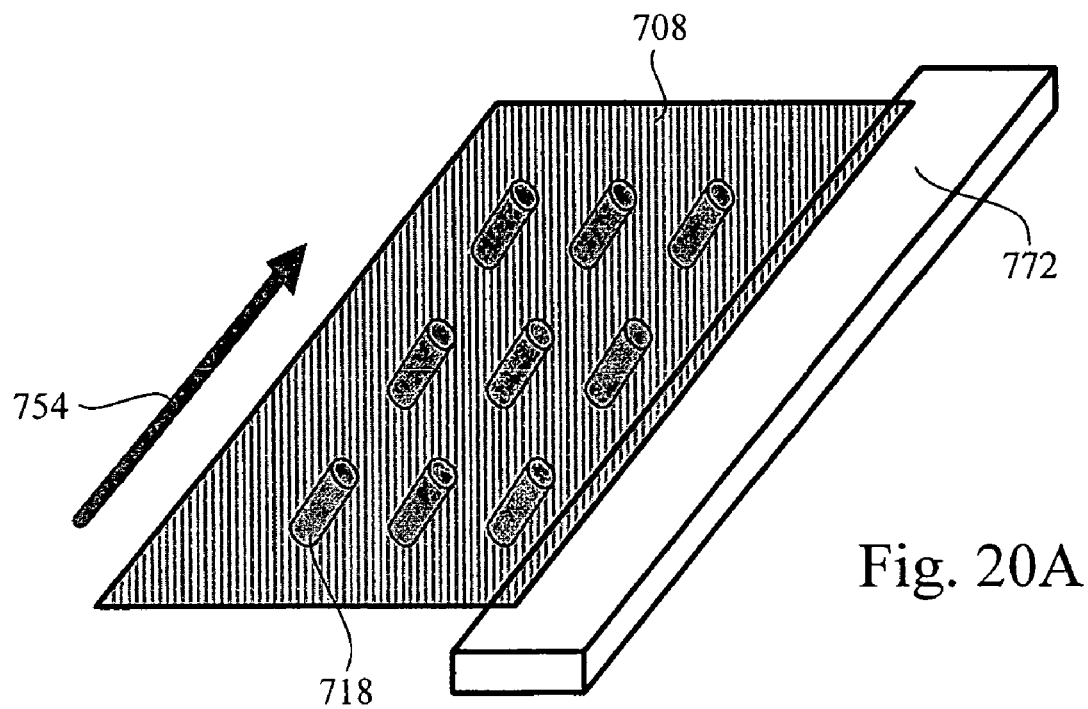
FIG. 20A illustrates a top view of a metal electrode extended out of the pixel electrode, in which no voltage is applied to the metal electrode.
Figure 20B:
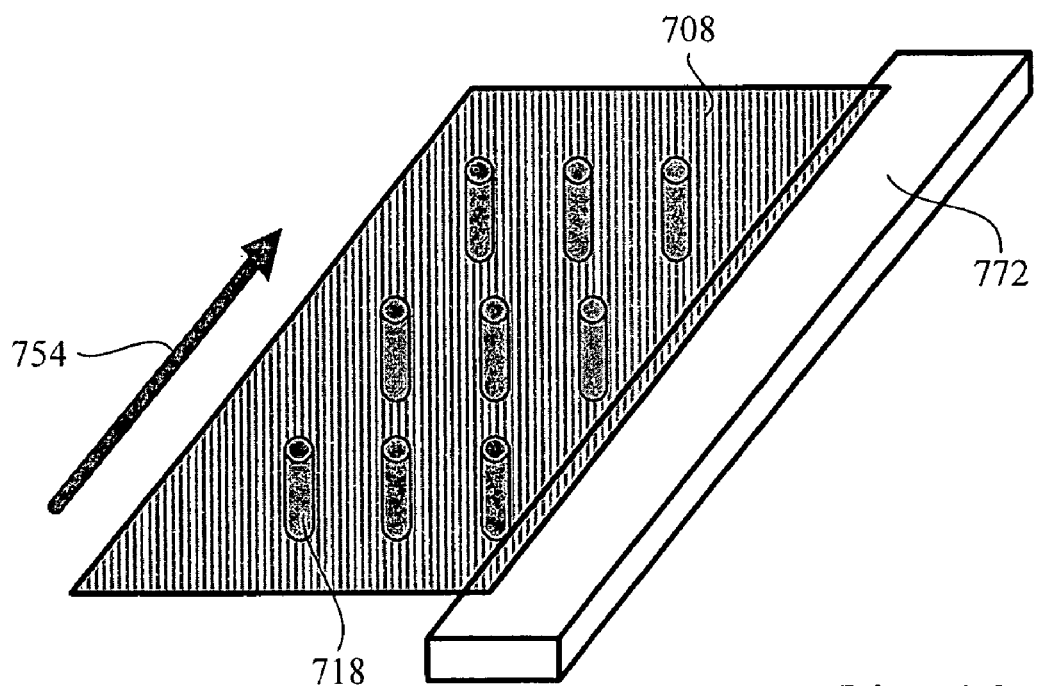
FIG. 20B illustrates a top view of a metal electrode extended out of the pixel electrode, in which a voltage is applied to the metal electrode.

FIG. 20A is an enlarged schematic diagram of the region 784 in FIG. 15C. The metal electrode 772 adjacent to the video data line is out of the pixel electrode 708. According to the preferred embodiment, the metal electrode 772 out of the pixel electrode 708 has a major axis, which cause a major crosswise electrical field, in the direction indicated by the arrow 754. Therefore, the liquid crystal molecules 718 located over the pixel electrode 708 are aligned in the direction, as indicated by the arrow 754, parallel to the metal electrode 772 to reduce the effect of the crosswise electrical field. FIG. 20B illustrates a schematic diagram of the liquid crystal molecules when a voltage is applied to the common electrode.

On the other hand, a plurality of holes 758 passing through the pixel electrode 708 is formed on the positions corresponding to the metal electrode 772 adjacent to the scan lines 702, whose diagram is similar to FIG. 17A. According to the preferred embodiment, the holes 758 are rectangular in shape. However, any other shape with a major axis also can be used in the preferred embodiment. The liquid crystal molecules 718 located over the pixel electrode 708 are aligned in the direction parallel to the major axis of the holes 758, as indicated by the arrow 754.

Figure 15D:
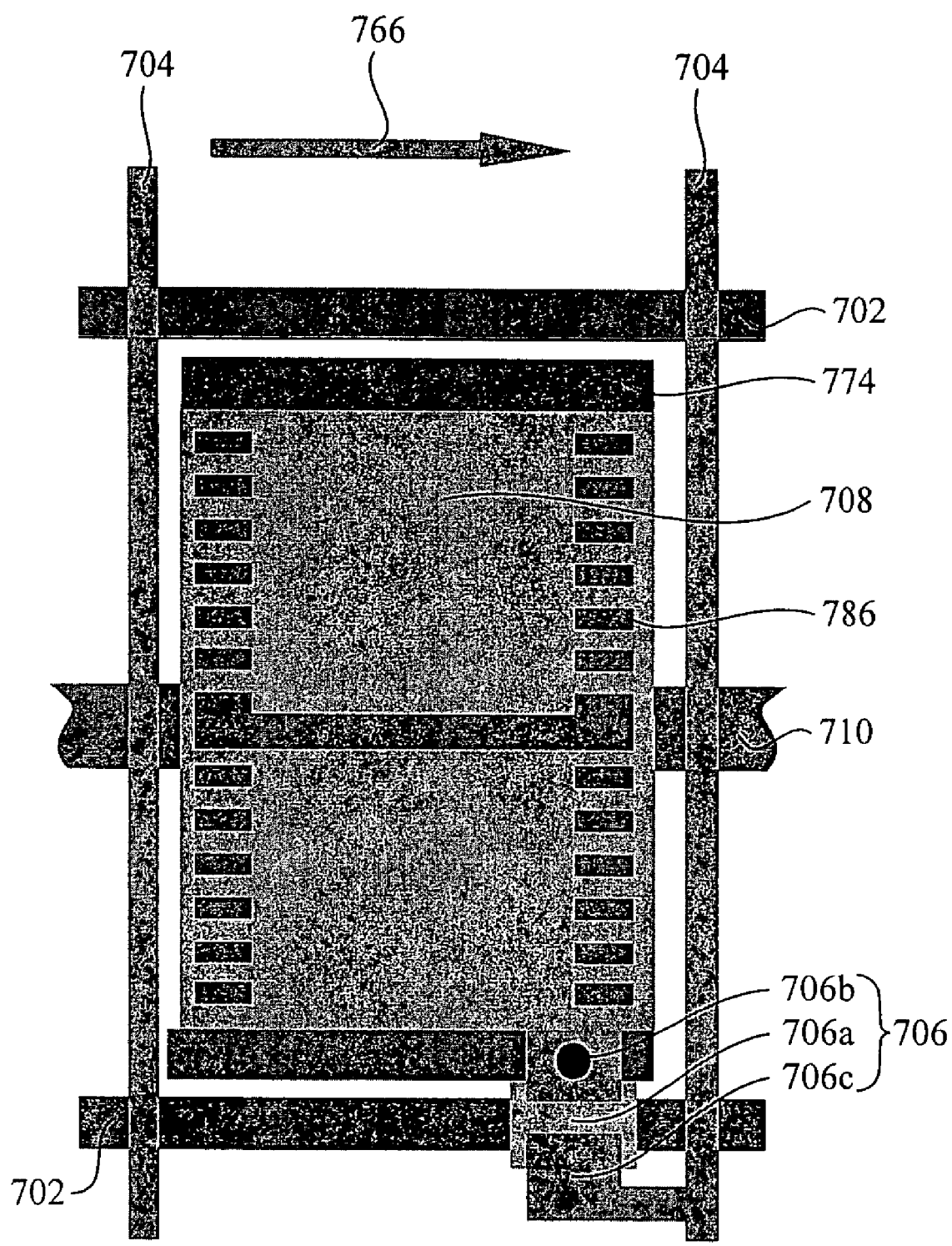
FIG. 15D illustrates a schematic diagram of a pixel structure appearance change of FIG. 4A cooperating with this alignment method according to the fourth embodiment of the present invention.

FIG. 15D illustrates a schematic diagram of a pixel structure appearance change of FIG. 4A cooperating with this alignment method according to the fourth embodiment of the present invention. The silicon island 706a of the switch transistor 706 is connected to the scan line 702. When the switch transistor 706 is selected, the scan signal in the scan line 702 turns on the switch transistor 706. The video signal in the video data line 704 is transferred to the pixel electrode 708 through the switch transistor 706. The drain electrode 706b of the switch transistor 706 is connected to the pixel electrode 708. The source electrode 706c of the switch transistor 706 is connected to the video data line 704. A common electrode line 710 is used as the common electrode of the pixel electrode 708. A metal electrode 774 is built around the pixel region. The metal electrode 774 is controlled by the common electrode line 710. When operating the liquid crystal display, a voltage is applied to the common electrode and the metal electrode at the same time.

Cooperating with the alignment direction of the liquid crystal molecules parallel to the arranged direction of the metal electrode 774, a plurality of additional holes 786 passing through the pixel electrode 708 is formed in the positions corresponding to the metal electrode 774 adjacent to the video data lines 704. The holes 786 are ellipses, rectangles or any other shape with a major axis. It is noted that the direction of the major axis is parallel to the alignment direction of the liquid crystal molecules as indicated by the arrow 766. On the other hand, the metal electrode 774 adjacent to scan lines 702 is out of the pixel electrode 708. A trench passing through the pixel electrode 708 is formed in the position corresponding to the common electrode line 710.

The metal electrode 774 adjacent to the scan lines 702 is out of the pixel electrode 708. According to the preferred embodiment, the metal electrode 774 out of the pixel electrode 708 has a major axis, which causes a major crosswise electrical field in the direction indicated by the arrow 766. Therefore, the liquid crystal molecules located over the pixel electrode 708 are aligned in the direction, indicated by arrow 766, parallel to the metal electrode 774 to reduce the effect of the crosswise electrical field, whose diagram is similar to FIG. 20A.

On the other hand, a trench passing through the pixel electrode 708 is formed in the position corresponding to the common electrode line 710 to separate the pixel electrode into two parts. According to the preferred embodiment, the trench is a rectangle with a major axis, which causes a major crosswise electrical field, in the direction indicated by the arrow 766. Therefore, the liquid crystal molecules located over the pixel electrode 708 are aligned in the direction indicated by arrow 766.

Additionally, a plurality of holes 786 passing through the pixel electrode 708 is formed in positions corresponding to the metal electrode 774 adjacent to the video data lines 704, whose diagram is similar to FIG. 17A. According to the preferred embodiment, the holes 786 are rectangular in shape. However, any other shape with a major axis also can be used in the preferred embodiment. The liquid crystal molecules located over the pixel electrode 708 are aligned in the direction parallel to the major axis of the holes 786, as indicated by the arrow 766.

Figure 15E:
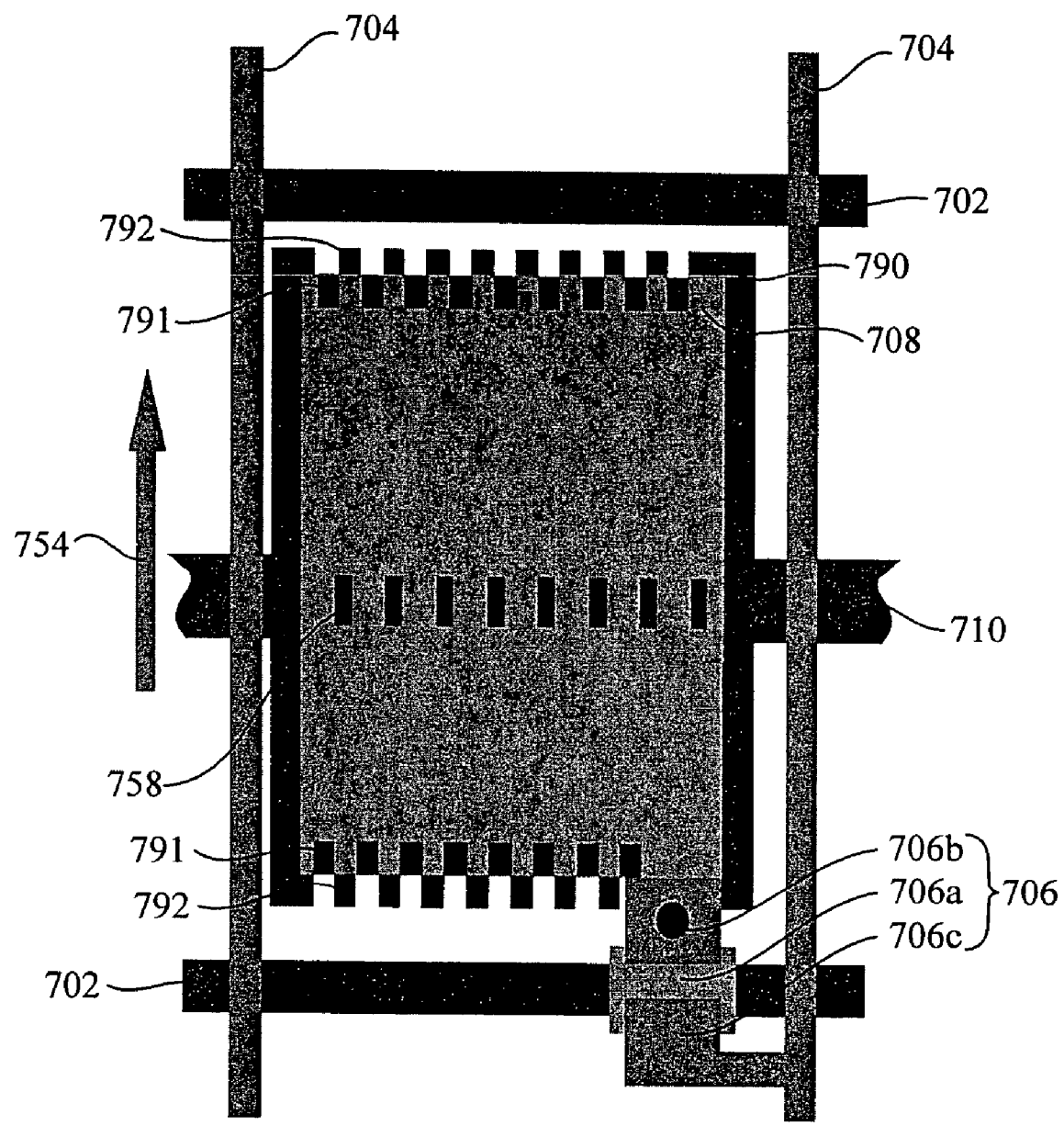
FIG. 15E illustrates a schematic diagram of a pixel structure appearance change of FIG. 4A cooperating with this alignment method according to the fifth embodiment of the present invention.

FIG. 15E illustrates a schematic diagram of a pixel structure appearance change of FIG. 4A cooperating with this alignment method according to the fifth embodiment of the present invention. The silicon island 706a of the switch transistor 706 is connected to the scan line 702. When the switch transistor 706 is selected, the scan signal in the scan line 702 turns on the switch transistor 706. The video signal in the video data line 704 is transferred to the pixel electrode 708 through the switch transistor 706. The drain electrode 706b of the switch transistor 706 is connected to the pixel electrode 708. The source electrode 706c of the switch transistor 706 is connected to the video data line 704. A common electrode line 710 is used as the common electrode of the pixel electrode 708. A metal electrode 790 is built around the pixel region. The metal electrode 790 is controlled by the common electrode line 710. When operating the liquid crystal display, a voltage is applied to the common electrode and the metal electrode at the same time.

Cooperating with the alignment direction of the liquid crystal molecules parallel to the arranged direction of the metal electrode 790, a plurality of additional holes 758 passing through the pixel electrode 708 is formed in positions corresponding to the common electrode line 710. The hole 758 is an ellipse, a rectangle or any other shape with a major axis. It is noted that the direction of the major axis is parallel to the alignment direction of the liquid crystal molecules, as indicated by the arrow 754. On the other hand, the metal electrode 790 adjacent to the scan line 702 is sawtoothed so that this metal electrode 790 has a major axis in the direction indicated by an arrow 754. In other words, the liquid crystal molecules located over the metal electrode 790 adjacent to the scan lines 702 can be aligned in the direction indicated by an arrow 754. The main difference between the first embodiment and the fifth embodiment is that additional holes 791 passing through the pixel electrode 708 are formed in positions corresponding to the metal electrode 790 adjacent to the scan lines 702. The hole 791 is an ellipse, a rectangle or any other shape with a major axis. It is noted that the direction of the major axis is parallel to the alignment direction of the liquid crystal molecules as indicated by the arrow 754.

A plurality of holes 758 passing through the pixel electrode 708 is formed on the positions corresponding to the common electrode line 710. According to the preferred embodiment, hole 758 is rectangular in shape. The liquid crystal molecules located over the pixel electrode are aligned in the direction parallel to the major axis of the hole 758, as indicated by the arrow 754 in FIG. 17A. Each hole 758 has a major axis, which causes a major crosswise electrical field, in the direction indicated by the arrow 754. Therefore, the liquid crystal molecules are aligned in the direction parallel to the major axis of the hole 758 to reduce the effect of the crosswise electrical field.

The metal electrode 790 adjacent to the scan lines 702 is sawtoothed, whose diagram is similar to FIG. 18A. The metal electrode 790 has a plurality of extending parts 792 outside the pixel electrode 708. On the other hand, additional holes 791 passing through the pixel electrode 708 are formed in the positions corresponding to the metal electrode 790 and adjacent to the scan lines 702. The hole 791 is an ellipse, a rectangle or any other shape with a major axis. The main purpose of forming the additional holes 791 is to reduce the effect of the crosswise electrical field generated by the scan lines 702.

Figure 15F:
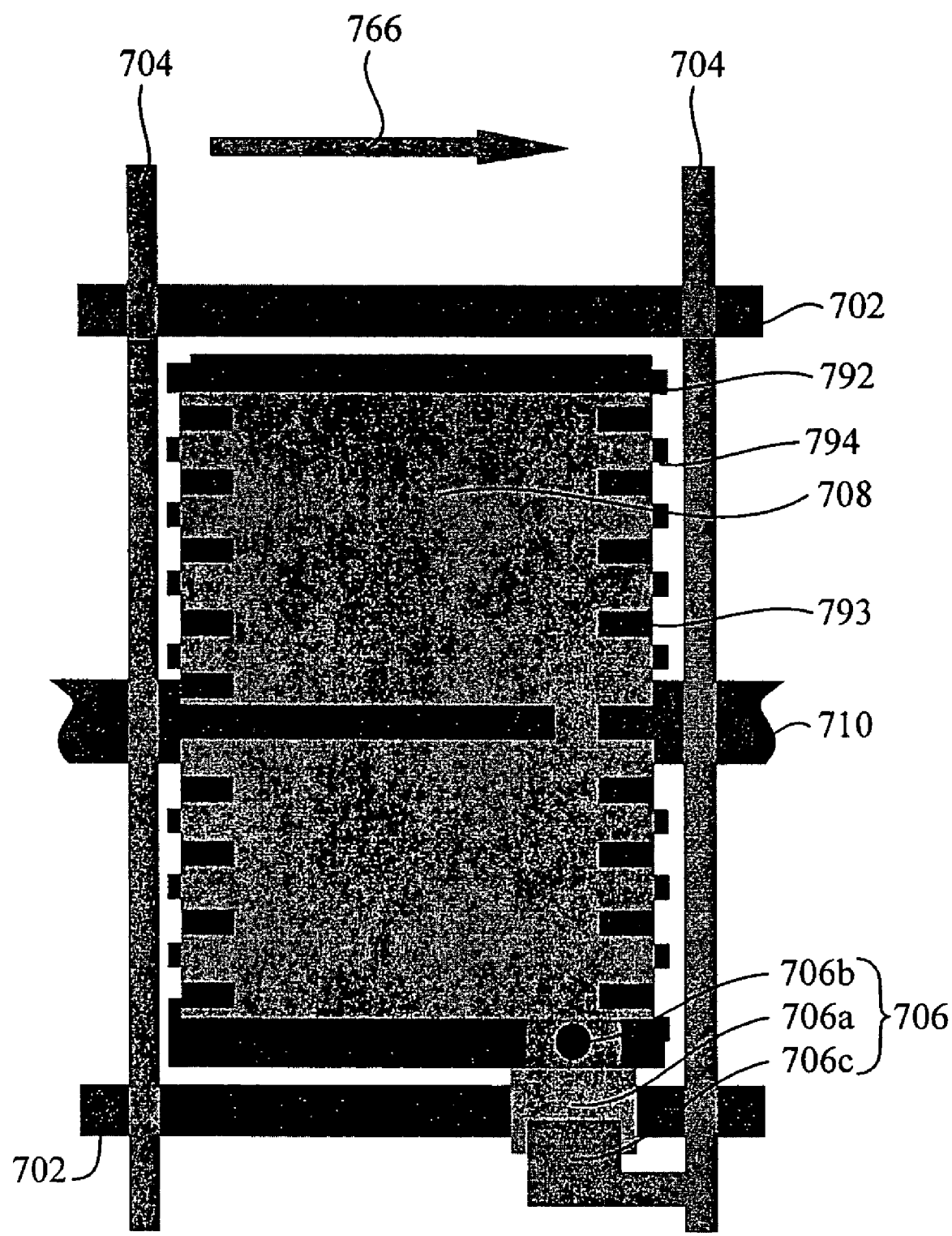
FIG. 15F illustrates a schematic diagram of a pixel structure appearance change of FIG. 4A cooperating with this alignment method according to the sixth embodiment of the present invention.

FIG. 15F illustrates a schematic diagram of a pixel structure appearance change of FIG. 4A cooperating with this alignment method according to the sixth embodiment of the present invention. The silicon island 706a of the switch transistor 706 is connected to the scan line 702. When the switch transistor 706 is selected, the scan signal in the scan line 702 turns on the switch transistor 706. The video signal in the video data line 704 is transferred to the pixel electrode 708 through the switch transistor 706. The drain electrode 706b of the switch transistor 706 is connected to the pixel electrode 708. The source electrode 706c of the switch transistor 706 is connected to the video data line 704. A common electrode line 710 is used as the common electrode of the pixel electrode 708. A metal electrode 792 is built around the pixel region. The metal electrode 792 is controlled by the common electrode line 710. When operating the liquid crystal display, a voltage is applied to the common electrode and the metal electrode at the same time.

Cooperating with the alignment direction of the liquid crystal molecules parallel to the arranged direction of the metal electrode 792, the metal electrode 792 adjacent to the video data line 704 is sawtoothed so that this metal electrode 792 has a major axis in the direction indicated by an arrow 766. In other words, the liquid crystal molecules can be aligned in the direction indicated by an arrow 766. On the other hand, the pixel electrode 708 in a pixel region is partially separated into two parts so that the positions corresponding to the common electrode line 710 are exposed. The main purpose is to align the liquid crystal molecules in the direction indicated by the arrow 766. The main difference between the second embodiment and the sixth embodiment is that additional holes 793 passing through the pixel electrode 708 are formed in the positions corresponding to the metal electrode 792 and adjacent to the video data lines 704. The hole 793 is an ellipse, a rectangle or any other shape with a major axis. It is noted that the direction of the major axis is parallel to the alignment direction of the liquid crystal molecules as indicated by the arrow 766.

A trench passing through the pixel electrode 708 is formed in the position corresponding to the common electrode line 710 to separate the pixel electrode into two parts, whose diagram is similar to FIG. 19A. According to the preferred embodiment, trench is a rectangle with a major axis, which causes a major crosswise electrical field in the direction indicated by the arrow 766. Therefore, the liquid crystal molecules located over the pixel electrode 708 are aligned in the direction indicated by the arrow 766.

On the other hand, metal electrode 792 adjacent to the video data line 704 is sawtoothed, whose diagram is similar to FIG. 18A. The metal electrode 792 has a plurality of extending parts 794 outside the pixel electrode 708. These extending parts cause a major crosswise electrical field in the direction indicated by the arrow 766. Therefore, the liquid crystal molecules are aligned in the direction indicated by the arrow 766. Additionally, additional holes 793 passing through the pixel electrode 708 are formed in positions corresponding to the metal electrode 792 and adjacent to the video data lines 704. The hole 793 is a rectangle according to the preferred embodiment. However, an ellipse or any other shape with a major axis also can be used in the present invention. The main purpose of forming the additional holes 793 is to reduce the effect of the crosswise electrical field generated by the video data lines 704. The liquid crystal molecules located over the pixel electrode 708 are aligned in the direction parallel to the major axis of the holes 793, as indicated by the arrow 766.

Figure 15G:
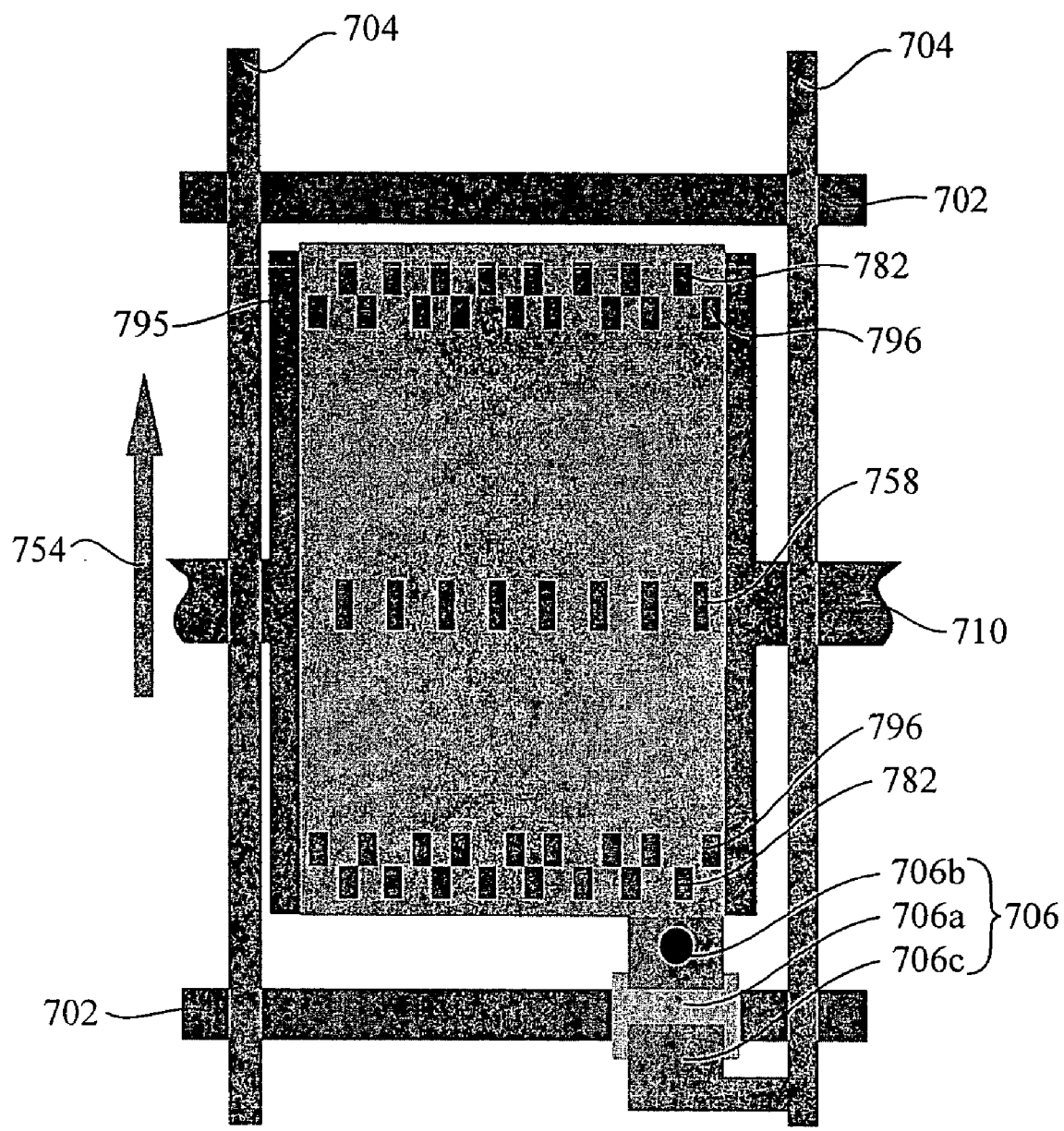
FIG. 15G illustrates a schematic diagram of a pixel structure appearance change of FIG. 4A cooperating with this alignment method according to the seventh embodiment of the present invention.

FIG. 15G illustrates a schematic diagram of a pixel structure appearance change of FIG. 4A cooperating with this alignment method according to the seventh embodiment of the present invention. The silicon island 706a of the switch transistor 706 is connected to the scan line 702. When the switch transistor 706 is selected, the scan signal in the scan line 702 turns on the switch transistor 706. The video signal in the video data line 704 is transferred to the pixel electrode 708 through the switch transistor 706. The drain electrode 706b of the switch transistor 706 is connected to the pixel electrode 708. The source electrode 706c of the switch transistor 706 is connected to the video data line 704. A common electrode line 710 is used as the common electrode of the pixel electrode 708. A metal electrode 795 is built around the pixel region. The metal electrode 795 is controlled by the common electrode line 710. When operating the liquid crystal display, a voltage is applied to the common electrode and the metal electrode at the same time.

Cooperating with the alignment direction of the liquid crystal molecules parallel to the arranged direction of the metal electrode 795, a plurality of holes 758 passing through the pixel electrode 708 is formed in the positions corresponding to the common electrode line 710. Additionally, holes 758 passing through the pixel electrode 708 are also formed in the positions corresponding to the metal electrode 795 adjacent to the scan lines 702. The main difference between the third embodiment and the seventh embodiment is that additional holes 796 are respectively formed between any two adjacent holes 758. The hole 758 or 796 is an ellipse, a rectangle or any other shape with a major axis. It is noted that the direction of the major axis is parallel to the alignment direction of the liquid crystal molecules as indicated by the arrow 754.

The metal electrode 795 adjacent to the video data line 704 is out of the pixel electrode 708, whose diagram is similar to FIG. 20A. According to the preferred embodiment, the metal electrode 795 out of the pixel electrode 708 has a major axis, which causes a major crosswise electrical field, in the direction indicated by the arrow 754. Therefore, the liquid crystal molecules located over the pixel electrode 708 is aligned in the direction, indicated by arrow 754, parallel to the metal electrode 795 to reduce the effect of the crosswise electrical field.

Additionally, a plurality of holes 758 passing through the pixel electrode 708 is formed in the positions corresponding to the metal electrode 795 adjacent to the scan line 702, whose diagram is similar to FIG. 17A. Additional holes 796 are respectively formed between any two adjacent holes 758.

The main purpose of forming the additional holes 796 is to reduce the effect of the crosswise electrical field generated by the scan lines 702. The liquid crystal molecules located over the pixel electrode 708 are aligned in the direction parallel to the major axis of the holes 796, as indicated by the arrow 754.

Figure 15H:
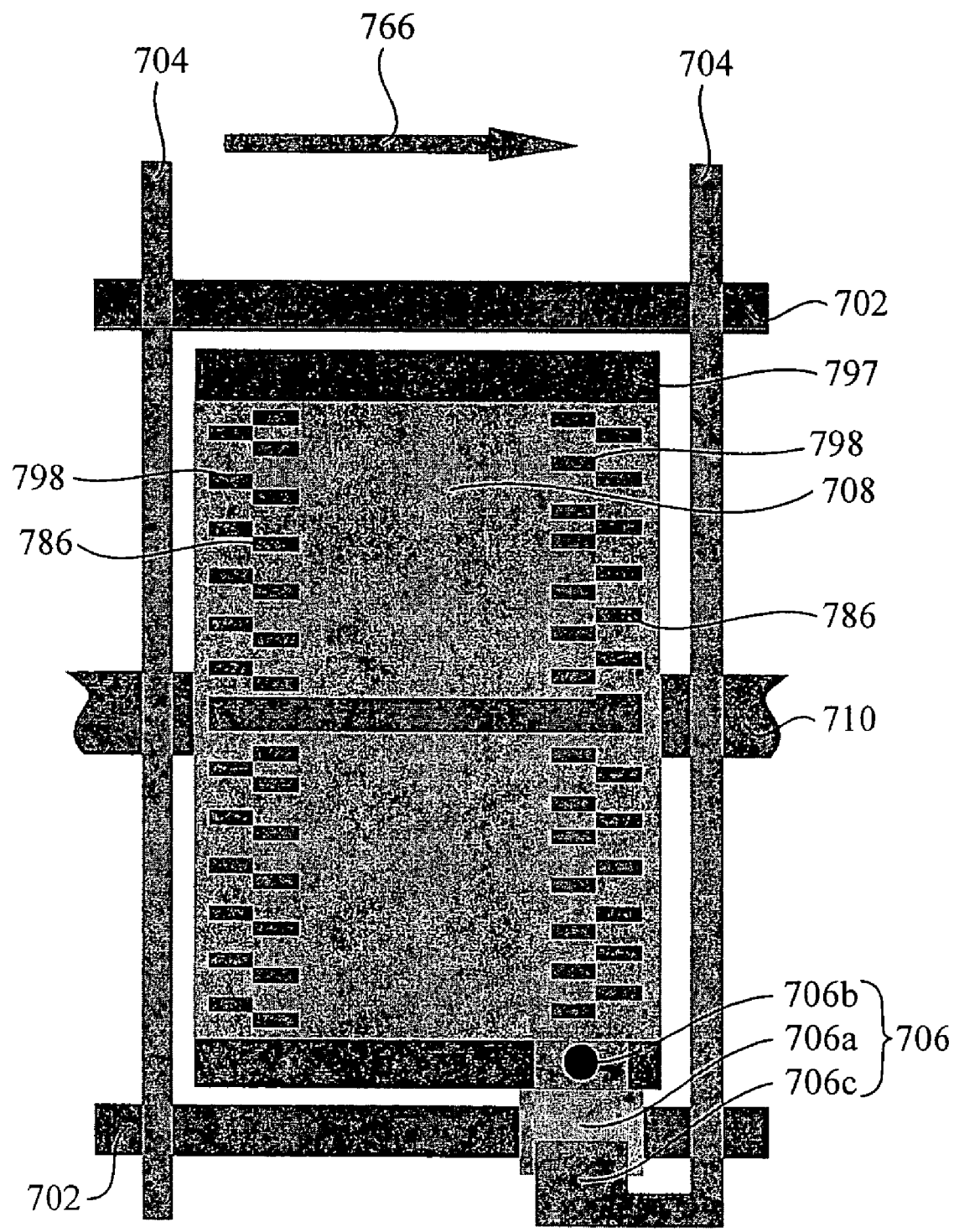
FIG. 15H illustrates a schematic diagram of a pixel structure appearance change of FIG. 4A cooperating with this alignment method according to the eighth embodiment of the present invention.

FIG. 15H illustrates a schematic diagram of a pixel structure appearance change of FIG. 4A cooperating with this alignment method according to the eighth embodiment of the present invention. The silicon island 706a of the switch transistor 706 is connected to the scan line 702. When the switch transistor 706 is selected, the scan signal in the scan line 702 turns on the switch transistor 706. The video signal in the video data line 704 is transferred to the pixel electrode 708 through the switch transistor 706. The drain electrode 706b of the switch transistor 706 is connected to the pixel electrode 708. The source electrode 706c of the switch transistor 706 is connected to the video data line 704. A common electrode line 710 is used as the common electrode of the pixel electrode 708. A metal electrode 797 is built around the pixel region. The metal electrode 797 is controlled by the common electrode line 710. When operating the liquid crystal display, a voltage is applied to the common electrode and the metal electrode at the same time.

Cooperating with the alignment direction of the liquid crystal molecules parallel to the arranged direction of the metal electrode 797, a plurality of holes 786 passing through the pixel electrode 708 is formed in the positions corresponding to the metal electrode 797 adjacent to the video data lines 704. Additionally, additional holes 798 are respectively formed between any two adjacent holes 786. The hole 786 or 798 is an ellipse, a rectangle or any other shape with a major axis. It is noted that the direction of the major axis is parallel to the alignment direction of the liquid crystal molecules as indicated by the arrow 766. On the other hand, the metal electrodes 797 adjacent to the scan lines 702 are out of the pixel electrode 708. Moreover, the pixel electrode 708 in a pixel region is partially separated into two parts so that the positions corresponding to the common electrode line 710 are exposed.

The metal electrode 797 adjacent to the scan lines 702 is out of the pixel electrode 708. According to the preferred embodiment, the metal electrode 797 out of the pixel electrode 708 has a major axis, which causes a major crosswise electrical field, in the direction indicated by the arrow 766. Therefore, the liquid crystal molecules located over the pixel electrode 708 are aligned in the direction, indicated by the arrow 766, that is parallel to the metal electrode 797 to reduce the effect of the crosswise electrical field, whose diagram is similar to FIG. 20A.

On the other hand, a trench passing through the pixel electrode 708 is formed in the position corresponding to the common electrode line 710 to separate the pixel electrode into two parts, as illustrated in FIG. 19A. According to the preferred embodiment, the trench is a rectangle that has a major axis, which causes a major crosswise electrical field, in the direction indicated by the arrow 766. Therefore, the liquid crystal molecules located over the pixel electrode 708 are aligned in the direction indicated by the arrow 766.

Additionally, holes 786 passing through the pixel electrode 708 are formed in the positions corresponding to the metal electrode 797 and adjacent to the video data lines 704 whose diagram is similar to FIG. 17A. Additional holes 798 are respectively formed between any two adjacent holes 786. The main purpose of forming the additional holes 798 is to reduce the effect of the crosswise electrical field generated by the scan lines video data lines 704. The liquid crystal molecules located over the pixel electrode 708 is aligned in the direction parallel to the major axis of the holes 798, as indicated by the arrow 766.

Accordingly, the method of changing the pixel structure appearance of FIG. 4A described in the foregoing eight embodiments cooperating with this alignment method to reduce the effect of the crosswise electrical field also can be used in other types of pixel structure. For example, the following embodiment describes the method is used to change the pixel structure appearance of FIG. 5A.

Figure 16A:
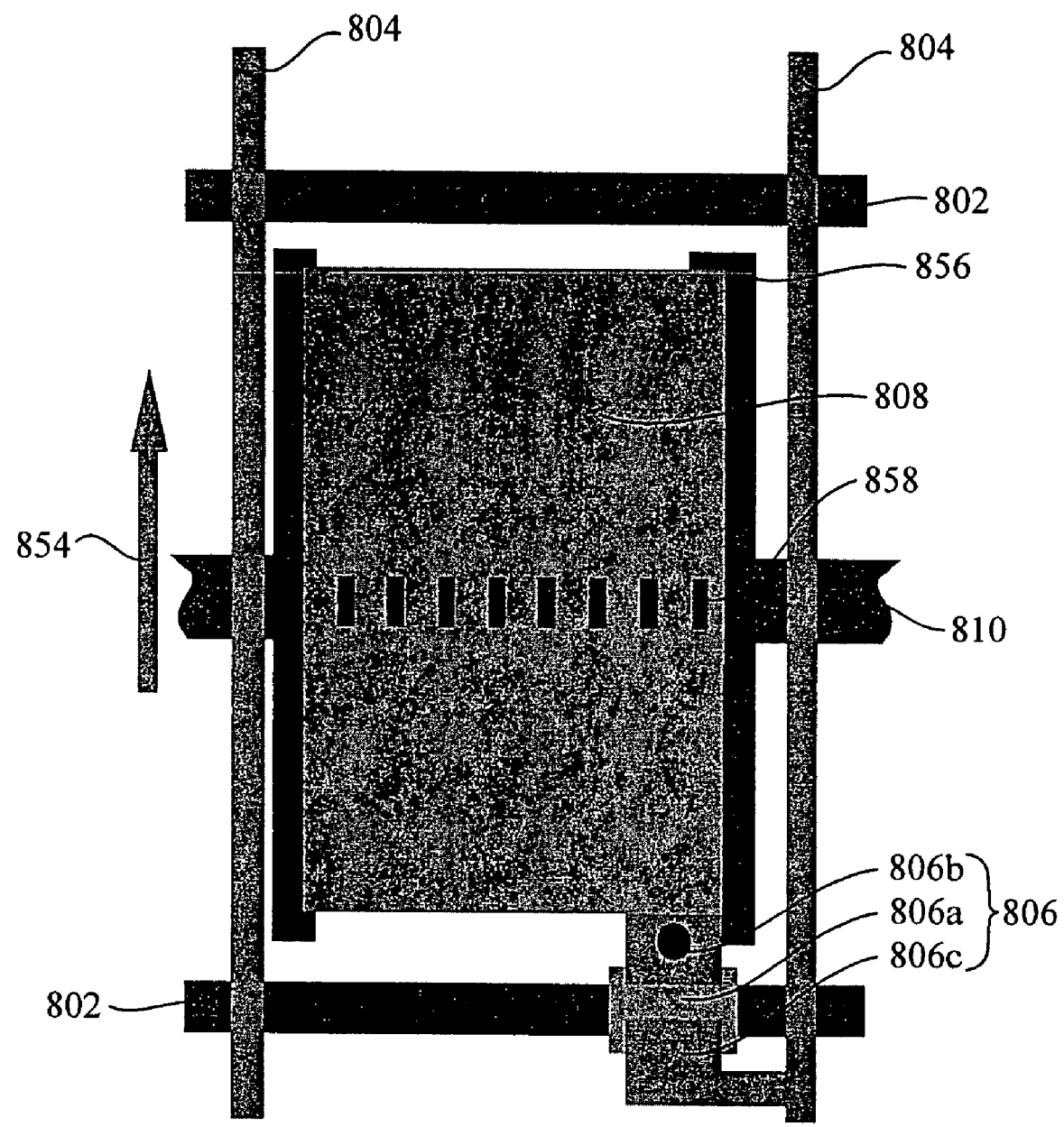
FIG. 16A illustrates a schematic diagram of a pixel structure appearance change of FIG. 5A cooperating with this alignment method according to the first embodiment of the present invention.

FIG. 16A illustrates a schematic diagram of a pixel structure appearance change of FIG. 5A cooperating with this alignment method according to the ninth embodiment of the present invention. The silicon island 806a of the switch transistor 806 is connected to the scan line 802. The drain electrode 806b of the switch transistor 806 is connected to the pixel electrode 808. The source electrode 806c of the switch transistor 806 is connected to the video data line 804. A common electrode line 810 is used as the common electrode of the pixel electrode 808. A "H" type pixel structure composed of the metal electrode 856 and the common electrode 810 is formed in the pixel region. The metal electrode 856 is controlled by the common electrode line 810. When operating the liquid crystal display, a voltage is applied to the common electrode and the metal electrode at the same time.

Cooperating with the alignment direction of the liquid crystal molecules parallel to the arranged direction of the metal electrode 856, a plurality of additional holes 858 passing through the pixel electrode 808 is formed in the positions corresponding to the common electrode line 810. The hole 858 is an ellipse, a rectangle or any other shape with a major axis. It is noted that the direction of the major axis is parallel to the alignment direction of the liquid crystal molecules as indicated by the arrow 854. On the other hand, the metal electrode 856 adjacent to the video data line 804 is out of the pixel electrode 808. Therefore, the liquid crystal molecules located over the metal electrode 856 adjacent to the video data lines 804 can be aligned in the direction indicated by an arrow 854.

The metal electrode 856 adjacent to the video data line 804 is out of the pixel electrode 808, whose diagram is similar to FIG. 20A. According to the preferred embodiment, the metal electrode 856 out of the pixel electrode 808 has a major axis, which causes a major crosswise electrical field in the direction indicated by the arrow 854. Therefore, the liquid crystal molecules located over the pixel electrode 808 is aligned in the direction, indicated by the arrow 854, that is parallel to the metal electrode 856 to reduce the effect of the crosswise electrical field.

On the other hand, a plurality of holes 858 passing through the pixel electrode 808 is formed in the positions corresponding to the common electrode line 810, whose diagram is similar to FIG. 17A. According to the preferred embodiment, the hole 858 is a rectangle. However, an ellipse or any other shape with a major axis also can be used in the preferred embodiment. The liquid crystal molecules located over the pixel electrode are aligned in the direction parallel to the major axis of the hole 858, as indicated by the arrow 854.

Figure 16B:
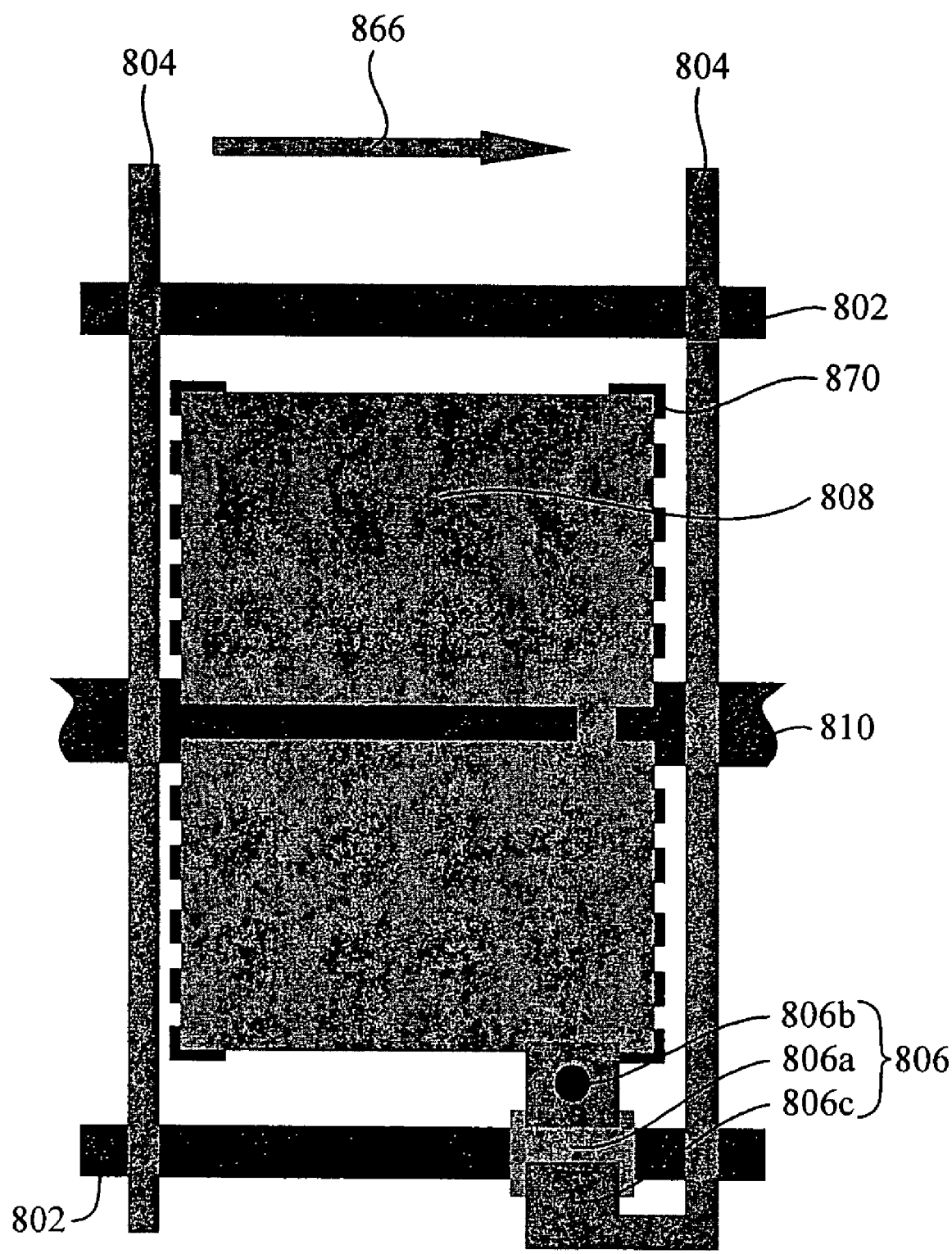
FIG. 16B illustrates a schematic diagram of a pixel structure appearance change of FIG. 5A cooperating with this alignment method according to the second embodiment of the present invention.

FIG. 16B illustrates a schematic diagram of a pixel structure appearance change of FIG. 5A cooperating with this alignment method according to the tenth embodiment of the present invention. The silicon island 806a of the switch transistor 806 is connected to the scan line 802. The drain electrode 806b of the switch transistor 806 is connected to the pixel electrode 808. The source electrode 806c of the switch transistor 806 is connected to the video data line 804. A common electrode line 810 is used as the common electrode of the pixel electrode 808. A "H" type pixel structure composed of the metal electrode 870 and the common electrode 810 is formed in the pixel region. The metal electrode 870 is controlled by the common electrode line 810. When operating the liquid crystal display, a voltage is applied to the common electrode and the metal electrode at the same time.

Cooperating with the alignment direction of the liquid crystal molecules parallel to the arranged direction of the metal electrode 870, the metal electrode 870 adjacent to the video data line 804 is sawtoothed so that this metal electrode 870 has a major axis in the direction indicated by an arrow 866. In other words, the liquid crystal molecules can be aligned in the direction indicated by an arrow 866. On the other hand, the pixel electrode 808 in a pixel region is partially separated into two parts so that the positions corresponding to the common electrode line 810 are exposed. The main purpose is to align the liquid crystal molecules in the direction indicated by the arrow 866.

A trench passing through the pixel electrode 808 is formed in the position corresponding to the common electrode line 810 to separate the pixel electrode into two parts, whose diagram is similar to FIG. 19A. According to the preferred embodiment, the trench is a rectangle with a major axis, which causes a major crosswise electrical field in the direction indicated by the arrow 866. Therefore, the liquid crystal molecules located over the pixel electrode 808 are aligned in the direction, indicated by the arrow 866, that is parallel to the common electrode line 810 to reduce the effect of the crosswise electrical field.

On the other hand, the metal electrode 870 adjacent to the video data line 804 is sawtoothed, whose diagram is similar to FIG. 18A. The metal electrode 870 has a plurality of extending parts out of the pixel electrode 808. These extending parts cause a major crosswise electrical field in the direction indicated by the arrow 866. Therefore, the liquid crystal molecules are aligned in the direction indicated by the arrow 866.

Figure 16C:
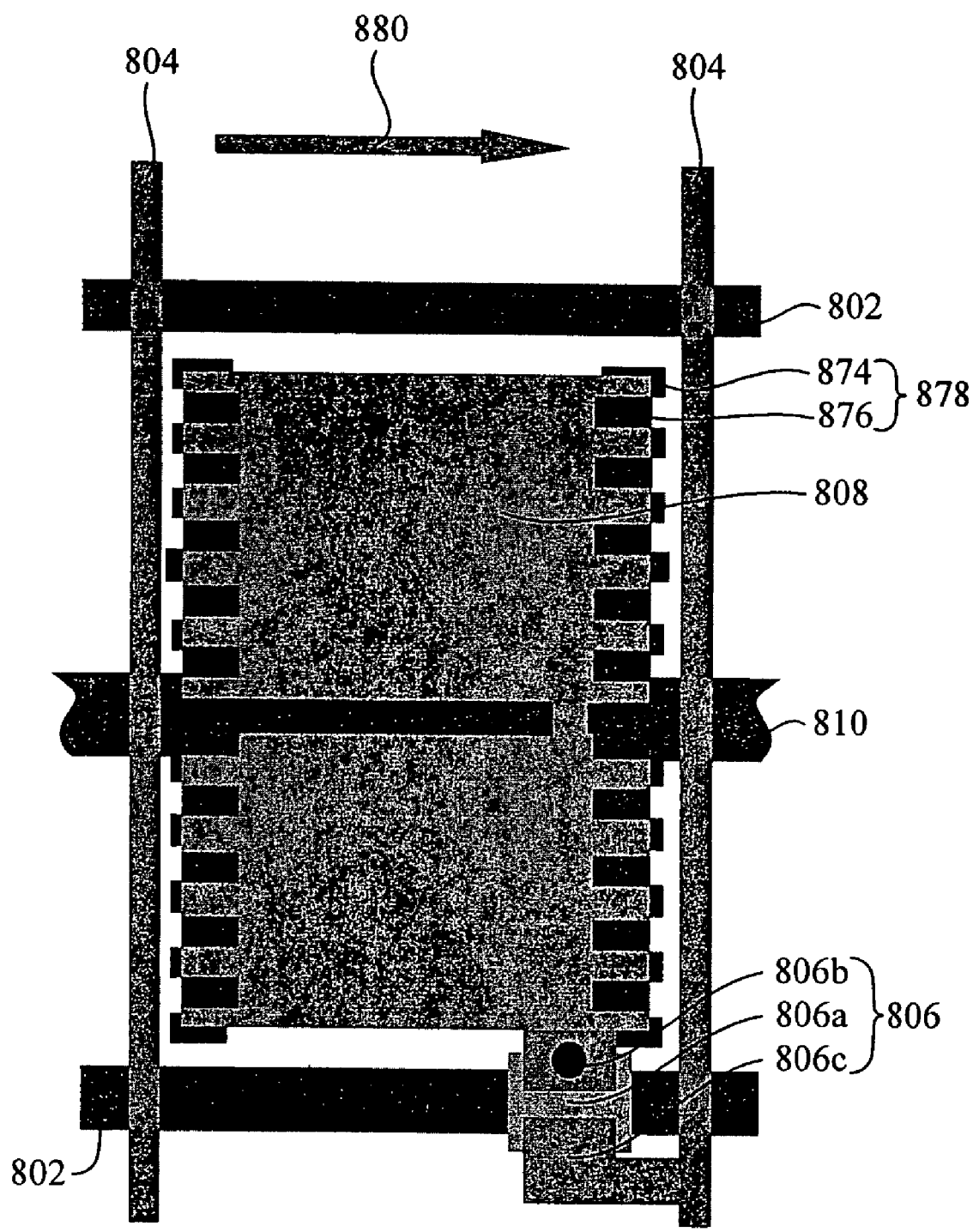
FIG. 16C illustrates a schematic diagram of a pixel structure appearance change of FIG. 5A cooperating with this alignment method according to the third embodiment of the present invention.

FIG. 16C illustrates a schematic diagram of a pixel structure appearance change of FIG. 5A cooperating with this alignment method according to the eleventh embodiment of the present invention. The silicon island 806a of the switch transistor 806 is connected to the scan line 802. The drain electrode 806b of the switch transistor 806 is connected to the pixel electrode 808. The source electrode 806c of the switch transistor 806 is connected to the video data line 804. A common electrode line 810 is used as the common electrode of the pixel electrode 808. A "H" type pixel structure composed of the metal electrode 878 and the common electrode 810 is formed in the pixel region. The metal electrode 878 is controlled by the common electrode line 810. When operating the liquid crystal display, a voltage is applied to the common electrode and the metal electrode at the same time.

Cooperating with the alignment direction of the liquid crystal molecules parallel to the arranged direction of the metal electrode 878, the metal electrode 878 adjacent to video data line 804 is sawtoothed so that this metal electrode 878 has a major axis in the direction indicated by an arrow 880. In other words, the liquid crystal molecules can be aligned in the direction indicated by an arrow 880. On the other hand, the pixel electrode 808 in a pixel region is partially separated into two parts so that the positions corresponding to the common electrode line 810 are exposed. The main purpose is to align the liquid crystal molecules in the direction indicated by the arrow 880.

A trench passing through the pixel electrode 808 is formed in the position corresponding to the common electrode line 810 to separate the pixel electrode into two parts, whose diagram is similar to FIG. 19A. According to the preferred embodiment, the liquid crystal molecules located over the pixel electrode 808 are aligned in the direction, indicated by the arrow 866, that is parallel to the common electrode line 810 to reduce the effect of the crosswise electrical field.

The metal electrode 878 adjacent to the video data line 804 is sawtoothed, whose diagram is similar to FIG. 18A. The metal electrode 878 has a plurality of extending parts 874 out of the pixel electrode 808. Holes 876 are respectively formed in any two adjacent extending parts 874 to reduce the effect of the crosswise electrical field generated by the video data line 804.

It is noted that although all of the embodiments are related to the structure of the common electrode line with the connected metal electrode line and the video data line located on different layers, these embodiments also can be used in the structure where the common electrode line with the connected metal electrode line and the video data line are located on the same layer.

Accordingly, for reducing the crosswise electrical field effect during liquid crystal molecules transformation, the alignment direction is parallel to the metal electrode in the present invention. On the other hand, additional holes passing through the pixel electrode are formed in the positions corresponding to the metal electrode or common electrode so as to reduce the crosswise electrical field. The hole 858 is an ellipse, a rectangle or any other shape with a major axis.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. A liquid crystal display comprises:
    a first substrate with a plurality of scan lines and video data lines, wherein any adjacent scan lines and any adjacent video data lines define a pixel region, each pixel region comprising a transistor and a pixel electrode connected with said transistor;
    a plurality of common electrode lines located under said pixel electrodes;
    a plurality of metal lines extending from said common electrode lines, wherein said video data lines, said common electrode lines and said metal lines are located in a same layer; and
    a second substrate separated from said first substrate by a fixed distance;
    wherein said pixel electrodes having a plurality of holes passing through said pixel electrodes and located over one of said common electrode lines, and each hole having a major axis.

2. The pixel structure of claim 1, wherein said scan lines, said common electrode lines and said metal lines are located in a same layer.

3. The liquid crystal display of claim 1, wherein said video data lines and said common electrode lines are parallel to each other.

4. The liquid crystal display of claim 1, wherein said holes are rectangles or ellipses.

5. The liquid crystal display of claim 1, further comprising liquid crystal molecules has an alignment direction parallel to said major axis of said hole.

6. The liquid crystal display of claim 1, wherein said metal lines partially overlap with corresponding pixel electrode to form a capacitor structure.

7. The liquid crystal display of claim 1, wherein said metal lines and said common electrode lines are arranged in an "H" pattern, an "S" pattern or a "cross" pattern in said pixel region.

8. The liquid crystal display of claim 1, wherein said metal lines are arranged around said pixel regions.

9. The pixel structure of claim 1, wherein said metal lines adjacent to said video data lines are sawtoothed.

10. A liquid crystal display comprises:
    a first substrate with a plurality of scan lines and video data lines, wherein any adjacent scan lines and any adjacent video data lines define a pixel region, each pixel region comprising a transistor and a pixel electrode connected with said transistor;
    a plurality of common electrode lines located under said pixel electrodes;
    a plurality of metal lines extending from said common electrode lines;
    wherein said metal lines adjacent to said scan lines are sawtoothed; and
    a second substrate separated from said first substrate by a fixed distance;
    wherein said pixel electrodes having a plurality of holes passing through said pixel electrodes and located over one of said common electrode lines, and each hole having a major axis.

11. The liquid crystal display of claim 10, further comprising liquid crystal molecules has an alignment direction parallel to said major axis of said hole.

12. The liquid crystal display of claim 10, wherein said holes are rectangles or ellipses.

13. The liquid crystal display of claim 10, wherein said metal lines are arranged around said pixel regions.

14. The liquid crystal display of claim 10, wherein said video data lines, said common electrode lines and said metal lines are located in a same layer.

15. A liquid crystal display comprises:
    a first substrate with a plurality of scan lines and video data lines, wherein any adjacent scan lines and any adjacent video data lines define a pixel region, each pixel region comprising a transistor and a pixel electrode connected with said transistor;
    a plurality of common electrode lines located under said pixel electrodes;
    a plurality of metal lines extending from said common electrode lines; and
    a second substrate separated from said first substrate by a fixed distance;
    wherein said pixel electrodes having a plurality of holes passing through said pixel electrodes and located over one of said common electrode lines, and each hole having a major axis, and said holes are located over corresponding said metal lines.

16. The liquid crystal display of claim 15, further comprising liquid crystal molecules has an alignment direction parallel to said major axis of said hole.

17. The liquid crystal display of claim 15, wherein said holes are rectangles or ellipses.

18. The liquid crystal display of claim 15, wherein said metal lines partially overlap with corresponding pixel electrode to form a capacitor structure.

19. The liquid crystal display of claim 15, wherein said metal lines and said common electrode lines are arranged in an "H" pattern, an "S" pattern or a "cross" pattern in said pixel region.

20. The liquid crystal display of claim 15, wherein said metal lines are arranged around said pixel regions.

21. The liquid crystal display of claim 15, wherein said video data lines, said common electrode lines and said metal lines are located in a same layer.

22. The liquid crystal display of claim 15, wherein said metal lines adjacent to said scan lines are sawtoothed.

\* \* \* \* \*